United States Patent
Liu et al.

(10) Patent No.: US 10,469,143 B2
(45) Date of Patent: *Nov. 5, 2019

(54) PRECODING MATRIX SET DETERMINING METHOD AND APPARATUS, AND PARAMETER INDICATION INFORMATION SENDING METHOD AND APPARATUS

(71) Applicant: Huawei Technologies Co., Ltd., Shenzhen (CN)

(72) Inventors: Kunpeng Liu, Beijing (CN); Leiming Zhang, Beijing (CN); Jianghua Liu, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/059,948

(22) Filed: Aug. 9, 2018

(65) Prior Publication Data

US 2018/0351617 A1    Dec. 6, 2018

Related U.S. Application Data

(63) Continuation of application No. 15/206,062, filed on Jul. 8, 2016, now Pat. No. 10,063,299, which is a continuation of application No. PCT/CN2014/070353, filed on Jan. 9, 2014.

(51) Int. Cl.
*H04B 7/0456* (2017.01)
*H04B 7/06* (2006.01)
(Continued)

(52) U.S. Cl.
CPC ......... *H04B 7/0478* (2013.01); *H04B 7/0417* (2013.01); *H04B 7/0639* (2013.01); *H04B 7/0658* (2013.01); *H04L 5/0026* (2013.01); *H04W 72/0406* (2013.01)

(58) Field of Classification Search
CPC .. H04B 7/0478; H04B 7/0417; H04B 7/0658; H04B 7/0639; H04W 72/0406; H04L 5/0026

See application file for complete search history.

(56) References Cited

U.S. PATENT DOCUMENTS

2012/0008699 A1   1/2012   Ito
2012/0082248 A1   4/2012   Han et al.
(Continued)

FOREIGN PATENT DOCUMENTS

CN   101388703 A   3/2009
CN   102362456 A   2/2012
(Continued)

OTHER PUBLICATIONS

"Considerations on CSI feedback enhancements for high-priority antenna configurations," 3GPP TSG-RAN WG1 #66, Athens, Greece R1-112420, 3rd Partnership Project, Valbonne, France (Aug. 22-26, 2011).

(Continued)

*Primary Examiner* — Thai Nguyen
(74) *Attorney, Agent, or Firm* — Leydig, Voit & Mayer, Ltd.

(57) ABSTRACT

A precoding matrix set determining method and apparatus, and a parameter indication information sending method and apparatus are provided. The precoding matrix set determining method include: determining, by a first network device, a parameter used for determining a precoding matrix set, where the parameter includes at least one of a phase parameter, an amplitude parameter, a quantity of vectors in the precoding matrix set, a quantity of vectors in a first codebook set in dual-codebook feedback, and a quantity of vectors in a second codebook set in the dual-codebook feedback, and the parameter is not fixed; and using the parameter to determine the precoding matrix set, where the precoding matrix set includes at least one precoding matrix. By using this solution, flexibility of feeding back a precoding matrix indicator is improved.

24 Claims, 3 Drawing Sheets

(51) Int. Cl.
*H04B 7/0417* (2017.01)
*H04L 5/00* (2006.01)
*H04W 72/04* (2009.01)

(56) References Cited

U.S. PATENT DOCUMENTS

| | | | |
|---|---|---|---|
| 2012/0163487 A1 | 6/2012 | Koyanagi et al. | |
| 2013/0230081 A1* | 9/2013 | Wernersson | H04B 7/0617 375/219 |
| 2013/0259151 A1 | 10/2013 | Thomas et al. | |
| 2014/0177745 A1* | 6/2014 | Krishnamurthy | H04B 7/0413 375/267 |

FOREIGN PATENT DOCUMENTS

| | | |
|---|---|---|
| CN | 102710390 A | 10/2012 |
| WO | 2013068155 A1 | 5/2013 |

OTHER PUBLICATIONS

"Investigation on CSI feedback enhancements for closed-loop MIMO", 3GPP TSG RAN WG1 Meeting #66, R1-112047, 3rd Partnership Project, Valbonne, France (Aug. 22-26, 2011).

"3rd Generation Partnership Project;Technical Specification Group Radio Access Network;Evolved Universal Terrestrial Radio Access (E-UTRA);Physical layer procedures(Release 12)",3GPP TS 36.213 V12.0.0,3rd Partnership Project, Valbonne, France (Dec. 2013).

"3rd Generation Partnership Project;Technical Specification Group Radio Access Network; Evolved Universal Terrestrial Radio Access (E-UTRA);Physical channels and modulation(Release 12)",3GPP TS 36.211 V12.0.0,3rd Partnership Project, Valbonne, France (Dec. 2013).

"3rd Generation Partnership Project;Technical Specification Group Radio Access Network;Evolved Universal Terrestrial Radio Access (E-UTRA);Physical layer procedures(Release 12)," 3GPP TS 36.331 V12.0.0, 3rd Partnership Project, Valbonne, France (Dec. 2013).

"Further details on UE-specific codebook subset restriction",3GPP TSG RAN WG1 #62bis,Xi'an, China, R1-105381,3rd Partnership Project, Valbonne, France (Oct. 11-15, 2010).

Alcatel-Lucent et al.,"Way Forward on 8Tx Codebook for Rel.10 DL MIMO," Madrid, Spain, R1-105011, 3GPP TSG RAN WG1 62,3rd Partnership Project, Valbonne, France (Aug. 23-27, 2010).

* cited by examiner

PRECODING MATRIX SET DETERMINING METHOD AND APPARATUS, AND PARAMETER INDICATION INFORMATION SENDING METHOD AND APPARATUS

CROSS-REFERENCE TO RELATED APPLICATIONS

This application is a continuation of U.S. patent application Ser. No. 15/206,062, filed on Jul. 8, 2016, (now U.S. Pat. No. 10,063,299, issued on Aug. 28, 2018), which is a continuation of International Application No. PCT/CN2014/070353, filed on Jan. 9, 2014. All of the afore-mentioned patent applications are hereby incorporated by reference in their entireties.

TECHNICAL FIELD

The present invention relates to the field of wireless communications technologies, and in particular, to a precoding matrix set determining method and apparatus, and a parameter indication information sending method and apparatus.

BACKGROUND

By using a transmit signal precoding technology and a receive signal combination technology, a Multiple Input Multiple Output (Multiple Input Multiple Output, MIMO) wireless communications system may obtain diversity and an array gain. A system that uses precoding may be represented as follows:

$Y=H\hat{V}s+n$; where

Y is a received signal vector, H is a channel matrix, $\hat{V}$ is a precoding matrix, s is a transmitted symbol vector, and n is measured noise.

For optimal precoding, generally, a transmitter needs to fully learn channel state information (Channel State Information, CSI). A commonly used method is that user equipment (User Equipment, UE) quantizes transitory CSI and reports the quantized CSI to a base station, where the user equipment includes a mobile station (Mobile Station, MS), a relay (Relay), a mobile telephone (Mobile Telephone), a handset (handset), portable equipment (portable equipment), and the like, and the base station includes a NodeB (NodeB), a base station (Base station, BS), an access point (Access Point), a transmission point (Transmission Point, TP), an evolved NodeB (Evolved Node B, eNB), a relay, and the like.

CSI reported by an existing Long Term Evolution (Long Term Evolution, LTE) system includes information such as a rank indicator (Rank Indicator, RI), a precoding matrix indicator (Precoding Matrix Indicator, PMI), and a channel quality indicator (Channel Quality Indicator, CQI), where the RI and the PMI respectively indicate a quantity of used transport layers and a used precoding matrix. A set of used precoding matrices is generally referred to as a codebook, where each precoding matrix is a codeword in the codebook.

A codebook in LTE R8 is mainly designed for single user MIMO (SU-MIMO, Single User MIMO), and a precoding matrix or a codeword in the codebook meets a constraint of 8PSK (8 phase shift keying), and is quantized within a fixed range. Therefore, accuracy of space quantization is limited, and performance of a 3-dimensional MIMO (3D MIMO, 3 Dimensions MIMO) technology is greatly limited.

In an existing cellular system, a beam at a transmit end of a base station can be adjusted only in a horizontal dimension, and there is a fixed downtilt angle in a vertical dimension for each user. Therefore, various beamforming/precoding technologies and the like are based on channel information in a horizontal dimension. Actually, because a channel is 3D, a throughput of the system cannot be optimal by using a method of fixing a downtilt angle. Therefore, beam adjustment in a vertical dimension is of great significance for improving system performance.

A technical idea of the 3-dimensional MIMO technology is mainly adjusting a weight of 3-dimensional beamforming at an active antenna end according to 3D channel information estimated by a user end, so that a main lobe of a beam is "directed at" a target user in 3-dimensional space, received signal power is greatly improved, a signal to interference plus noise ratio is increased, and a throughput of an entire system is further improved.

A 3D beamforming technology needs to be based on an active antenna system (AAS). Compared with a traditional antenna, the active antenna system further provides degrees of freedom in a vertical direction.

However, in the prior art, whether for a 2D beamforming technology or a 3D beamforming technology, when a precoding matrix indicator is being fed back, precoding matrix sets used for all transmit ends and all communication scenarios are the same. Therefore, when the precoding matrix indicator is being fed back, a precoding matrix to be fed back can only be selected from same precoding matrix sets. However, in practical application, different transmit ends may be located in different communication scenarios, and a communication scenario in which a transmit end is located also varies; in this case, a problem of poor flexibility exists when a fixed precoding matrix set is used to feed back a precoding matrix indicator, and therefore, relatively poor subsequent communication quality is caused.

SUMMARY

Embodiments of the present invention provide a precoding matrix set determining method and apparatus, and a parameter indication information sending method and apparatus, to resolve a problem in the prior art that flexibility is relatively poor because a precoding matrix indicator can only be fed back based on a fixed precoding matrix set.

A first aspect provides a precoding matrix set determining method, including:

determining, by a first network device, a parameter used for determining a precoding matrix set, where the parameter includes at least one of a phase parameter, an amplitude parameter, a quantity of vectors in the precoding matrix set, a quantity of vectors in a first codebook set in dual-codebook feedback, and a quantity of vectors in a second codebook set in the dual-codebook feedback, and the parameter is not fixed; and determining the precoding matrix set by using the parameter, where the precoding matrix set includes at least one precoding matrix.

A second aspect provides a parameter indication information sending method, including:

determining, by a second network device, a parameter used for determining a precoding matrix set, where the parameter includes at least one of a phase parameter, an amplitude parameter, a quantity of vectors in the precoding matrix set, a quantity of vectors in a first codebook set in dual-codebook feedback, and a quantity of vectors in a second codebook set in the dual-codebook feedback, and the parameter is not fixed; and sending first parameter indication information to a first network device, where the first parameter indication information is used to indicate the parameter.

A third aspect provides a precoding matrix set determining apparatus, where the apparatus is integrated in a first network device and includes:

a parameter determining unit, configured to determine a parameter used for determining a precoding matrix set, where the parameter includes at least one of a phase parameter, an amplitude parameter, a quantity of vectors in the precoding matrix set, a quantity of vectors in a first codebook set in dual-codebook feedback, and a quantity of vectors in a second codebook set in the dual-codebook feedback, and the parameter is not fixed; and a set determining unit, configured to determine the precoding matrix set by using the parameter, where the precoding matrix set includes at least one precoding matrix.

A fourth aspect provides a parameter indication information sending apparatus, where the apparatus is integrated in a second network device and includes:

a parameter determining unit, configured to determine a parameter used for determining a precoding matrix set, where the parameter includes at least one of a phase parameter, an amplitude parameter, a quantity of vectors in the precoding matrix set, a quantity of vectors in a first codebook set in dual-codebook feedback, and a quantity of vectors in a second codebook set in the dual-codebook feedback, and the parameter is not fixed; and a sending unit, configured to send first parameter indication information to a first network device, where the first parameter indication information is used to indicate the parameter.

A fifth aspect provides a network device, and for ease of description, the network device is referred to as a first network device, and specifically includes:

a processor, configured to: determine a parameter used for determining a precoding matrix set, where the parameter includes at least one of a phase parameter, an amplitude parameter, a quantity of vectors in the precoding matrix set, a quantity of vectors in a first codebook set in dual-codebook feedback, and a quantity of vectors in a second codebook set in the dual-codebook feedback, and the parameter is not fixed; and determine the precoding matrix set by using the parameter, where the precoding matrix set includes at least one precoding matrix; and a communications interface, configured to communicate with another network device.

A sixth aspect provides a network device, and for ease of description, the network device is referred to as a second network device, and specifically includes:

a processor, configured to determine a parameter used for determining a precoding matrix set, where the parameter includes at least one of a phase parameter, an amplitude parameter, a quantity of vectors in the precoding matrix set, a quantity of vectors in a first codebook set in dual-codebook feedback, and a quantity of vectors in a second codebook set in the dual-codebook feedback, and the parameter is not fixed; and a communications interface, configured to send first parameter indication information to a first network device, where the first parameter indication information is used to indicate the parameter.

Beneficial effects of the present invention include:

in the solution provided in the embodiments of the present invention, a first network device determines a parameter used for determining a precoding matrix set, where the parameter includes at least one of a phase parameter, an amplitude parameter, a quantity of vectors in the precoding matrix set, a quantity of vectors in a first codebook set in dual-codebook feedback, and a quantity of vectors in a second codebook set in the dual-codebook feedback, and the parameter is not fixed; and uses the parameter to determine the precoding matrix set, where the precoding matrix set includes at least one precoding matrix. Because the parameter used for determining the precoding matrix set is not fixed, the precoding matrix set determined by using the parameter is not fixed either, so that it can be more flexible when a precoding matrix indicator is fed back based on a variable precoding matrix set subsequently, and overall performance of a system and communication quality of communication feedback based on a precoding matrix indicator can be improved.

Other features and advantages of this application are described in the subsequent specification, and some become apparent in the specification, or are understood by implementing this application. An objective and the other advantages of this application may be achieved and obtained by using a structure specified in the specification, the claims, and the accompanying drawings.

BRIEF DESCRIPTION OF DRAWINGS

The accompanying drawings are used to provide further understanding of the present invention, form a part of the specification, are used to explain the present invention together with the specification of the present invention, and do not constitute limitation on the present invention. In the accompanying drawings.

DESCRIPTION OF EMBODIMENTS

To give an implementation solution for improving flexibility of feeding back a precoding matrix indicator, embodiments of the present invention provide a precoding matrix set determining method and apparatus, and a parameter indication information sending method and apparatus. In the following, preferable embodiments of the present invention are described with reference to the drawings of the specification. It should be understood that the preferable embodiments described herein are merely used to illustrate and explain the present invention, but are not used to limit the present invention. The embodiments in this application and features in the embodiments may be mutually combined if they do not conflict with each other.

Figure 1:
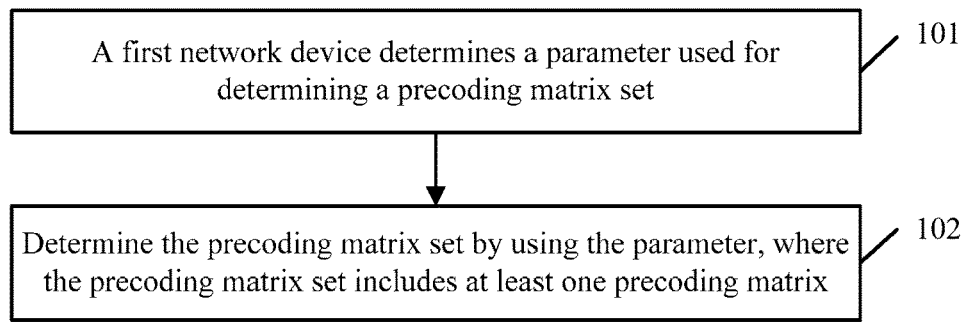
FIG. 1 is a flowchart of a precoding matrix set determining method according to an embodiment of the present invention.

An embodiment of the present invention provides a precoding matrix set determining method. As shown in FIG. 1, the method includes:

Step 101. A first network device determines a parameter used for determining a precoding matrix set, where the parameter includes at least one of a phase parameter, an amplitude parameter, a quantity of vectors in the precoding matrix set, a quantity of vectors in a first codebook set in dual-codebook feedback, and a quantity of vectors in a second codebook set in the dual-codebook feedback, and the parameter is not fixed.

That the parameter is not fixed indicates that the parameter is a variable, that is, the parameter is not a fixed value.

Step 102. Determine the precoding matrix set by using the parameter, where the precoding matrix set includes at least one precoding matrix.

In the method shown in FIG. 1, the first network device may determine, according to some communication information used in a communication process, the parameter used for determining the precoding matrix set. For example, all information or a part of information included in the communication information may be used as indication information in an implicit manner, and corresponding preset parameters are set in advance for different pieces of indication information, so that the first network device can determine, according to the indication information carried in the communication information, the preset parameters corresponding to the indication information, and use the preset parameters as the parameter used for determining the precoding matrix set.

The communication information may be one type of the following information:

a user ID, a cell ID, a channel state information process (CSI process) control ID, a carrier ID, a demodulation reference signal (DMRS) configuration parameter, a channel state information-reference signal (CSI-RS) configuration parameter, system bandwidth allocated to the first network device, a precoding resource block group (PRG, Precoding Resource Block Group), and a subband size.

In the method shown in FIG. 1, the first network device may receive first parameter indication information sent by a second network device, where the first parameter indication information is used to indicate the parameter used for determining the precoding matrix set, and the first network device determines the parameter according to the first parameter indication information.

In this case, it is equivalent to that the second network device notifies, in an explicit manner, the first network device of the parameter used for determining the precoding matrix.

Figure 2:
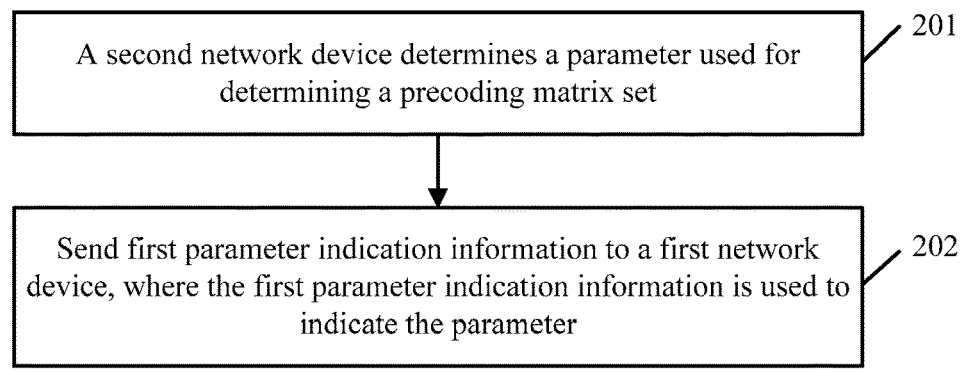
FIG. 2 is a flowchart of a parameter indication information sending method according to an embodiment of the present invention.

Accordingly, this embodiment of the present invention further provides a parameter indication information sending method. As shown in FIG. 2, the method includes:

Step 201. A second network device determines a parameter used for determining a precoding matrix set, where the parameter includes at least one of a phase parameter, an amplitude parameter, a quantity of vectors in the precoding matrix set, a quantity of vectors in a first codebook set in dual-codebook feedback, and a quantity of vectors in a second codebook set in the dual-codebook feedback, and the parameter is not fixed.

Step 202. Send first parameter indication information to a first network device, where the first parameter indication information is used to indicate the parameter.

In the methods shown in FIG. 1 and FIG. 2, the second network device may send the first parameter indication information to the first network device by using broadcast signaling, radio resource control RRC signaling, or dynamic signaling.

Further, the first network device may send second parameter indication information to the second network device, where the second parameter indication information is used to indicate a reference parameter used for determining the precoding matrix set, and the reference parameter includes at least one of a reference phase parameter, a reference amplitude parameter, a reference quantity of vectors in the precoding matrix set, a reference quantity of vectors in the first codebook set in the dual-codebook feedback, and a reference quantity of vectors in the second codebook set in the dual-codebook feedback.

The second parameter indication information sent by the first network device to the second network device may be used as reference when the second network device determines the parameter that is used for determining the precoding matrix and that the first network device is to be instructed to use. Accordingly, the parameter indicated by the first parameter indication information sent by the second network device to the first network device may be the same as or different from the reference parameter indicated by the received second parameter indication information sent by the first network device.

In this embodiment of the present invention, in the methods shown in FIG. 1 and FIG. 2, the parameter used for determining the precoding matrix set is not fixed. Further, the parameter may be specifically modified and adjusted based on the following information.

The parameter may be cell-specific, that is, the parameter may be different for different cells; or the parameter may be terminal-specific, that is, the parameter may be different for different terminals; or the parameter may be CSI process-specific, that is, the parameter may be different for different CSI processes; or the parameter may be carrier-specific, that is, the parameter may be different for different carriers; or the parameter may be rank-specific, that is, the parameter may be different for different ranks; or the parameter may be specific to a precoding matrix subset in a dual-codebook feedback manner, where the precoding matrix set determined by using the parameter is a precoding matrix subset of a first codebook W1 or a second codebook W2 in the dual-codebook feedback manner.

When the parameter used for determining the precoding matrix set is being adjusted and modified based on the foregoing various information, specific modification and adjustment bases may be flexibly set according to a requirement in practical application. For example, the parameter may be different when angle ranges of cell coverage ranges are different; the parameter may be different when ranges of a distance between a terminal and a base station in a same cell are different.

In this embodiment of the present invention, in the methods shown in FIG. 1 and FIG. 2, the parameter used for determining the precoding matrix set may include multiple groups of parameters used for determining different precoding matrix subsets. Accordingly, when the parameter is used to determine the precoding matrix set, respective precoding matrix subsets may be separately determined by using the groups of parameters, and the precoding matrix subsets separately determined for the groups of parameters form the precoding matrix set.

Further, for a dual-codebook structure, W=W1*W2, $$W1 = \begin{bmatrix} U & 0 \\ 0 & U \end{bmatrix},$$

W1 is a diagonal matrix, each U in W1 is a precoding matrix subset, each U is corresponding to a group of parameters, and U corresponding to the group of parameters is determined according to the group of parameters.

In the methods shown in FIG. 1 and FIG. 2, after determining the precoding matrix set by using the parameter, the first network device may further select a precoding matrix that needs to be reported to the second network device, and feed back matrix indication information of the selected precoding matrix to the second network device, to complete feedback of a precoding matrix indicator. For a manner of selecting the precoding matrix, the prior art may be used, and details are not described herein again. For a manner of feeding back the precoding matrix indicator, the prior art may also be used, for example, both single-codebook feedback and dual-codebook feedback are feasible, and details are not described herein again either.

Accordingly, after determining the parameter, the second network device may determine the precoding matrix set by using the parameter, determine, according to the matrix indication information and after receiving the matrix indication information sent by the first network device, the precoding matrix selected by the first network device, and send a signal to the first network device by using the precoding matrix.

In this embodiment of the present invention, when determining the precoding matrix set by using the parameter, the first network device and the second network device may dynamically generate the precoding matrix set by using the parameter; or may separately generate corresponding precoding matrix sets according to multiple different optional parameters, and may directly determine the corresponding precoding matrix set according to the currently determined parameter subsequently without dynamically generating the precoding matrix set.

Further, when the precoding matrix set is being determined, in addition to parameters that are included in the parameter and are not fixed, some other parameters may further be used, and the other parameters may be preset parameters that are fixed.

In the following, how to determine the precoding matrix set is separately described in detail by using different specific forms of the parameter that is used for determining the precoding matrix set and that is not fixed.

In the foregoing methods provided in this embodiment of the present invention, the first network device may be a signal transmit end, and accordingly, the second network device is a signal receive end. Specifically, both the first network device and the second network device may be base stations or terminals, or one of them is a base station, and the other is a terminal.

Embodiment 1

In Embodiment 1 of the present invention, the parameter used for determining the precoding matrix set includes at least one of a first phase value $\varphi_1$, an amplitude $a_{m,n}$ of an element (m, n) in the precoding matrix set, the quantity N of vectors in the precoding matrix set, and a quantity M of elements in each vector in the precoding matrix set. Others, except the parameter, in the first phase value $\varphi_1$, the amplitude $a_{m,n}$ of the element (m, n) in the precoding matrix set, the quantity N of vectors in the precoding matrix set, and the quantity M of elements in each vector in the precoding matrix set are preset.

For example, $\varphi_1$ and N may be obtained by using the first parameter indication information or in an implicit manner, and others are fixed; or N may be obtained by using the first parameter indication information or in an implicit manner, and others are fixed; or $\varphi_1$ may be obtained by using the first parameter indication information or in an implicit manner, and others are fixed.

Accordingly, the determining the precoding matrix set by using the parameter includes:

determining, by using a phase range $[0,\varphi_1]$, the amplitude $a_{m,n}$, the quantity N, and the quantity M, a vector that forms the precoding matrix set; where 0 is a minimum value of a phase difference between two adjacent antennas in a vector in the precoding matrix set; and the first phase value $\varphi_1$ is a maximum value of the phase difference between two adjacent antennas in the vector in the precoding matrix set.

B represents the precoding matrix set, and the vector that forms B is $[v_0 \, v_1 \ldots v_{N-1}]$, where different elements in each vector are corresponding to different antennas, for example, $$v_n = \begin{bmatrix} v_{0,n} \\ v_{1,n} \\ \vdots \\ v_{M-1,n} \end{bmatrix},$$

$v_{0,n}$ is corresponding to a weighted value of the $0^{th}$ antenna, $v_{1,n}$ is corresponding to a weighted value of the first antenna, and $v_{M-1,n}$ is corresponding to a weighted value of the $(M-1)^{th}$ antenna.

A phase difference between two adjacent antennas in the $n^{th}$ vector $v_n$ is $$\frac{n\varphi_1}{N-1}.$$

A phase difference between two adjacent antennas in $v_0$ is 0, and is the smallest among phase differences between two adjacent antennas in all the vectors. A phase difference between two adjacent antennas in $v_{N-1}$ is $\varphi_1$, and is the largest among the phase differences between two adjacent antennas in all the vectors.

Further, a form of the vector that forms the precoding matrix set is as follows:

$$B = [v_0 \; v_1 \; \ldots \; v_{N-1}] = \begin{bmatrix} a_{0,0} & a_{0,1} & \ldots & a_{0,N-1} \\ a_{1,0} & a_{1,1}e^{j\frac{\varphi_1}{N-1}} & \ldots & a_{1,N-1}e^{j\varphi_1} \\ \vdots & \vdots & a_{m,n}e^{j\frac{mn\varphi_1}{N-1}} & \vdots \\ a_{M-1,0} & a_{M-1,1}e^{j(M-1)\frac{\varphi_1}{N-1}} & \ldots & a_{M-1,N-1}e^{j(M-1)\varphi_1} \end{bmatrix};$$

where

B is the precoding matrix set, $v_n$ is the $n^{th}$ vector in the precoding matrix set, the amplitude $a_{m,n}$ is a real number, and 0≤m<M, 0≤n<N.

Embodiment 2

In Embodiment 2 of the present invention, the parameter used for determining the precoding matrix set includes at least one of a first phase value $\varphi_1$, an amplitude $a_{m,n}$ of an element (m, n) in the precoding matrix set, the quantity N of vectors in the precoding matrix set, and a quantity M of elements in each vector in the precoding matrix set. Others, except the parameter, in the first phase value $\varphi_1$, the amplitude $a_{m,n}$ of the element (m, n) in the precoding matrix set, the quantity N of vectors in the precoding matrix set, and the quantity M of elements in each vector in the precoding matrix set are preset.

For example, $\varphi_1$ and N may be obtained by using the first parameter indication information or in an implicit manner, and others are fixed; or N may be obtained by using the first parameter indication information or in an implicit manner, and others are fixed; or $\varphi_1$ may be obtained by using the first parameter indication information or in an implicit manner, and others are fixed.

Accordingly, the determining the precoding matrix set by using the parameter includes:

determining, by using a phase range $$\left[0, \frac{(N-1)\varphi_1}{N}\right],$$

the amplitude $a_{m,n}$, the quantity N, and the quantity M, a vector that forms the precoding matrix set; where 0 is a minimum value of a phase difference between two adjacent antennas in a vector in the precoding matrix set; and $$\frac{(N-1)\varphi_1}{N}$$

is a maximum value of the phase difference between two adjacent antennas in the vector in the precoding matrix set.

B represents the precoding matrix set, and the vector that forms B is [$v_0$ $v_1$ ... $v_{N-1}$], where different elements in each vector are corresponding to different antennas, for example, $$v_n = \begin{bmatrix} v_{0,n} \\ v_{1,n} \\ \vdots \\ v_{M-1,n} \end{bmatrix},$$

$v_{0,n}$ is corresponding to a weighted value of the $0^{th}$ antenna, $v_{1,n}$ is corresponding to a weighted value of the first antenna, and $v_{M-1,n}$ is corresponding to a weighted value of the $(M-1)^{th}$ antenna.

A phase difference between two adjacent antennas in the $n^{th}$ vector $v_n$ is $$\frac{n\varphi_1}{N}.$$

A phase difference between two adjacent antennas in $v_0$ is 0, and is the smallest among phase differences between two adjacent antennas in all the vectors. A phase difference between two adjacent antennas in $v_{N-1}$ is $$\frac{(N-1)\varphi_1}{N},$$

and is the largest among the phase differences between two adjacent antennas in all the vectors.

Further, a form of the vector that forms the precoding matrix set is as follows:

$$B = [v_0 \quad v_1 \quad \ldots \quad v_{N-1}] =$$

$$\begin{bmatrix} a_{0,0} & a_{0,1} & \ldots & a_{0,N-1} \\ a_{1,0} & a_{1,1}e^{j\frac{\varphi_1}{N}} & \ldots & a_{1,N-1}e^{j\frac{(N-1)\varphi_1}{N}} \\ \vdots & \vdots & a_{m,n}e^{j\frac{mn\varphi_1}{N}} & \vdots \\ a_{M-1,0} & a_{M-1,1}e^{j(M-1)\frac{\varphi_1}{N}} & \ldots & a_{M-1,N-1}e^{j(M-1)\frac{(N-1)\varphi_1}{N}} \end{bmatrix};$$

where

B is the precoding matrix set, $v_n$ is the $n^{th}$ vector in the precoding matrix set, the amplitude $a_{m,n}$ is a real number, and 0≤m<M, 0≤n<N.

Embodiment 3

In Embodiment 3 of the present invention, the parameter used for determining the precoding matrix set includes at least one of a second phase value $\varphi_2$, a third phase value $\varphi_3$, an amplitude $a_{m,n}$ of an element (m, n) in the precoding matrix set, the quantity N of vectors in the precoding matrix set, and a quantity M of elements in each vector in the precoding matrix set. Others, except the parameter, in the second phase value $\varphi_2$, the third phase value $\varphi_3$, the amplitude $a_{m,n}$ of the element (m, n) in the precoding matrix set, the quantity N of vectors in the precoding matrix set, and the quantity M of elements in each vector in the precoding matrix set are preset.

For example, $\varphi_2$, $\varphi_3$, and N may be obtained by using the first parameter indication information or in an implicit manner, and others are fixed; or N may be obtained by using the first parameter indication information or in an implicit manner, and others are fixed; or $\varphi_2$ and $\varphi_3$ may be obtained by using the first parameter indication information or in an implicit manner, and others are fixed.

Accordingly, the determining the precoding matrix set by using the parameter includes:

determining, by using a phase range [$\varphi_2,\varphi_3$], the amplitude $a_{m,n}$, the quantity N, and the quantity M, a vector that forms the precoding matrix set; where the second phase value $\varphi_2$ is a minimum value of a phase difference between two adjacent antennas in a vector in the precoding matrix set; and the third phase value $\varphi_3$ is a maximum value of the phase difference between two adjacent antennas in the vector in the precoding matrix set.

B represents the precoding matrix set, and the vector that forms B is [$v_0$ $v_1$ ... $v_{N-1}$], where different elements in each vector are corresponding to different antennas, for example, $$v_n = \begin{bmatrix} v_{0,n} \\ v_{1,n} \\ \vdots \\ v_{M-1,n} \end{bmatrix},$$

$v_{0,n}$ is corresponding to a weighted value of the $0^{th}$ antenna, $v_{1,n}$ is corresponding to a weighted value of the first antenna, and $v_{M-1,n}$ is corresponding to a weighted value of the $(M-1)^{th}$ antenna.

A phase difference between two adjacent antennas in the $n^{th}$ vector $v_n$ is $\varphi_2 + n\Delta$, where $$\Delta = \frac{\varphi_3 - \varphi_2}{N-1}.$$

A phase difference between two adjacent antennas in $v_0$ is $\varphi_2$, and is the smallest among phase differences between two adjacent antennas in all the vectors. A phase difference between two adjacent antennas in $v_{N-1}$ is $\varphi_3$, and is the largest among the phase differences between two adjacent antennas in all the vectors.

Phase differences between two $m^{th}$ antennas in every two adjacent vectors in B are the same, and are $m\Delta$.

Further, a form of the vector that forms the precoding matrix set is as follows:

$$B = [v_0 \quad v_1 \quad \ldots \quad v_{N-1}]$$
$$= \begin{bmatrix} a_{0,0} & a_{0,1} & \cdots & a_{0,N-1} \\ a_{1,0}e^{j\varphi_2} & a_{1,1}e^{j(\varphi_2+\Delta)} & \cdots & a_{1,N-1}e^{j\varphi_3} \\ \vdots & \vdots & a_{m,n}e^{jm(\varphi_2+n\Delta)} & \vdots \\ a_{M-1,0} & a_{M-1,1} & & a_{M-1,N-1} \\ e^{j(M-1)\varphi_2} & e^{j(M-1)(\varphi_2+\Delta)} & \cdots & e^{j(M-1)\varphi_3} \end{bmatrix};$$

where $$\Delta = \frac{\varphi_3 - \varphi_2}{N-1};$$

and

B is the precoding matrix set, $v_n$ is the $n^{th}$ vector in the precoding matrix set, the amplitude $a_{m,n}$ is a real number, $0 \leq m < M$, $0 \leq n < N$, a phase difference between two adjacent antennas in the $n^{th}$ vector in the precoding matrix set is $\varphi_2 + n\Delta$, and a phase difference between two $m^{th}$ antennas in two adjacent vectors in the precoding matrix set is $m\Delta$.

Embodiment 4

In Embodiment 4 of the present invention, the parameter used for determining the precoding matrix set includes at least one of a second phase value $\varphi_2$, a third phase value $\varphi_3$, an amplitude $a_{m,n}$ of an element (m, n) in the precoding matrix set, a quantity N of vectors in the precoding matrix set, a quantity M of elements in each vector in the precoding matrix set, and an integer L, and others, except the parameter, in the second phase value $\varphi_2$, the third phase value $\varphi_3$, the amplitude $a_{m,n}$ of the element (m, n) in the precoding matrix set, the quantity N of vectors in the precoding matrix set, the quantity M of elements in each vector in the precoding matrix set, and the integer L are preset.

For example, $\varphi_2$, $\varphi_3$, and N may be obtained by using the first parameter indication information or in an implicit manner, and others are fixed; or N may be obtained by using the first parameter indication information or in an implicit manner, and others are fixed; or $\varphi_2$ and $\varphi_3$ may be obtained by using the first parameter indication information or in an implicit manner, and others are fixed.

Accordingly, the determining the precoding matrix set by using the parameter includes:

determining, by using a phase range $$\left[\frac{\varphi_2}{L}, \frac{\varphi_3}{L}\right],$$

the amplitude $a_{m,n}$, the quantity N, and the quantity M, a vector that forms the precoding matrix set; where $$\frac{\varphi_2}{L}$$

is a minimum value of a phase difference between two adjacent antennas in a vector in the precoding matrix set; and $$\frac{\varphi_3}{L}$$

is a maximum value of the phase difference between two adjacent antennas in the vector in the precoding matrix set.

B represents the precoding matrix set, and the vector that forms B is $[v_0 \, v_1 \ldots v_{N-1}]$, where different elements in each vector are corresponding to different antennas, for example, $$v_n = \begin{bmatrix} v_{0,n} \\ v_{1,n} \\ \vdots \\ v_{M-1,n} \end{bmatrix},$$

$v_{0,n}$ is corresponding to a weighted value of the $0^{th}$ antenna, $v_{1,n}$ is corresponding to a weighted value of the first antenna, and $v_{M-1,n}$ is corresponding to a weighted value of the $(M-1)^{th}$ antenna.

A phase difference between two adjacent antennas in the $n^{th}$ vector $v_n$ is $$\frac{\varphi_2}{L} + n\Delta,$$

where $$\Delta = \frac{\varphi_3 - \varphi_2}{L(N-1)}.$$

A phase difference between two adjacent antennas in $v_0$ is $$\frac{\varphi_2}{L},$$

and is the smallest among phase differences between two adjacent antennas in all the vectors. A phase difference between two adjacent antennas in $v_{N-1}$ is $$\frac{\varphi_3}{L},$$

and is the largest among the phase differences between two adjacent antennas in all the vectors.

Phase differences between two $m^{th}$ antennas in every two adjacent vectors in B are the same, and are $m\Delta$.

Further, a form of the vector that forms the precoding matrix set is as follows:

$$B = [\, v_0 \quad v_1 \quad \ldots \quad v_{N-1}\,]$$

$$= \begin{bmatrix} a_{0,0} & a_{0,1} & \ldots & a_{0,N-1} \\ a_{1,0}e^{j\frac{\varphi_2}{L}} & a_{1,1}e^{j(\frac{\varphi_2}{L}+\Delta)} & \ldots & a_{1,N-1}e^{j\frac{\varphi_3}{L}} \\ \vdots & \vdots & a_{m,n} & \vdots \\ & & e^{jm(\frac{\varphi_2}{L}+n\Delta)} & \\ a_{M-1,0}e^{j(M-1)\frac{\varphi_2}{L}} & a_{M-1,1}{e^{j(M-1)(\frac{\varphi_2}{L}+\Delta)}} & \ldots & a_{M-1,N-1} \\ & & & e^{(M-1)\frac{\varphi_3}{L}} \end{bmatrix};$$

where $$\Delta = \frac{\varphi_3 - \varphi_2}{L(N-1)};$$

and

B is the precoding matrix set, $v_n$ is the $n^{th}$ vector in the precoding matrix set, the amplitude $a_{m,n}$ is a real number, $0 \le m < M$, $0 \le n < N$, a phase difference between two adjacent antennas in the $n^{th}$ vector in the precoding matrix set is $$\frac{\varphi_2}{L} + n\Delta,$$

and a phase $m\Delta$.

Embodiment 5

In Embodiment 5 of the present invention, the parameter used for determining the precoding matrix set includes at least one of a second phase value $\varphi_2$, a third phase value $\varphi_3$, a phase interval $\Delta$, an amplitude $a_{m,n}$ of an element (m, n) in the precoding matrix set, and a quantity M of elements in each vector in the precoding matrix set. Others, except the parameter, in the second phase value $\varphi_2$, the third phase value $\varphi_3$, the phase interval $\Delta$, the amplitude $a_{m,n}$ of the element (m, n) in the precoding matrix set, and the quantity M of elements in each vector in the precoding matrix set are preset.

For example, $\varphi_2$, $\varphi_3$, and $\Delta$ may be obtained by using the first parameter indication information or in an implicit manner, and others are fixed; or $\Delta$ may be obtained by using the first parameter indication information or in an implicit manner, and others are fixed; or $\varphi_2$ and $\varphi_3$ may be obtained by using the first parameter indication information or in an implicit manner, and others are fixed.

Accordingly, the determining the precoding matrix set by using the parameter includes:

determining, by using a phase range $[\varphi_2, \varphi_3]$, the phase interval $\Delta$, the amplitude $a_{m,n}$, and the quantity M, a vector that forms the precoding matrix set; where the second phase value $\varphi_2$ is a minimum value of a phase difference between two adjacent antennas in a vector in the precoding matrix set;

the third phase value $\varphi_3$ is a maximum value of the phase difference between two adjacent antennas in the vector in the precoding matrix set; and a phase difference between two adjacent antennas in the $n^{th}$ vector in the precoding matrix set is $\varphi_2 + n\Delta$, a phase difference between two $m^{th}$ antennas in two adjacent vectors in the precoding matrix set is $m\Delta$, $0 \le m < M$, $0 \le n < N$, N is the quantity of vectors in the precoding matrix set, $$\Delta = \frac{\varphi_3 - \varphi_2}{N - 1}.$$

B represents the precoding matrix set, and the vector that forms B is $[v_0\ v_1\ \ldots\ v_{N-1}]$, where different elements in each vector are corresponding to different antennas, for example, $$v_n = \begin{bmatrix} v_{0,n} \\ v_{1,n} \\ \vdots \\ v_{M-1,n} \end{bmatrix},$$

$v_{0,n}$ is corresponding to a weighted value of the $0^{th}$ antenna, $v_{1,n}$ is corresponding to a weighted value of the first antenna, and $v_{M-1,n}$ is corresponding to a weighted value of the $(M-1)^{th}$ antenna.

A phase difference between two adjacent antennas in the $n^{th}$ vector $v_n$ is $\varphi_2 + n\Delta$. A phase difference between two adjacent antennas in $v_0$ is $\varphi_2$, and is the smallest among phase differences between two adjacent antennas in all the vectors. A phase difference between two adjacent antennas in $v_{N-1}$ is $\varphi_3$, and is the largest among the phase differences between two adjacent antennas in all the vectors.

Phase differences between two $m^{th}$ antennas in every two adjacent vectors in B are the same, and are $m\Delta$.

Further, a form of the vector that forms the precoding matrix set is as follows:

$$B = [\, v_0 \quad v_1 \quad \ldots \quad v_{N-1}\,]$$

$$= \begin{bmatrix} a_{0,0} & a_{0,1} & \ldots & a_{0,N-1} \\ a_{1,0}e^{j\varphi_2} & a_{1,1}e^{j(\varphi_2+\Delta)} & \ldots & a_{1,N-1}e^{j\varphi_3} \\ \vdots & \vdots & a_{m,n} & \vdots \\ & & e^{jm(\varphi_2+n\Delta)} & \\ a_{M-1,0}e^{j(M-1)\varphi_2} & a_{M-1,1}e^{j(M-1)(\varphi_2+\Delta)} & \ldots & a_{M-1,N-1} \\ & & & e^{j(M-1)\varphi_3} \end{bmatrix};$$

where

B is the precoding matrix set, $v_n$ is the $n^{th}$ vector in the precoding matrix set, and the amplitude $a_{m,n}$ is a real number.

Embodiment 6

In Embodiment 6 of the present invention, the parameter used for determining the precoding matrix set includes at least one of a second phase value $\varphi_2$, a third phase value $\varphi_3$, a phase interval $\Delta$, an amplitude $a_{m,n}$ of an element (m, n) in the precoding matrix set, a quantity M of elements in each vector in the precoding matrix set, and an integer L, and others, except the parameter, in the second phase value $\varphi_2$, the third phase value $\varphi_3$, the phase interval $\Delta$, the amplitude $a_{m,n}$ of the element (m, n) in the precoding matrix set, the quantity M of elements in each vector in the precoding matrix set, and the integer L are preset.

For example, $\varphi_2$, $\varphi_3$, and $\Delta$ may be obtained by using the first parameter indication information or in an implicit manner, and others are fixed; or $\Delta$ may be obtained by using the first parameter indication information or in an implicit manner, and others are fixed; or $\varphi_2$ and $\varphi_3$ may be obtained by using the first parameter indication information or in an implicit manner, and others are fixed.

Accordingly, the determining the precoding matrix set by using the parameter includes:

determining, by using a phase range $$\left[\frac{\varphi_2}{L}, \frac{\varphi_3}{L}\right],$$

the phase interval $\Delta$, the amplitude $a_{m,n}$, and the quantity M, a vector that forms the precoding matrix set; where $$\frac{\varphi_2}{L}$$

is a minimum value of a phase difference between two adjacent antennas in a vector in the precoding matrix set;

$$\frac{\varphi_3}{L}$$

is a maximum value of the phase difference between two adjacent antennas in the vector in the precoding matrix set; and a phase difference between two adjacent antennas in the $n^{th}$ vector in the precoding matrix set is $$\frac{\varphi_2}{L} + n\Delta,$$

a phase difference between two $m^{th}$ antennas in two adjacent vectors in the precoding matrix set is $m\Delta$, $0 \leq m < M$, $0 \leq n < N$, N is the quantity of vectors in the precoding matrix set, and $$\Delta = \frac{\varphi_3 - \varphi_2}{L(N-1)}.$$

B represents the precoding matrix set, and the vector that forms B is $[v_0 \ v_1 \ \ldots \ v_{N-1}]$, where different elements in each vector are corresponding to different antennas, for example, $$v_n = \begin{bmatrix} v_{0,n} \\ v_{1,n} \\ \vdots \\ v_{M-1,n} \end{bmatrix},$$

$v_{0,n}$ is corresponding to a weighted value of the $0^{th}$ antenna, $v_{1,n}$ is corresponding to a weighted value of the first antenna, and $v_{M-1,n}$ is corresponding to a weighted value of the $(M-1)^{th}$ antenna.

A phase difference between two adjacent antennas in the $n^{th}$ vector $v_n$ is $$\frac{\varphi_2}{L} + n\Delta.$$

A phase difference between two adjacent antennas in $v_0$ is $$\frac{\varphi_2}{L},$$

and is the smallest among phase differences between two adjacent antennas in all the vectors. A phase difference between two adjacent antennas in $v_{N-1}$ is $$\frac{\varphi_3}{L},$$

and is the largest among the phase differences between two adjacent antennas in all the vectors.

Phase differences between two $m^{th}$ antennas in every two adjacent vectors in B are the same, and are $m\Delta$.

Further, a form of the vector that forms the precoding matrix set is as follows:

$$B = \begin{bmatrix} v_0 & v_1 & \ldots & v_{N-1} \end{bmatrix}$$

$$= \begin{bmatrix} a_{0,0} & a_{0,1} & \ldots & a_{0,N-1} \\ a_{1,0}e^{j\frac{\varphi_2}{L}} & a_{1,1}e^{j(\frac{\varphi_2}{L}+\Delta)} & \ldots & a_{1,N-1}e^{j\frac{\varphi_3}{L}} \\ \vdots & \vdots & a_{m,n}e^{jm(\frac{\varphi_2}{L}+n\Delta)} & \vdots \\ a_{M-1,0}e^{j(M-1)\frac{\varphi_2}{L}} & a_{M-1,1}e^{j(M-1)(\frac{\varphi_2}{L}+\Delta)} & \ldots & a_{M-1,N-1}e^{j(M-1)\frac{\varphi_3}{L}} \end{bmatrix};$$

where

B is the precoding matrix set, $v_n$ is the $n^{th}$ vector in the precoding matrix set, and the amplitude $a_{m,n}$ is a real number.

Embodiment 7

In Embodiment 7 of the present invention, the parameter used for determining the precoding matrix set includes at least one of the following: K second phase values, K third phase values, an amplitude $a_{m,n}$ of an element (m, n) in a precoding matrix subset, a quantity of vectors in K precoding matrix subsets, and a quantity M of elements in each vector in a precoding matrix subset, $\varphi_{2,k}$ represents the $k^{th}$ second phase value, $\varphi_{3,k}$ represents the $k^{th}$ third phase value, k represents a quantity of vectors in the $k^{th}$ precoding matrix subset, $1 \leq k \leq K$, and others, except the parameter, in the K second phase values, the K third phase values, the amplitude $a_{m,n}$ of the element (m, n) in the precoding matrix subset, the quantity of vectors in the K precoding matrix subsets, and the quantity M of elements in each vector in the precoding matrix subset are preset.

For example, the K second phase values, the K third phase values, and the quantity of vectors in the K precoding matrix subsets may be obtained by using the first parameter indication information or in an implicit manner, and others are fixed; or the quantity of vectors in the K precoding matrix subsets may be obtained by using the first parameter indication information or in an implicit manner, and others are fixed; or the K second phase values and the K third phase values may be obtained by using the first parameter indication information or in an implicit manner, and others are fixed.

Accordingly, the determining the precoding matrix set by using the parameter includes:

determining a precoding matrix subset for each group of the second phase value and the third phase value; where determining the corresponding $k^{th}$ precoding matrix subset for $\varphi_{2,k}$ and $\varphi_{3,k}$ includes:

determining, by using the phase value $\varphi_{2,k}$, the phase value $\varphi_{3,k}$, the amplitude $a_{m,n}$, the quantity $N_k$, and the quantity M, a vector that forms the precoding matrix subset, where the phase value $\varphi_{2,k}$ is a minimum value of a phase difference between two adjacent antennas in a vector in the precoding matrix subset, and the phase value $\varphi_{3,k}$ is a maximum value of a phase difference between two adjacent antennas in a vector in the precoding matrix set; and forming the precoding matrix set by using the precoding matrix subsets separately determined for all the groups of the second phase value and the third phase value.

B represents the precoding matrix set, the vector that forms B is $[B_1 \ B_2 \ldots B_K]$, and the vector that forms $B_k$ $[v_0^k \ v_1^k \ldots v_{k-1}^k]$, where different elements in each vector are corresponding to different antennas, for example, $$v_n^k = \begin{bmatrix} v_{0,n}^k \\ v_{1,n}^k \\ \vdots \\ v_{M-1,n}^k \end{bmatrix},$$

$v_{0,n}^k$ is corresponding to a weighted value of the $0^{th}$ antenna, $v_{1,n}^k$ is corresponding to a weighted value of the first antenna, and $v_{M-1,n}^k$ is corresponding to a weighted value of the $(M-1)^{th}$ antenna.

In $B_k$, a phase difference between two adjacent antennas in the $n^{th}$ vector $v_n^k$ is $\varphi_{2,k} + n\Delta_k$, where $$\Delta_k = \frac{\varphi_{3,k} - \varphi_{2,k}}{N_k - 1}.$$

A phase difference between two adjacent antennas in $v_0^k$ is $\varphi_{2,k}$ and is the smallest among phase differences between two adjacent antennas in all the vectors. A phase difference between two adjacent antennas in $v_{N_k-1}^k$ is $\varphi_{3,k}$ and is the largest among the phase differences between two adjacent antennas in all the vectors.

Phase differences between two $m^{th}$ antennas in every two adjacent vectors in $B_k$ are the same, and are $m\Delta_k$.

Further, a form of the vector that forms the precoding matrix set and a form of the vector that forms the $k^{th}$ precoding matrix subset are as follows:

$$B = [B_1 \ B_2 \ \ldots \ B_K]; \text{ and}$$

$$B_k = [v_0^k \ v_1^k \ \ldots \ v_{N_k-1}^k]$$
$$= \begin{bmatrix} a_{0,0} & a_{0,1} & \ldots & a_{0,N-1} \\ a_{1,0}e^{j\varphi_{2,k}} & a_{1,1}e^{j(\varphi_{2,k}+\Delta_k)} & \ldots & a_{1,N-1}e^{j\varphi_{3,k}} \\ \vdots & \vdots & a_{m,n}e^{jm(\varphi_{2,k}+n\Delta_k)} & \vdots \\ a_{M-1,0}e^{j(M-1)\varphi_{2,k}} & a_{M-1,1}e^{j(M-1)(\varphi_{2,k}+\Delta_k)} & \ldots & a_{M-1,N-1}e^{j(M-1)\varphi_{3,k}} \end{bmatrix};$$

where $$\Delta_k = \frac{\varphi_{3,k} - \varphi_{2,k}}{N_k - 1};$$

and

B is the precoding matrix set, $B_k$ is the $k^{th}$ precoding matrix subset, $v_n^k$ is the $n^{th}$ vector in the $k^{th}$ precoding matrix subset, $a_{m,n}$ is the amplitude of the element (m, n) and is a real number, a phase difference between two adjacent antennas in the $n^{th}$ vector in the $k^{th}$ precoding matrix subset is $\varphi_{2,k} + n\Delta_k$, a phase difference between two $m^{th}$ antennas in two adjacent vectors in the $k^{th}$ precoding matrix subset is $m\Delta_k$, and $0 \leq m < M$, $0 \leq n < N_k$.

In Embodiment 7 of the present invention, at least two groups in the K second phase values $\varphi_{2,k}$ and $\varphi_{3,k}$ may be different.

At least two of quantities $N_k$ of vectors in the K precoding matrix subsets may be different.

Embodiment 8

In Embodiment 8 of the present invention, the parameter used for determining the precoding matrix set includes at least one of the following: K second phase values, K third phase values, K phase intervals, an amplitude $a_{m,n}$ of an element (m, n) in a precoding matrix subset, and a quantity M of elements in each vector in a precoding matrix subset, $\varphi_{2,k}$ represents the $k^{th}$ second phase value, $\varphi_{3,k}$ represents the $k^{th}$ third phase value, $\Delta_k$ represents the $k^{th}$ phase interval, $1 \leq k \leq K$, and others, except the parameter, in the K second phase values, the K third phase values, the K phase intervals, the amplitude $a_{m,n}$ of the element (m, n) in the precoding matrix subset, and the quantity M of elements in each vector in the precoding matrix subset are preset.

For example, the K second phase values, the K third phase values, and the K phase intervals may be obtained by using the first parameter indication information or in an implicit manner, and others are fixed; or the K phase intervals may be obtained by using the first parameter indication information or in an implicit manner, and others are fixed; or the K second phase values and the K third phase values may be obtained by using the first parameter indication information or in an implicit manner, and others are fixed.

Accordingly, the determining the precoding matrix set by using the parameter includes:

determining a precoding matrix subset for each group of the second phase value and the third phase value; where determining a corresponding $k^{th}$ precoding matrix subset for $\varphi_{2,k}$ and $\varphi_{3,k}$ includes:

determining, by using the phase value $\varphi_{2,k}$, the phase value $\varphi_{3,k}$, the phase interval $\Delta_k$, the amplitude $a_{m,n}$, and the quantity M, a vector that forms the precoding matrix subset, where the phase value $\varphi_{2,k}$ is a minimum value of a phase difference between two adjacent antennas in a vector in the precoding matrix subset, the phase value $\varphi_{3,k}$ is a maximum value of a phase difference between two adjacent antennas in a vector in the precoding matrix subset, a phase difference between two adjacent antennas in the $n^{th}$ vector in the $k^{th}$ precoding matrix subset is $\varphi_{2,k} + n\Delta_k$, a phase difference between two $m^{th}$ antennas in two adjacent vectors in the $k^{th}$ precoding matrix subset is $m\Delta_k$, $0 \leq m < M$, $0 \leq n < N_k$, $N_k$ is a quantity of vectors in the $k^{th}$ precoding matrix subset, and $$\Delta_k = \frac{\varphi_{3,k} - \varphi_{2,k}}{N_k - 1};$$

and forming the precoding matrix set by using the precoding matrix subsets separately determined for all the groups of the second phase value and the third phase value.

B represents the precoding matrix set, a vector that forms B is $[B_1, B_2 \ldots B_K]$, and the vector that forms $B_k$ is $[v_0^k\ v_1^k\ \ldots\ v_{N_k-1}^k]$, here different elements in each vector are corresponding to different antennas, for example, $$v_n^k = \begin{bmatrix} v_{0,n}^k \\ v_{1,n}^k \\ \vdots \\ v_{M-1,n}^k \end{bmatrix},$$

$v_{0,n}^k$ is corresponding to a weighted value of the $0^{th}$ antenna, $v_{1,n}^k$ is corresponding to a weighted value of the first antenna, and $v_{M-1,n}^k$ is corresponding to a weighted value of the $(M-1)^{th}$ antenna.

In $B_k$, a phase difference between two adjacent antennas in the $n^{th}$ vector $v_n^k$ is $\varphi_{2,k} + n\Delta_k$. A phase difference between two adjacent antennas in $v_0^k$ is $\varphi_{2,k}$, and is the smallest among phase differences between two adjacent antennas in all the vectors. A phase difference between two adjacent antennas in $v_{N_k-1}^k$ is $\varphi_{3,k}$, and is the largest among the phase differences between two adjacent antennas in all the vectors.

Phase differences between two $m^{th}$ antennas in every two adjacent vectors in $B_k$ are the same, and are $m\Delta_k$.

Further, a form of a vector that forms the precoding matrix set and a form of the vector that forms the $k^{th}$ precoding matrix subset are as follows:

$$B = [B_1\ B_2\ \ldots\ B_K]; \text{ and}$$

$$B_k = [v_0^k\ v_1^k\ \ldots\ v_{N_k-1}^k]$$
$$= \begin{bmatrix} a_{0,0} & a_{0,1} & \cdots & a_{0,N-1} \\ a_{1,0}e^{j\varphi_{2,k}} & a_{1,1}e^{j(\varphi_{2,k}+\Delta_k)} & \cdots & a_{1,N-1}e^{j\varphi_{3,k}} \\ \vdots & \vdots & a_{m,n}e^{jm(\varphi_{2,k}+n\Delta_k)} & \vdots \\ a_{M-1,0} & a_{M-1,1} & & a_{M-1,N-1} \\ e^{j(M-1)\varphi_{2,k}} & e^{j(M-1)(\varphi_{2,k}+\Delta_k)} & \cdots & e^{j(M-1)\varphi_{3,k}} \end{bmatrix}$$

where

B is the precoding matrix set, $B_k$ is the $k^{th}$ precoding matrix subset, $v_n^k$ is the $n^{th}$ vector in the $k^{th}$ precoding matrix subset, and $a_{m,n}$ is the amplitude of the element (m, n) and is a real number.

For example, for a dual-codebook structure, W=W1*W2; W1 mainly reflects a long-term feature of a channel.

$$W1 = \begin{bmatrix} U & 0 \\ 0 & U \end{bmatrix}, U \in \{B_1, B_2, \ldots B_K\}, \text{ and } W2 \in \{A_1, A_2, \ldots, A_K\}.$$

The matrix $B_k$ in W1 may be of the above form. For W2, $$A_k = \frac{1}{\sqrt{M}} \begin{bmatrix} Y_1^k \\ \alpha_1^k Y_2^k \end{bmatrix},$$

where $$Y_1^k \in \left\{\tilde{e}_1, \tilde{e}_2, \ldots, \tilde{e}_{\frac{M}{2}}\right\}, \text{ and } Y_2^k \in \left\{\tilde{e}_1, \tilde{e}_2, \ldots, \tilde{e}_{\frac{M}{2}}\right\}$$

That is, for W2, there may also be K groups of parameters for determining precoding vectors included in the precoding matrix subsets, and a quantity of precoding matrix subsets may be different from that in W1, for example, the quantity of precoding matrix subsets is not K. For ease of description, it is assumed herein that the quantities are the same, $Y_1$, $Y_2$, and $\alpha$ that are corresponding to each subset, or a quantity of vectors included in each subset is separately determined, and these parameters in different subsets may be different.

In Embodiment 8 of the present invention, at least two groups in the K second phase values $\varphi_{2,k}$ and $\varphi_{3,k}$ may be different.

At least two of the K phase intervals $\Delta_k$ may be different.

Embodiment 9

In Embodiment 9 of the present invention, the parameter used for determining the precoding matrix set includes at least one of a fourth phase value $\varphi_4$, a phase interval $\Delta$, an amplitude $a_{m,n}$ of an element (m, n) in the precoding matrix set, the quantity N of vectors in the precoding matrix set, and a quantity M of elements in each vector in the precoding matrix set. Others, except the parameter, in the fourth phase value $\varphi_4$, the phase interval $\Delta$, the amplitude $a_{m,n}$ of the element (m, n) in the precoding matrix set, the quantity N of vectors in the precoding matrix set, and the quantity M of elements in each vector in the precoding matrix set are preset.

For example, $\varphi_4$ and $\Delta$ may be obtained by using the first parameter indication information or in an implicit manner, and others are fixed; or $\Delta$ may be obtained by using the first parameter indication information or in an implicit manner, and others are fixed; or $\varphi_4$ may be obtained by using the first parameter indication information or in an implicit manner, and others are fixed.

Accordingly, the determining the precoding matrix set by using the parameter includes:

determining, by using the fourth phase value $\varphi_4$, the phase interval $\Delta$, the amplitude $a_{m,n}$, the quantity N, and the quantity M, a vector that forms the precoding matrix set; where the fourth phase value $\varphi_4$ is a minimum value of a phase difference between two adjacent antennas in a vector in the precoding matrix set; and a phase difference between two adjacent antennas in the $n^{th}$ vector in the precoding matrix set is $\varphi_4+n\Delta$, a phase difference between two $m^{th}$ antennas in two adjacent vectors in the precoding matrix set is $m\Delta$, and $0\le m<M$, $0\le n<N$.

B represents the precoding matrix set, and the vector that forms B is $[v_0\ v_1\ \ldots\ v_{N-1}]$, where different elements in each vector are corresponding to different antennas, for example, $$v_n = \begin{bmatrix} v_{0,n} \\ v_{1,n} \\ \vdots \\ v_{M-1,n} \end{bmatrix},$$

$v_{0,n}$ is corresponding to a weighted value of the $0^{th}$ antenna, $v_{1,n}$ is corresponding to a weighted value of the first antenna, and $v_{M-1,n}$ is corresponding to a weighted value of the $(M-1)^{th}$ antenna.

A phase difference between two adjacent antennas in the $n^{th}$ vector $v_n$ is $\varphi_4+n\Delta$. A phase difference between two adjacent antennas in $v_0$ is $\varphi_4$, and is the smallest among phase differences between two adjacent antennas in all the vectors. A phase difference between two adjacent antennas in $v_{N-1}$ is $\varphi_4+(N-1)\Delta$, and is the largest among the phase differences between two adjacent antennas in all the vectors.

Phase differences between two $m^{th}$ antennas in every two adjacent vectors in B are the same, and are $m\Delta$.

Further, a form of the vector that forms the precoding matrix set is as follows:

$$B = [v_0\ v_1\ \ldots\ v_{N-1}]$$

$$= \begin{bmatrix} a_{0,0} & a_{0,1} & \cdots & a_{0,N-1} \\ a_{1,0}e^{j\varphi_4} & a_{1,1}e^{j(\varphi_4+\Delta)} & \cdots & a_{1,N-1}e^{j(\varphi_4+(N-1)\Delta)} \\ \vdots & \vdots & a_{m,n}e^{jm(\varphi_4+n\Delta)} & \vdots \\ a_{M-1,0} & a_{M-1,1} & & a_{M-1,N-1} \\ e^{j(M-1)\varphi_4} & e^{j(M-1)(\varphi_4+\Delta)} & \cdots & e^{j(M-1)(\varphi_4+(N-1)\Delta)} \end{bmatrix};$$

where

B is the precoding matrix set, $v_n$ is the $n^{th}$ vector in the precoding matrix set, and the amplitude $a_{m,n}$ is a real number.

Embodiment 10

In Embodiment 10 of the present invention, the parameter used for determining the precoding matrix set includes at least one of the following: K fourth phase values, K phase intervals, an amplitude $a_{m,n}$ of an element (m, n) in a precoding matrix subset, a quantity of vectors in K precoding matrix subsets, and a quantity M of elements in each vector in a precoding matrix subset, $\varphi_{4,k}$ represents the $k^{th}$ fourth phase value, $\Delta_k$ represents the $k^{th}$ phase interval, $N_k$ represents a quantity of vectors in the $k^{th}$ precoding matrix subset, $1\le k\le K$, and others, except the parameter, in the K fourth phase values, the K phase intervals, the amplitude $a_{m,n}$ of the element (m, n) in the precoding matrix subset, the quantity of vectors in the K precoding matrix subsets, and the quantity M of elements in each vector in the precoding matrix subset are preset.

For example, the K fourth phase values and the K phase intervals may be obtained by using the first parameter indication information or in an implicit manner, and others are fixed; or the K phase intervals may be obtained by using the first parameter indication information or in an implicit manner, and others are fixed; or the K fourth phase values may be obtained by using the first parameter indication information or in an implicit manner, and others are fixed.

Accordingly, the determining the precoding matrix set by using the parameter includes:

determining a precoding matrix subset for each phase interval; where determining the corresponding $k^{th}$ precoding matrix subset for $\varphi_{4,k}$ and $\Delta_k$ includes:

determining, by using the phase value $\varphi_{4,k}$, the phase interval $\Delta_k$, the amplitude $a_{m,n}$, the quantity $N_k$, and the quantity M, a vector that forms the precoding matrix subset, where the phase value $\varphi_{4,k}$ is a minimum value of a phase difference between two adjacent antennas in a vector in the precoding matrix subset, a phase difference between two adjacent antennas in the $n^{th}$ vector in the $k^{th}$ precoding matrix subset is $\varphi_{4,k}+n\Delta_k$, a phase difference between two $m^{th}$ antennas in two adjacent vectors in the $k^{th}$ precoding matrix subset is $m\Delta_k$, and $0\le m<M$, $0\le n<N_k$; and forming the precoding matrix set by using the precoding matrix subsets separately determined for all the phase intervals.

B represents the precoding matrix set, a vector that forms B is $[B_1\ B_2\ \ldots\ B_K]$, and the vector that forms $B_k$ is $[v_0^k\ v_1^k\ \ldots\ v_{N_k-1}^k]$, where different elements in each vector are corresponding to different antennas, for example, $$v_n^k = \begin{bmatrix} v_{0,n}^k \\ v_{1,n}^k \\ \vdots \\ v_{M-1,n}^k \end{bmatrix},$$

$v_{0,n}^k$ is corresponding to a weighted value of the $0^{th}$ antenna, $v_{1,n}^k$ is corresponding to a weighted value of the first antenna, and $v_{M-1,n}^k$ is corresponding to a weighted value of the $(M-1)^{th}$ antenna.

In $B_k$, a phase difference between two adjacent antennas in the $n^{th}$ vector $v_n^k$ is $\varphi_{4,k}+n\Delta_k$. A phase difference between two adjacent antennas in $v_0^k$ is $\varphi_{4,k}$, and is the smallest among phase differences between two adjacent antennas in all the vectors. A phase difference between two adjacent antennas in $v_{N_k-1}^k$ is $\varphi_{4,k}+(N_k-1)\Delta_k$, and is the largest among the phase differences between two adjacent antennas in all the vectors.

Phase differences between two $m^{th}$ antennas in every two adjacent vectors in $B_k$ are the same, and are $m\Delta_k$.

Further, a form of a vector that forms the precoding matrix set and a form of the vector that forms the $k^{th}$ precoding matrix subset are as follows:

$B = [B_1 \ B_2 \ \ldots \ B_K]$; and $$B_k = [v_0^k \ v_1^k \ \ldots \ v_{N_k-1}^k]$$

$$= \begin{bmatrix} a_{0,0} & a_{0,1} & \cdots & a_{0,N_k-1} \\ a_{1,0}e^{j\varphi_{4,k}} & a_{1,1}e^{j(\varphi_{4,k}+\Delta_k)} & \cdots & a_{1,N_k-1}e^{j(\varphi_{4,k}+(N_k-1)\Delta_k)} \\ \vdots & \vdots & a_{m,n}e^{jm(\varphi_{4,k}+n\Delta_k)} & \vdots \\ a_{M_k-1,0}e^{j(M_k-1)\varphi_{4,k}} & a_{M_k-1,1}e^{j(M_k-1)(\varphi_{4,k}+\Delta_k)} & \cdots & a_{M_k-1,N_k-1}e^{j(M_k-1)(\varphi_{4,k}+(N_k-1)\Delta_k)} \end{bmatrix};$$

where

B is the precoding matrix set, $B_k$ is the $k^{th}$ precoding matrix subset, $v_n^k$ is the $n^{th}$ vector in the $k^{th}$ precoding matrix subset, and $a_{m,n}$ is the amplitude of the element (m, n) and is a real number.

In Embodiment 10 of the present invention, at least two of the K fourth phase values $\varphi_{4,k}$ may be different.

At least two of quantities $N_k$ of vectors in the K precoding matrix subsets may be different.

At least two of the K phase intervals $\Delta_k$ may be different.

Embodiment 11

In Embodiment 11 of the present invention, the parameter used for determining the precoding matrix set includes at least one of a fourth phase value $\varphi_4$, K phase intervals, an amplitude $a_{m,n}$ of an element (m, n) in a precoding matrix subset, a quantity of vectors in K precoding matrix subsets, and a quantity M of elements in each vector in a precoding matrix subset, $\Delta_k$ represents the $k^{th}$ phase interval in the K different phase intervals, N k represents a quantity of vectors in the $k^{th}$ precoding matrix subset, $1 \le k \le K$, and others, except the parameter, in the fourth phase value $\varphi_4$, the K phase intervals, the amplitude $a_{m,n}$ of the element (m, n) in the precoding matrix subset, the quantity of vectors in the K precoding matrix subsets, and the quantity M of elements in each vector in the precoding matrix subset are preset.

For example, the fourth phase value and the K phase intervals may be obtained by using the first parameter indication information or in an implicit manner, and others are fixed; or the K phase intervals may be obtained by using the first parameter indication information or in an implicit manner, and others are fixed; or the fourth phase value may be obtained by using the first parameter indication information or in an implicit manner, and others are fixed.

Accordingly, the determining the precoding matrix set by using the parameter includes:

determining a precoding matrix subset for each phase interval; where determining the corresponding $k^{th}$ precoding matrix subset for $\Delta_k$ includes:

determining, by using a phase value $\varphi$, the phase interval $\Delta_k$, the amplitude $a_{m,n}$ the quantity $N_k$, and the quantity M, a vector that forms the precoding matrix subset, where the phase value $\varphi$ is a minimum value of a phase difference between two adjacent antennas in a vector in the precoding matrix subset; when k is 1, $\varphi$ is $\varphi_4$, and otherwise, $$\varphi = \varphi_4 + \sum_{i=1}^{k-1} N_i \Delta_i;$$

a phase difference between two adjacent antennas in the $n^{th}$ vector in the $k^{th}$ precoding matrix subset is $\varphi+n\Delta_k$; a phase difference between two $m^{th}$ antennas in two adjacent vectors in the $k^{th}$ precoding matrix subset is $m\Delta_k$; and $0 \le m < M$, $0 \le n < N_k$; and forming the precoding matrix set by using the precoding matrix subsets separately determined for all the phase intervals.

B represents the precoding matrix set, a vector that forms B is $[B_1 \ B_2 \ \ldots \ B_K]$, and the vector that forms $B_k$ is $\lfloor v_0^k \ v_1^k \ \ldots \ v_{N_k-1}^k \rfloor$, where different elements in each vector are corresponding to different antennas, for example, $$v_n^k = \begin{bmatrix} v_{0,n}^k \\ v_{1,n}^k \\ \vdots \\ v_{M-1,n}^k \end{bmatrix},$$

$v_{0,n}^k$ is corresponding to a weighted value of the $0^{th}$ antenna, $v_{1,n}^k$ is corresponding to a weighted value of the first antenna, and $v_{M-1,n}^k$ is corresponding to a weighted value of the $(M-1)^{th}$ antenna.

In $B_k$, a phase difference between two adjacent antennas in the $n^{th}$ vector $v_n^k$ is $\varphi+n\Delta_k$. A phase difference between two adjacent antennas in $v_0^k$ is $\varphi$, and is the smallest among phase differences between two adjacent antennas in all the vectors. A phase difference between two adjacent antennas in $v_{N_k-1}^k$ is $\varphi+(N_k-1)\Delta_k$, and is the largest among the phase differences between two adjacent antennas in all the vectors.

Phase differences between two $m^{th}$ antennas in every two adjacent vectors in $B_k$ are the same, and are $m\Delta_k$.

Further, a form of the vector that forms the precoding matrix set and a form of the vector that forms the $k^{th}$ precoding matrix subset are as follows:

$$B = [\, B_1 \quad B_2 \quad \ldots \quad B_K \,]; \text{ and}$$

$$B_k = [\, v_0^k \quad v_1^k \quad \ldots \quad v_{N_k-1}^k \,]$$

$$= \begin{bmatrix} a_{0,0} & a_{0,1} & \cdots & a_{0,N_k-1} \\ a_{1,0}e^{j\varphi} & a_{1,1}e^{j(\varphi+\Delta_k)} & \cdots & a_{1,N_k-1}e^{j(\varphi_k+(N_k-1)\Delta_k)} \\ \vdots & \vdots & a_{m,n}e^{jm(\varphi+n\Delta_k)} & \vdots \\ a_{M_k-1,0}e^{j(M_k-1)\varphi} & a_{M_k-1,1}e^{j(M_k-1)(\varphi+\Delta_k)} & \cdots & a_{M_k-1,N_k-1}e^{j(M_k-1)(\varphi+(N_k-1)\Delta_k)} \end{bmatrix};$$

where

B is the precoding matrix set, $B_k$ is the $k^{th}$ precoding matrix subset, $v_n^k$ is the $n^{th}$ vector in the $k^{th}$ precoding matrix subset, and $a_{m,n}$ is the amplitude of the element (m, n) and is a real number.

In Embodiment 11 of the present invention, at least two of quantities $N_k$ of vectors in the K precoding matrix subsets may be different.

At least two of the K phase intervals $\Delta_k$ may be different.

Embodiment 12

In Embodiment 12 of the present invention, the method provided in this embodiment of the present invention is described with reference to a specific application scenario.

Figure 3:
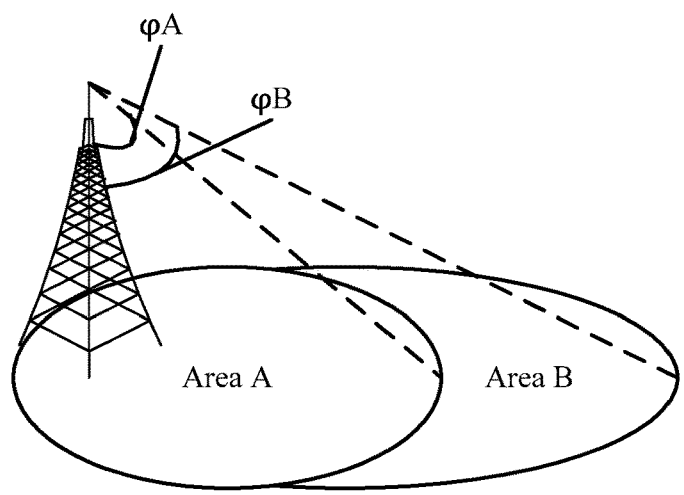
FIG. 3 is a schematic diagram of an application scenario according to Embodiment 12 of the present invention.

As shown in FIG. 3, an area A and an area B belong to a same cell covered by a base station, and a difference lies in that a distance from a terminal in the area B to the base station is larger than a distance from a terminal in the area A to the base station.

In the prior art, for the terminals in the area A and the area B, when a precoding matrix indicator is being fed back, a precoding matrix that needs to be fed back is selected from same and fixed precoding matrix sets. For example, a precoding matrix included in the precoding matrix set may be determined based on a phase range $[0,2\pi]$.

However, for the terminals in the area A and the area B, considering ranges of distances from the terminals to the base station, for the fixed precoding matrix set, when the precoding matrix indicator is being fed back, some precoding matrices are very probably not selected or fed back at all.

For example, for the area A and the area B, ranges of downtilt angles from an antenna to the terminals in the area A and the area B are different. If the range of the downtilt angle from the antenna to the terminal in the area A is $0-\varphi_A$, and the range of the downtilt angle from the antenna to the terminal in the area B is $\varphi_A-\varphi_B$, in the precoding matrix set determined based on the phase range $[0,2\pi]$, for the terminal in the area A, precoding matrices corresponding to a phase range $[\varphi_A,2\pi]$ are very probably not selected, and for the terminal in the area B, precoding matrices corresponding to a phase range $[0,\varphi_A]$ are very probably not selected. Therefore, in this case, if the precoding matrix set determined based on the phase range $[0,2\pi]$ is still used as a universal set of optional precoding matrices, relatively low selection efficiency is caused because a quantity of precoding matrices included in the universal set is relatively large, and when a quantity of vectors in the precoding matrix set is fixed, because a phase difference between same antennas in adjacent vectors in the universal set is relatively large, a relatively large selection range of an antenna downtilt angle obtained when a signal is being transmitted subsequently is caused, and therefore, relatively low accuracy of locating a signal transmission direction is caused.

For the foregoing application scenario shown in FIG. 3, different parameters may be used for the terminals located in the area A and the area B, to generate different precoding matrix sets.

For example, for the terminal in the area A, a manner provided in the foregoing Embodiment 1 may be used, where $\varphi_A$ is used as the first phase value to generate a precoding matrix set used when the terminal in the area A feeds back a precoding matrix indicator. For the terminal in the area B, a manner provided in the foregoing Embodiment 3 may be used, where $\varphi_A$ and $\varphi_B$ are respectively used as the second phase value and the third phase value to generate a precoding matrix set used when the terminal in the area B feeds back a precoding matrix indicator.

Accordingly, compared with the prior art, a quantity of vectors included in the precoding matrix set may be reduced if a phase difference between same antennas in adjacent vectors in the precoding matrix set remains unchanged, thereby improving efficiency of selecting a precoding matrix.

Compared with the prior art, a phase difference between same antennas in adjacent vectors in the precoding matrix set may be reduced if a quantity of vectors included in the precoding matrix set remains unchanged, thereby reducing a selection range of an antenna downtilt angle obtained when a signal is being transmitted, and further improving accuracy of locating a signal transmission direction.

In addition, in Embodiment 12 of the present invention, a terminal may provide, by sending a reference parameter to the base station, reference for the base station when the base station notifies the terminal of the parameter used for determining the precoding matrix set. For example, the terminal feeds back a precoding matrix indicator to the base station in a dual-codebook feedback manner, where W1 is a first codebook, W2 is a second codebook, the first codebook W1 currently includes four precoding matrix subsets, and phase ranges corresponding to the four precoding matrix subsets are different. First codebook indication information used each time a precoding matrix indicator is fed back may be used as the reference parameter. For a same terminal, when a quantity of same first codebook indication information that is fed back by the terminal and that is continuously received by the base station reaches a preset quantity, boundary values of a phase range corresponding to the first codebook indication information may be used as the parameter used for determining the precoding matrix set, and indicated to the terminal as reference for the terminal to select, when feeding back a precoding matrix indicator subsequently, a precoding matrix from the precoding matrix set determined by using the phase range.

For example, the phase ranges corresponding to the four precoding matrix subsets included in the first codebook W1 are separately $$\left[0, \frac{\pi}{4}\right], \left[\frac{\pi}{4}, \frac{\pi}{2}\right], \left[\frac{\pi}{2}, \frac{3\pi}{2}\right], \text{ and } \left[\frac{3\pi}{2}, 2\pi\right].$$

The terminal continuously feeds back, to the base station, first codebook indication information corresponding to $$\left[0, \frac{\pi}{4}\right],$$

and a quantity of first codebook indication information reaches the preset quantity. In this case, the base station may instruct the terminal to use the phase range $$\left[0, \frac{\pi}{4}\right]$$

to determine a precoding matrix set. Accordingly, the terminal may use the phase range $$\left[0, \frac{\pi}{4}\right]$$

to determine the precoding matrix set subsequently, and select, from the precoding matrix set, a precoding matrix that needs to be reported.

In addition, further, when feeding back a precoding matrix indicator, the terminal may still use the dual-codebook feedback manner. For example, the first codebook W1 may still include four precoding matrix subsets, and respective corresponding phase ranges may be separately $$\left[0, \frac{\pi}{16}\right], \left[\frac{\pi}{16}, \frac{\pi}{8}\right], \left[\frac{\pi}{8}, \frac{3\pi}{16}\right], \text{ and } \left[\frac{3\pi}{16}, \frac{\pi}{4}\right].$$

Alternatively, in Embodiments 1 to 11 of the present invention, the terminal may provide, by sending a reference parameter to the base station, reference for the base station when the base station notifies the terminal of the parameter used for determining the precoding matrix set. For example, the terminal feeds back, to the base station, at least one of the phase parameter, the amplitude parameter, the quantity of vectors in the precoding matrix set, the quantity of vectors in the first codebook set in the dual-codebook feedback, and the quantity of vectors in the second codebook set in the dual-codebook feedback, so that the base station can make, with reference to the reference parameter fed back by the terminal, a decision on selecting a parameter to configure the terminal, and then the terminal determines a corresponding precoding set according to this configuration parameter. The foregoing reference parameter includes at least one of all the parameters mentioned in Embodiments 1 to 11, for example, includes the first phase value $\varphi_1$, the second phase value $\varphi_2$, the third phase value $\varphi_3$, the amplitude $a_{m,n}$ of the element (m, n) in the precoding matrix set, the quantity N of vectors in the precoding matrix set, the quantity M of elements in each vector in the precoding matrix set, the phase interval Δ, the K first phase values, the K second phase values, the K third phase values, and the K phase intervals.

Embodiment 13

Figure 4:
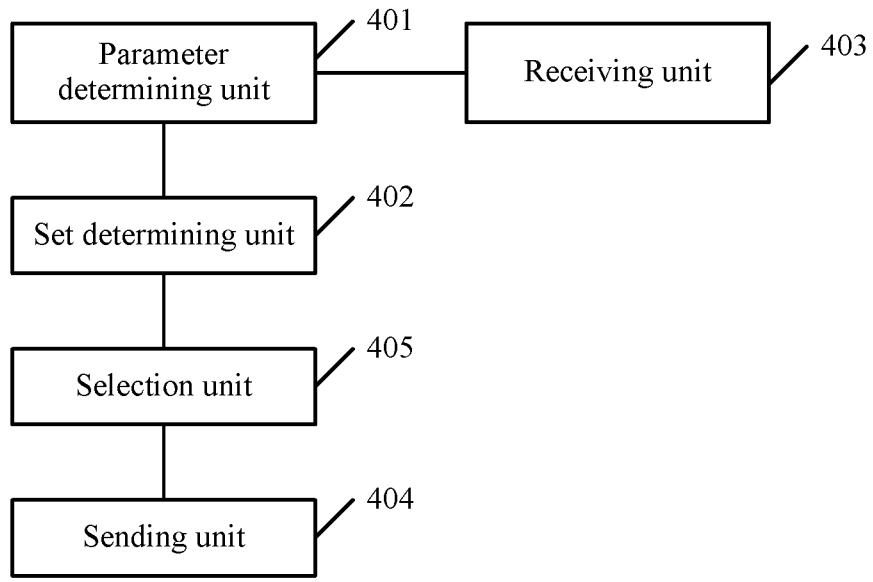
FIG. 4 is a schematic structural diagram of a precoding matrix set determining apparatus according to Embodiment 13 of the present invention.

Based on a same invention concept, according to the precoding matrix set determining method provided in the foregoing embodiment of the present invention, accordingly, Embodiment 13 of the present invention further provides a precoding matrix set determining apparatus, which is integrated in a first network device. A schematic structural diagram of the apparatus is shown in FIG. 4, and the apparatus specifically includes:

a parameter determining unit 401, configured to determine a parameter used for determining a precoding matrix set, where the parameter includes at least one of a phase parameter, an amplitude parameter, a quantity of vectors in the precoding matrix set, a quantity of vectors in a first codebook set in dual-codebook feedback, and a quantity of vectors in a second codebook set in the dual-codebook feedback, and the parameter is not fixed; and a set determining unit 402, configured to determine the precoding matrix set by using the parameter, where the precoding matrix set includes at least one precoding matrix.

Further, the parameter is cell-specific.

Further, the parameter is terminal-specific.

Further, the parameter is CSI process-specific.

Further, the parameter is carrier-specific.

Further, the parameter is rank-specific.

Further, the parameter is specific to a precoding matrix subset in a dual-codebook feedback manner; and the precoding matrix set determined by using the parameter is a precoding matrix subset of a first codebook W1 or a second codebook W2 in the dual-codebook feedback manner.

Further, the parameter includes multiple groups of parameters used for determining different precoding matrix subsets; and the set determining unit 402 is specifically configured to: separately determine respective precoding matrix subsets by using the groups of parameters; and form the precoding matrix set by using the precoding matrix subsets separately determined for the groups of parameters.

Further, for a dual-codebook structure, W=W1*W2, $$W1 = \begin{bmatrix} U & 0 \\ 0 & U \end{bmatrix},$$

W1 is a diagonal matrix, each U in W1 is a precoding matrix subset, each U is corresponding to a group of parameters, and U corresponding to the group of parameters is determined according to the group of parameters.

Further, the apparatus further includes:

a receiving unit 403, configured to receive first parameter indication information sent by a second network device, where the first parameter indication information is used to indicate the parameter used for determining the precoding matrix set; and the parameter determining unit 401 is specifically configured to determine, according to the first parameter indication information, the parameter used for determining the precoding matrix set.

Further, the first parameter indication information is sent by using broadcast signaling, radio resource control RRC signaling, or dynamic signaling.

Further, the apparatus further includes:

a sending unit 404, configured to feed back second parameter indication information to a second network device, where the second parameter indication information is used to indicate a reference parameter used for determining the precoding matrix set, and the reference parameter includes at least one of a reference phase parameter, a reference amplitude parameter, a reference quantity of vectors in the precoding matrix set, a reference quantity of vectors in the first codebook set in the dual-codebook feedback, and a reference quantity of vectors in the second codebook set in the dual-codebook feedback.

Further, the parameter determining unit 401 is specifically configured to: determine, according to indication information carried in a user ID, a cell ID, a CSI process ID, a carrier ID, a DMRS configuration parameter, a CSI-RS configuration parameter, system bandwidth allocated to the first network device, a PRG, or a subband size, a preset parameter corresponding to the indication information, and use the preset parameter as the parameter used for determining the precoding matrix set.

Further, the apparatus further includes:

a selection unit 405, configured to select, from the determined precoding matrix set, a precoding matrix that needs to be reported to a second network device; and a sending unit 404, configured to feed back matrix indication information of the selected precoding matrix to the second network device.

Further, the first network device is a terminal, and the second network device is a base station; or both the first network device and the second network device are base stations; or both the first network device and the second network device are terminals.

Further, the parameter includes at least one of a first phase value $\varphi_1$, an amplitude $a_{m,n}$ of an element (m, n) in the precoding matrix set, the quantity N of vectors in the precoding matrix set, and a quantity M of elements in each vector in the precoding matrix set. Others, except the parameter, in the first phase value $\varphi_1$, the amplitude $a_{m,n}$ of the element (m, n) in the precoding matrix set, the quantity N of vectors in the precoding matrix set, and the quantity M of elements in each vector in the precoding matrix set are preset.

The set determining unit 402 is specifically configured to determine, by using a phase range $[0, \varphi_1]$, the amplitude $a_{m,n}$, the quantity N, and the quantity M, a vector that forms the precoding matrix set; where 0 is a minimum value of a phase difference between two adjacent antennas in a vector in the precoding matrix set; and the first phase value $\varphi_1$ is a maximum value of the phase difference between two adjacent antennas in the vector in the precoding matrix set.

Further, a form of the vector that forms the precoding matrix set is as follows:

$$B = [\,v_0 \quad v_1 \quad \ldots \quad v_{N-1}\,] = \begin{bmatrix} a_{0,0} & a_{0,1} & \ldots & a_{0,N-1} \\ a_{1,0} & a_{1,1}e^{j\frac{\varphi_1}{N-1}} & \ldots & a_{1,N-1}e^{j\varphi_1} \\ \vdots & \vdots & a_{m,n}e^{j\frac{mn\varphi_1}{N-1}} & \vdots \\ a_{M-1,0} & a_{m-1,1}e^{j(M-1)\frac{\varphi_1}{N-1}} & \ldots & a_{M-1,N-1}e^{j(M-1)\varphi_1} \end{bmatrix};$$

where

B is the precoding matrix set, $v_n$ is the $n^{th}$ vector in the precoding matrix set, the amplitude $a_{m,n}$ is a real number, and $0 \leq m < M$, $0 \leq n < N$.

Further, the parameter includes at least one of a first phase value $\varphi_1$, an amplitude $a_{m,n}$ of an element (m, n) in the precoding matrix set, the quantity N of vectors in the precoding matrix set, and a quantity M of elements in each vector in the precoding matrix set. Others, except the parameter, in the first phase value $\varphi_1$, the amplitude $a_{m,n}$ of the element (m, n) in the precoding matrix set, the quantity N of vectors in the precoding matrix set, and the quantity M of elements in each vector in the precoding matrix set are preset.

The set determining unit 402 is specifically configured to determine, by using a phase range $$\left[0, \frac{(N-1)\varphi_1}{N}\right],$$

the amplitude $a_{m,n}$, the quantity N, and the quantity M, a vector that forms the precoding matrix set; where 0 is a minimum value of a phase difference between two adjacent antennas in a vector in the precoding matrix set; and $$\frac{(N-1)\varphi_1}{N}$$

is a maximum value of the phase difference between two adjacent antennas in the vector in the precoding matrix set.

Further, a form of the vector that forms the precoding matrix set is as follows:

$$B = [\,v_0 \quad v_1 \quad \ldots \quad v_{N-1}\,] = \begin{bmatrix} a_{0,0} & a_{0,1} & \ldots & a_{0,N-1} \\ a_{1,0} & a_{1,1}e^{j\frac{\varphi_1}{N}} & \ldots & a_{1,N-1}e^{j\frac{(N-1)\varphi_1}{N}} \\ \vdots & \vdots & a_{m,n}e^{j\frac{mn\varphi_1}{N}} & \vdots \\ a_{M-1,0} & a_{m-1,1}e^{j(M-1)\frac{\varphi_1}{N}} & \ldots & a_{M-1,N-1}e^{j(M-1)\frac{(N-1)\varphi_1}{N}} \end{bmatrix};$$

where

B is the precoding matrix set, $v_n$ is the $n^{th}$ vector in the precoding matrix set, the amplitude $a_{m,n}$ is a real number, and $0 \leq m < M$, $0 \leq n < N$.

Further, the parameter includes at least one of a second phase value $\varphi_2$, a third phase value $\varphi_3$, an amplitude $a_{m,n}$ of an element (m, n) in the precoding matrix set, the quantity N of vectors in the precoding matrix set, and a quantity M of elements in each vector in the precoding matrix set. Others, except the parameter, in the second phase value $\varphi_2$, the third phase value $\varphi_3$, the amplitude $a_{m,n}$ of the element (m, n) in the precoding matrix set, the quantity N of vectors in the precoding matrix set, and the quantity M of elements in each vector in the precoding matrix set are preset.

The set determining unit 402 is specifically configured to determine, by using a phase range $[\varphi_2, \varphi_3]$, the amplitude $a_{m,n}$, the quantity N, and the quantity M, a vector that forms the precoding matrix set; where the second phase value $\varphi_2$ is a minimum value of a phase difference between two adjacent antennas in a vector in the precoding matrix set; and the third phase value $\varphi_3$ is a maximum value of the phase difference between two adjacent antennas in the vector in the precoding matrix set.

Further, a form of the vector that forms the precoding matrix set is as follows:

$$B = \begin{bmatrix} v_0 & v_1 & \cdots & v_{N-1} \end{bmatrix}$$

$$= \begin{bmatrix} a_{0,0} & a_{0,1} & \cdots & a_{0,N-1} \\ a_{1,0}e^{j\varphi_2} & a_{1,1}e^{j(\varphi_2+\Delta)} & \cdots & a_{1,N-1}e^{j\varphi_3} \\ \vdots & \vdots & a_{m,n}e^{jm(\varphi_2+n\Delta)} & \vdots \\ a_{M-1,0} & a_{M-1,1} & \cdots & a_{M-1,N-1} \\ e^{j(M-1)\varphi_2} & e^{j(M-1)(\varphi_2+\Delta)} & \cdots & e^{j(M-1)\varphi_3} \end{bmatrix};$$

where $$\Delta = \frac{\varphi_3 - \varphi_2}{N-1};$$

and

B is the precoding matrix set, $v_n$ is the $n^{th}$ vector in the precoding matrix set, the amplitude $a_{m,n}$ is a real number, $0 \le m < M$, $0 \le n < N$, a phase difference between two adjacent antennas in the $n^{th}$ vector in the precoding matrix set is $\varphi_2 + n\Delta$, and a phase difference between two $m^{th}$ antennas in two adjacent vectors in the precoding matrix set is $m\Delta$.

Further, the parameter includes at least one of a second phase value $\varphi_2$, a third phase value $\varphi_3$, an amplitude $a_{m,n}$ of an element (m, n) in the precoding matrix set, the quantity N of vectors in the precoding matrix set, a quantity M of elements in each vector in the precoding matrix set, and an integer L, and others, except the parameter, in the second phase value $\varphi_2$, the third phase value $\varphi_3$, the amplitude $a_{m,n}$ of the element (m, n) in the precoding matrix set, the quantity N of vectors in the precoding matrix set, the quantity M of elements in each vector in the precoding matrix set, and the integer L are preset.

The set determining unit 402 is specifically configured to determine, by using a phase range $$\left[\frac{\varphi_2}{L}, \frac{\varphi_3}{L}\right],$$

the amplitude $a_{m,n}$, the quantity N, and the quantity M, a vector that forms the precoding matrix set; where $$\frac{\varphi_2}{L}$$

is a minimum value of a phase difference between two adjacent antennas in a vector in the precoding matrix set; and $$\frac{\varphi_3}{L}$$

is a maximum value of the phase difference between two adjacent antennas in the vector in the precoding matrix set.

Further, a form of the vector that forms the precoding matrix set is as follows:

where $$\Delta = \frac{\varphi_3 - \varphi_2}{L(N-1)};$$

and

B is the precoding matrix set, $v_n$ is the $n^{th}$ vector in the precoding matrix set, the amplitude $a_{m,n}$ is a real number, $0 \le m < M$, $0 \le n < N$, a phase difference between two adjacent antennas in the $n^{th}$ vector in the precoding matrix set is $$\frac{\varphi_2}{L} + n\Delta,$$

and a phase difference between two $m^{th}$ antennas in two adjacent vectors in the precoding matrix set is $m\Delta$.

Further, the parameter includes at least one of a second phase value $\varphi_2$, a third phase value $\varphi_3$, a phase interval $\Delta$, an amplitude $a_{m,n}$ of an element (m, n) in the precoding matrix set, and a quantity M of elements in each vector in the precoding matrix set. Others, except the parameter, in the second phase value $\varphi_2$, the third phase value $\varphi_3$, the phase interval $\Delta$, the amplitude $a_{m,n}$ of the element (m, n) in the precoding matrix set, and the quantity M of elements in each vector in the precoding matrix set are preset.

The set determining unit 402 is specifically configured to determine, by using a phase range $[\varphi_2, \varphi_3]$, the phase interval $\Delta$, the amplitude $a_{m,n}$, and the quantity M, a vector that forms the precoding matrix set; where the second phase value $\varphi_2$ is a minimum value of a phase difference between two adjacent antennas in a vector in the precoding matrix set;

the third phase value $\varphi_3$ is a maximum value of the phase difference between two adjacent antennas in the vector in the precoding matrix set; and a phase difference between two adjacent antennas in the $n^{th}$ vector in the precoding matrix set is $\varphi_2 + n\Delta$, a phase difference between two $m^{th}$ antennas in two adjacent vectors in the precoding matrix set is $m\Delta$, $0 \le m < M$, $0 \le n < N$, N is the quantity of vectors in the precoding matrix set, and $$\Delta = \frac{\varphi_3 - \varphi_2}{N-1}.$$

Further, a form of the vector that forms the precoding matrix set is as follows:

$$B = \begin{bmatrix} v_0 & v_1 & \cdots & v_{N-1} \end{bmatrix}$$

$$= \begin{bmatrix} a_{0,0} & a_{0,1} & \cdots & a_{0,N-1} \\ a_{1,0}e^{j\frac{\varphi_2}{L}} & a_{1,1}e^{j\left(\frac{\varphi_2}{L}+\Delta\right)} & \cdots & a_{1,N-1}e^{j\frac{\varphi_3}{L}} \\ \vdots & \vdots & a_{m,n}e^{jm\left(\frac{\varphi_2}{L}+n\Delta\right)} & \vdots \\ a_{M-1,0}e^{j(M-1)\frac{\varphi_2}{L}} & a_{M-1,1}e^{j(M-1)\left(\frac{\varphi_2}{L}+\Delta\right)} & \cdots & a_{M-1,N-1}e^{j(M-1)\frac{\varphi_3}{L}} \end{bmatrix};$$

$$B = \begin{bmatrix} v_0 & v_1 & \cdots & v_{N-1} \end{bmatrix}$$

$$= \begin{bmatrix} a_{0,0} & a_{0,1} & \cdots & a_{0,N-1} \\ a_{1,0}e^{j\varphi_2} & a_{1,1}e^{j(\varphi_2+\Delta)} & \cdots & a_{1,N-1}e^{j\varphi_3} \\ \vdots & \vdots & a_{m,n}e^{jm(\varphi_2+n\Delta)} & \vdots \\ a_{M-1,0}e^{j(M-1)\varphi_2} & a_{M-1,1}e^{j(M-1)(\varphi_2+\Delta)} & \cdots & a_{M-1,N-1}e^{j(M-1)\varphi_3} \end{bmatrix};$$

where

B is the precoding matrix set, $v_n$ is the $n^{th}$ vector in the precoding matrix set, and the amplitude $a_{m,n}$ is a real number.

Further, the parameter includes at least one of a second phase value $\varphi_2$, a third phase value $\varphi_3$, a phase interval $\Delta$, an amplitude $a_{m,n}$ of an element (m, n) in the precoding matrix set, a quantity M of elements in each vector in the precoding matrix set, and an integer L, and others, except the parameter, in the second phase value $\varphi_2$, the third phase value $\varphi_3$, the phase interval $\Delta$, the amplitude $a_{m,n}$ of the element (m, n) in the precoding matrix set, the quantity M of elements in each vector in the precoding matrix set, and the integer L are preset.

The set determining unit 402 is specifically configured to determine, by using a phase range $$\left[\frac{\varphi_2}{L}, \frac{\varphi_3}{L}\right],$$

the phase interval $\Delta$, the amplitude $a_{m,n}$, and the quantity M, a vector that forms the precoding matrix set; where $$\frac{\varphi_2}{L}$$

is a minimum value of a phase difference between two adjacent antennas in a vector in the precoding matrix set;

$$\frac{\varphi_3}{L}$$

is a maximum value of the phase difference between two adjacent antennas in the vector in the precoding matrix set; and a phase difference between two adjacent antennas in the $n^{th}$ vector in the precoding matrix set is $$\frac{\varphi_2}{L} + n\Delta,$$

a phase difference between two $m^{th}$ antennas in two adjacent vectors in the precoding matrix set is $m\Delta$, $0 \leq m < M$, $0 \leq n < N$, N is the quantity of vectors in the precoding matrix set, and $$\Delta = \frac{\varphi_3 - \varphi_2}{L(N-1)}.$$

Further, a form of the vector that forms the precoding matrix set is as follows:

$$B = \begin{bmatrix} v_0 & v_1 & \cdots & v_{N-1} \end{bmatrix}$$

$$= \begin{bmatrix} a_{0,0} & a_{0,1} & \cdots & a_{0,N-1} \\ a_{1,0}e^{j\frac{\varphi_2}{L}} & a_{1,1}e^{j(\frac{\varphi_2}{L}+\Delta)} & \cdots & a_{1,N-1}e^{j\frac{\varphi_3}{L}} \\ \vdots & \vdots & a_{m,n}e^{jm(\frac{\varphi_2}{L}+n\Delta)} & \vdots \\ a_{M-1,0}e^{j(M-1)\frac{\varphi_2}{L}} & a_{M-1,1}e^{j(M-1)(\frac{\varphi_2}{L}+\Delta)} & \cdots & a_{M-1,N-1}e^{j(M-1)\frac{\varphi_3}{L}} \end{bmatrix};$$

where

B is the precoding matrix set, $v_n$ is the $n^{th}$ vector in the precoding matrix set, and the amplitude $a_{m,n}$ is a real number.

Further, the parameter includes at least one of the following: K second phase values, K third phase values, an amplitude $a_{m,n}$ of an element (m, n) in a precoding matrix subset, a quantity of vectors in K precoding matrix subsets, and a quantity M of elements in each vector in a precoding matrix subset, $\varphi_{2,k}$ represents the $k^{th}$ second phase value, $\varphi_{3,k}$ represents the $k^{th}$ third phase value, $N_k$ represents a quantity of vectors in the $k^{th}$ precoding matrix subset, $1 \leq k \leq K$, and others, except the parameter, in the K second phase values, the K third phase values, the amplitude $a_{m,n}$ of the element (m, n) in the precoding matrix subset, the quantity of vectors in the K precoding matrix subsets, and the quantity M of elements in each vector in the precoding matrix subset are preset.

The set determining unit 402 is specifically configured to: determine a precoding matrix subset for each group of the second phase value and the third phase value, where determining the corresponding $k^{th}$ precoding matrix subset for $\varphi_{2,k}$ and $\varphi_{3,k}$ includes:

determining, by using the phase value $\varphi_{2,k}$, the phase value $\varphi_{3,k}$, the amplitude $a_{m,n}$, the quantity $N_k$, and the quantity M, a vector that forms the precoding matrix subset, where the phase value $\varphi_{2,k}$ is a minimum value of a phase difference between two adjacent antennas in a vector in the precoding matrix subset, and the phase value $\varphi_{3,k}$ is a maximum value of a phase difference between two adjacent antennas in a vector in the precoding matrix subset; and form the precoding matrix set by using the precoding matrix subsets separately determined for all the groups of the second phase value and the third phase value.

Further, a form of a vector that forms the precoding matrix set and a form of the vector that forms the $k^{th}$ precoding matrix subset are as follows:

$$B = \begin{bmatrix} B_1 & B_2 & \cdots & B_K \end{bmatrix}; \text{ and}$$

$$B_k = \begin{bmatrix} v_0^k & v_1^k & \cdots & v_{N_k-1}^k \end{bmatrix}$$

$$= \begin{bmatrix} a_{0,0} & a_{0,1} & \cdots & a_{0,N-1} \\ a_{1,0}e^{j\varphi_{2,k}} & a_{1,1}e^{j(\varphi_{2,k}+\Delta_k)} & \cdots & a_{1,N-1}e^{j\varphi_{3,k}} \\ \vdots & \vdots & \begin{matrix}a_{m,n}\\ e^{jm(\varphi_{2,k}+n\Delta_k)}\end{matrix} & \vdots \\ a_{M-1,0} & a_{M-1,1} & & a_{M-1,N-1} \\ e^{j(M-1)\varphi_{2,k}} & e^{j(M-1)(\varphi_{2,k}+\Delta_k)} & \cdots & e^{j(M-1)\varphi_{3,k}} \end{bmatrix};$$

where $$\Delta_k = \frac{\varphi_{3,k} - \varphi_{2,k}}{N_k - 1};$$

and

B is the precoding matrix set, $B_k$ is the $k^{th}$ precoding matrix subset, $v_n^k$ is the $n^{th}$ vector in the $k^{th}$ precoding matrix subset, $a_{m,n}$ is the amplitude of the element (m, n) and is a real number, a phase difference between two adjacent antennas in the $n^{th}$ vector in the $k^{th}$ precoding matrix subset is $\varphi_{2,k}+n\Delta_k$, a phase difference between two $m^{th}$ antennas in two adjacent vectors in the $k^{th}$ precoding matrix subset is $m\Delta_k$, and $0 \le m < M$, $0 \le n < N_k$.

Further, at least two groups in the K second phase values $\varphi_{2,k}$ and $\varphi_{3,k}$ are different.

Further, at least two of quantities $N_k$ of vectors in the K precoding matrix subsets are different.

Further, the parameter includes at least one of the following: K second phase values, K third phase values, K phase intervals, an amplitude $a_{m,n}$ of an element (m, n) in a precoding matrix subset, and a quantity M of elements in each vector in a precoding matrix subset, $\varphi_{2,k}$ represents the $k^{th}$ second phase value, $\varphi_{3,k}$ represents the $k^{th}$ third phase value, $\Delta_k$ represents the $k^{th}$ phase interval, $1 \le k \le K$, and others, except the parameter, in the K second phase values, the K third phase values, the K phase intervals, the amplitude $a_{m,n}$ of the element (m, n) in the precoding matrix subset, and the quantity M of elements in each vector in the precoding matrix subset are preset.

The set determining unit 402 is specifically configured to: determine a precoding matrix subset for each group of the second phase value and the third phase value, where determining a corresponding $k^{th}$ precoding matrix subset for $\varphi_{2,k}$ and $\varphi_{3,k}$ includes:

determining, by using the phase value $\varphi_{2,k}$, the phase value $\varphi_{3,k}$, the phase interval $\Delta_k$, the amplitude $a_{m,n}$, and the quantity M, a vector that forms the precoding matrix subset, where the phase value $\varphi_{2,k}$ is a minimum value of a phase difference between two adjacent antennas in a vector in the precoding matrix subset, the phase value $\varphi_{3,k}$ is a maximum value of a phase difference between two adjacent antennas in a vector in the precoding matrix set, a phase difference between two adjacent antennas in the $n^{th}$ vector in the $k^{th}$ precoding matrix subset is $\varphi_{2,k}+n\Delta_k$, a phase difference between two $m^{th}$ antennas in two adjacent vectors in the $k^{th}$ precoding matrix subset is $m\Delta_k$, $0 \le m < M$, $0 \le n < N_k$, $N_k$ is a quantity of vectors in the $k^{th}$ precoding matrix subset, and $$\Delta_k = \frac{\varphi_{3,k} - \varphi_{2,k}}{N_k - 1};$$

and form the precoding matrix set by using the precoding matrix subsets separately determined for all the groups of the second phase value and the third phase value.

Further, a form of a vector that forms the precoding matrix set and a form of the vector that forms the $k^{th}$ precoding matrix subset are as follows:

$$B = [\begin{array}{cccc} B_1 & B_2 & \ldots & B_K \end{array}]; \text{ and}$$

$$B_k = [\begin{array}{cccc} v_0^k & v_1^k & \ldots & v_{N_k-1}^k \end{array}]$$

$$= \begin{bmatrix} a_{0,0} & a_{0,1} & \ldots & a_{0,N-1} \\ a_{1,0}e^{j\varphi_{2,k}} & a_{1,1}e^{j(\varphi_{2,k}+\Delta_k)} & \ldots & a_{1,N-1}e^{j\varphi_{3,k}} \\ \vdots & \vdots & a_{m,n}e^{jm(\varphi_{2,k}+n\Delta_k)} & \vdots \\ a_{M-1,0} & a_{M-1,1} & & a_{M-1,N-1} \\ e^{j(M-1)\varphi_{2,k}} & e^{j(M-1)(\varphi_{2,k}+\Delta_k)} & \ldots & e^{j(M-1)\varphi_{3,k}} \end{bmatrix};$$

where

B is the precoding matrix set, $B_k$ is the $k^{th}$ precoding matrix subset, $v_n^k$ is the $n^{th}$ vector in the $k^{th}$ precoding matrix subset, and $a_{m,n}$ is the amplitude of the element (m, n) and is a real number.

Further, at least two groups in the K second phase values $\varphi_{2,k}$ and $\varphi_{3,k}$ are different.

Further, at least two of the K phase intervals $\Delta_k$ are different.

Further, the parameter includes at least one of a fourth phase value $\varphi_4$, a phase interval $\Delta$, an amplitude $a_{m,n}$ of an element (m, n) in the precoding matrix set, the quantity N of vectors in the precoding matrix set, and a quantity M of elements in each vector in the precoding matrix set. Others, except the parameter, in the fourth phase value $\varphi_4$, the phase interval $\Delta$, the amplitude $a_{m,n}$ of the element (m, n) in the precoding matrix set, the quantity N of vectors in the precoding matrix set, and the quantity M of elements in each vector in the precoding matrix set are preset.

The set determining unit 402 is specifically configured to determine, by using the fourth phase value $\varphi_4$, the phase interval $\Delta$, the amplitude $a_{m,n}$, the quantity N, and the quantity M, a vector that forms the precoding matrix set; where the fourth phase value $\varphi_4$ is a minimum value of a phase difference between two adjacent antennas in a vector in the precoding matrix set; and a phase difference between two adjacent antennas in the $n^{th}$ vector in the precoding matrix set is $\varphi_4+n\Delta$, a phase difference between two $m^{th}$ antennas in two adjacent vectors in the precoding matrix set is $m\Delta$, and $0 \le m < M$, $0 \le n < N$.

Further, a form of the vector that forms the precoding matrix set is as follows:

$$B = [\begin{array}{cccc} v_0 & v_1 & \ldots & v_{N-1} \end{array}]$$

$$= \begin{bmatrix} a_{0,0} & a_{0,1} & \ldots & a_{0,N-1} \\ a_{1,0}e^{j\varphi_4} & a_{1,1}e^{j(\varphi_4+\Delta)} & \ldots & a_{1,N-1}e^{j(\varphi_4+(N-1)\Delta)} \\ \vdots & \vdots & a_{m,n}e^{jm(\varphi_4+n\Delta)} & \vdots \\ a_{M-1,0}e^{j(M-1)\varphi_4} & a_{M-1,1}e^{j(M-1)(\varphi_4+\Delta)} & \ldots & a_{M-1,N-1}e^{j(M-1)(\varphi_4+(N-1)\Delta)} \end{bmatrix};$$

where

B is the precoding matrix set, $v_n$ is the $n^{th}$ vector in the precoding matrix set, and the amplitude $a_{m,n}$ is a real number.

Further, the parameter includes at least one of the following: K fourth phase values, K phase intervals, an amplitude $a_{m,n}$ of an element (m, n) in a precoding matrix subset, a quantity of vectors in K precoding matrix subsets, and a quantity M of elements in each vector in a precoding matrix subset, $\varphi_{4,k}$ represents the $k^{th}$ fourth phase value, $\Delta_k$ represents the $k^{th}$ phase interval $\Delta$, $N_k$ represents a quantity of vectors in the $k^{th}$ precoding matrix subset, $1 \leq k \leq K$, and others, except the parameter, in the K fourth phase values, the K phase intervals, the amplitude $a_{m,n}$ n of the element (m, n) in the precoding matrix subset, the quantity of vectors in the K precoding matrix subsets, and the quantity M of elements in each vector in the precoding matrix subset are preset.

The set determining unit 402 is specifically configured to: determine a precoding matrix subset for each phase interval $\Delta$, where determining the corresponding $k^{th}$ precoding matrix subset for $\varphi_{4,k}$ and $\Delta_k$ includes:

determining, by using the phase value $\varphi_{4,k}$, the phase interval $\Delta_k$, the amplitude $a_{m,n}$, the quantity $N_k$, and the quantity M, a vector that forms the precoding matrix subset, where the phase value $\varphi_{4,k}$ is a minimum value of a phase difference between two adjacent antennas in a vector in the precoding matrix subset, a phase difference between two adjacent antennas in the $n^{th}$ vector in the $k^{th}$ precoding matrix subset is $\varphi_{4,k} + n\Delta_k$, a phase difference between two $m^{th}$ antennas in two adjacent vectors in the $k^{th}$ precoding matrix subset is $m\Delta_k$ and $0 \leq m < M$, $0 \leq n < N_k$; and form the precoding matrix set by using the precoding matrix subsets separately determined for all the phase intervals.

Further, a form of a vector that forms the precoding matrix set and a form of the vector that forms the $k^{th}$ precoding matrix subset are as follows:

$$B = [\begin{array}{cccc} B_1 & B_2 & \ldots & B_K \end{array}]; \text{ and}$$

$$B_k = [\begin{array}{cccc} v_0^k & v_1^k & \ldots & v_{N_k-1}^k \end{array}]$$

where

B is the precoding matrix set, $B_k$ is the $k^{th}$ precoding matrix subset, $v_n^k$ is the $n^{th}$ vector in the $k^{th}$ precoding matrix subset, and a is the amplitude of the element (m, n) and is a real number.

Further, at least two of the K fourth phase values $\varphi_{4,k}$ are different.

Further, at least two of quantities $N_k$ of vectors in the K precoding matrix subsets are different.

Further, at least two of the K phase intervals $\Delta_k$ are different.

Further, the parameter includes at least one of a fourth phase value $\varphi_4$, K phase intervals, an amplitude $a_{m,n}$ of an element (m, n) in a precoding matrix subset, a quantity of vectors in K precoding matrix subsets, and a quantity M of elements in each vector in a precoding matrix subset, $\Delta_k$ represents the $k^{th}$ phase interval in the K different phase intervals, $N_k$ represents a quantity of vectors in the $k^{th}$ precoding matrix subset, $1 \leq k \leq K$, and others, except the parameter, in the fourth phase value $\varphi_4$, the K phase intervals, the amplitude $a_{m,n}$ of the element (m, n) in the precoding matrix subset, the quantity of vectors in the K precoding matrix subsets, and the quantity M of elements in each vector in the precoding matrix subset are preset.

The set determining unit 402 is specifically configured to: determine a precoding matrix subset for each phase interval $\Delta$, where determining the corresponding $k^{th}$ precoding matrix subset for $\Delta_k$ includes:

determining, by using a phase value $\varphi$, the phase interval $\Delta_k$, the amplitude $a_{m,n}$, the quantity $N_k$, and the quantity M, a vector that forms the precoding matrix subset, where the phase value $\varphi$ is a minimum value of a phase difference between two adjacent antennas in a vector in the precoding matrix subset; when k is 1, $\varphi$ is $\varphi_4$, and otherwise, $$\varphi = \varphi_4 + \sum_{i=1}^{k-1} N_i \Delta_i;$$

a phase difference between two adjacent antennas in the $n^{th}$ vector in the $k^{th}$ precoding matrix subset is $\varphi + n\Delta_k$; a phase difference between two $m^{th}$ antennas in two adjacent vectors in the $k^{th}$ precoding matrix subset is $m\Delta_k$; and $0 \leq m < M$, $0 \leq n < N_k$; and form the precoding matrix set by using the precoding matrix subsets separately determined for all the phase intervals.

Further, a form of a vector that forms the precoding matrix set and a form of the vector that forms the $k^{th}$ precoding matrix subset are as follows:

$$= \begin{bmatrix} a_{0,0} & a_{0,1} & \ldots & a_{0,N_k-1} \\ a_{1,0} e^{j\varphi_{4,k}} & a_{1,1} e^{j(\varphi_{4,k}+\Delta_k)} & \ldots & a_{1,N_k-1} e^{j(\varphi_{4,k}+(N_k-1)\Delta_k)} \\ \vdots & \vdots & a_{m,n} e^{jm(\varphi_{4,k}+n\Delta_k)} & \vdots \\ a_{M_k-1,0} e^{j(M_k-1)\varphi_{4,k}} & a_{M_k-1,1} e^{j(M_k-1)(\varphi_{4,k}+\Delta_k)} & \ldots & a_{M_k-1,N_k-1} e^{j(M_k-1)(\varphi_{4,k}+(N_k-1)\Delta_k)} \end{bmatrix};$$

$$B = [\, B_1 \quad B_2 \quad \ldots \quad B_K \,]; \text{ and}$$

$$B_k = [\, v_0^k \quad v_1^k \quad \ldots \quad v_{N_k-1}^k \,]$$

$$= \begin{bmatrix} a_{0,0} & a_{0,1} & \ldots & a_{0,N_k-1} \\ a_{1,0}e^{j\varphi} & a_{1,1}e^{j(\varphi+\Delta_k)} & \ldots & a_{1,N_k-1}e^{j(\varphi+(N_k-1)\Delta_k)} \\ \vdots & \vdots & a_{m,n}e^{jm(\varphi+n\Delta_k)} & \vdots \\ a_{M_k-1,0}e^{j(M_k-1)\varphi} & a_{M_k-1,1}e^{j(M_k-1)(\varphi+\Delta_k)} & \ldots & a_{M_k-1,N_k-1}e^{j(M_k-1)(\varphi+(N_k-1)\Delta_k)} \end{bmatrix};$$

where

B is the precoding matrix set, $B_k$ is the $k^{th}$ precoding matrix subset, $v_n^k$ is the $n^{th}$ vector in the $k^{th}$ precoding matrix subset, and $a_{m,n}$ is the amplitude of the element (m, n) and is a real number.

Further, at least two of quantities $N_k$ of vectors in the K precoding matrix subsets are different.

Further, at least two of the K phase intervals $\Delta_k$ are different.

Embodiment 14

Figure 5:
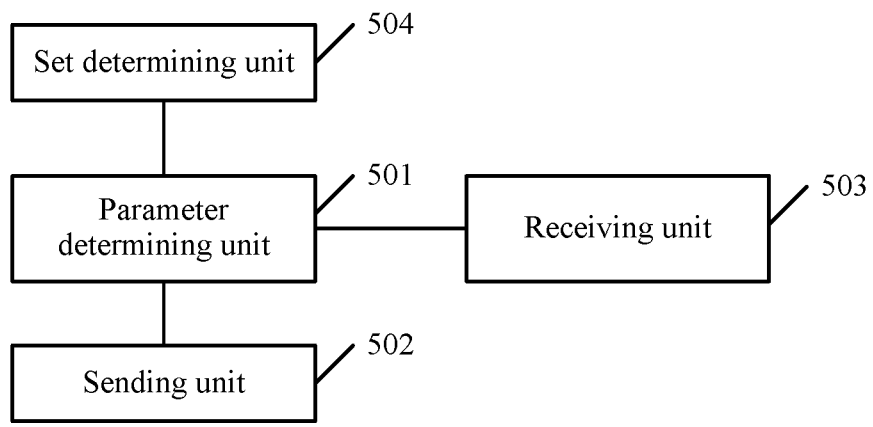
FIG. 5 is a schematic structural diagram of a parameter indication information sending apparatus according to Embodiment 14 of the present invention.

Based on a same invention concept, according to the parameter indication information sending method provided in the foregoing embodiment of the present invention, accordingly, Embodiment 14 of the present invention further provides a parameter indication information sending apparatus, which is integrated in a second network device. A schematic structural diagram of the apparatus is shown in FIG. 5, and the apparatus specifically includes:

a parameter determining unit 501, configured to determine a parameter used for determining a precoding matrix set, where the parameter includes at least one of a phase parameter, an amplitude parameter, a quantity of vectors in the precoding matrix set, a quantity of vectors in a first codebook set in dual-codebook feedback, and a quantity of vectors in a second codebook set in the dual-codebook feedback, and the parameter is not fixed; and a sending unit 502, configured to send first parameter indication information to a first network device, where the first parameter indication information is used to indicate the parameter.

Further, the parameter is cell-specific.
Further, the parameter is terminal-specific.
Further, the parameter is CSI process-specific.
Further, the parameter is carrier-specific.
Further, the parameter is rank-specific.
Further, the parameter is specific to a precoding matrix subset in a dual-codebook feedback manner; and the precoding matrix set determined by using the parameter is a precoding matrix subset of a first codebook W1 or a second codebook W2 in the dual-codebook feedback manner.

Further, the parameter includes multiple groups of parameters used for determining different precoding matrix subsets; and the precoding matrix subsets separately determined for the groups of parameters form the precoding matrix set.

Further, for a dual-codebook structure, W=W1*W2, $$W1 = \begin{bmatrix} U & 0 \\ 0 & U \end{bmatrix},$$

W1 is a diagonal matrix, each U in W1 is a precoding matrix subset, each U is corresponding to a group of parameters, and U corresponding to the group of parameters is determined according to the group of parameters.

Further, the sending unit 502 is specifically configured to send the first parameter indication information to the first network device by using broadcast signaling, radio resource control RRC signaling, or dynamic signaling.

Further, the apparatus includes a receiving unit 503, configured to receive second parameter indication information sent by the first network device, where the second parameter indication information is used to indicate a reference parameter used for determining the precoding matrix set, and the reference parameter includes at least one of a reference phase parameter, a reference amplitude parameter, a reference quantity of vectors in the precoding matrix set, a reference quantity of vectors in the first codebook set in the dual-codebook feedback, and a reference quantity of vectors in the second codebook set in the dual-codebook feedback.

Further, the parameter determining unit 501 is specifically configured to: determine, according to indication information carried in a user ID, a cell ID, a CSI process ID, a carrier ID, a DMRS configuration parameter, a CSI-RS configuration parameter, system bandwidth allocated to the first network device, a PRG, or a subband size, a preset parameter corresponding to the indication information, and use the preset parameter as the parameter used for determining the precoding matrix set.

Further, the receiving unit 503 is configured to receive matrix indication information, fed back by the first network device, of a precoding matrix selected from the determined precoding matrix set.

Further, the first network device is a terminal, and the second network device is a base station; or both the first network device and the second network device are base stations; or both the first network device and the second network device are terminals.

Further, the apparatus includes a set determining unit 504, configured to determine the precoding matrix set by using the parameter, where the precoding matrix set includes at least one precoding matrix.

Further, the parameter includes at least one of a first phase value $\varphi_1$, an amplitude $a_{m,n}$ of an element (m, n) in the precoding matrix set, the quantity N of vectors in the precoding matrix set, and a quantity M of elements in each vector in the precoding matrix set. Others, except the parameter, in the first phase value $\varphi_1$, the amplitude $a_{m,n}$ of the element (m, n) in the precoding matrix set, the quantity N of vectors in the precoding matrix set, and the quantity M of elements in each vector in the precoding matrix set are preset.

The set determining unit 504 is specifically configured to determine, by using a phase range [0,$\varphi_1$], the amplitude $a_{m,n}$, the quantity N, and the quantity M, a vector that forms the precoding matrix set; where 0 is a minimum value of a phase difference between two adjacent antennas in a vector in the precoding matrix set; and the first phase value $\varphi_1$ is a maximum value of the phase difference between two adjacent antennas in the vector in the precoding matrix set.

Further, a form of the vector that forms the precoding matrix set is as follows:

$$B = [v_0 \ v_1 \ \cdots \ v_{N-1}] = \begin{bmatrix} a_{0,0} & a_{0,1} & \cdots & a_{0,N-1} \\ a_{1,0} & a_{1,1}e^{j\frac{\varphi_1}{N-1}} & \cdots & a_{1,N-1}e^{j\varphi_1} \\ \vdots & \vdots & a_{m,n}e^{j\frac{mn\varphi_1}{N-1}} & \vdots \\ a_{M-1,0} & a_{M-1,1}e^{j(M-1)\frac{\varphi_1}{N-1}} & \cdots & a_{M-1,N-1}e^{j(M-1)\varphi_1} \end{bmatrix};$$

where

B is the precoding matrix set, $v_n$ is the $n^{th}$ vector in the precoding matrix set, the amplitude $a_{m,n}$ is a real number, and 0≤m<M, 0≤n<N.

Further, the parameter includes at least one of a first phase value $\varphi_1$, an amplitude $a_{m,n}$ of an element (m, n) in the precoding matrix set, the quantity N of vectors in the precoding matrix set, and a quantity M of elements in each vector in the precoding matrix set. Others, except the parameter, in the first phase value $\varphi_1$, the amplitude $a_{m,n}$ of the element (m, n) in the precoding matrix set, the quantity N of vectors in the precoding matrix set, and the quantity M of elements in each vector in the precoding matrix set are preset.

The set determining unit 504 is specifically configured to determine, by using a phase range $$\left[0, \frac{(N-1)\varphi_1}{N}\right],$$

the amplitude $a_{m,n}$, the quantity N, and the quantity M, a vector that forms the precoding matrix set; where 0 is a minimum value of a phase difference between two adjacent antennas in a vector in the precoding matrix set; and $$\frac{(N-1)\varphi_1}{N}$$

is a maximum value of the phase difference between two adjacent antennas in the vector in the precoding matrix set.

Further, a form of the vector that forms the precoding matrix set is as follows:

$$B = [v_0 \ v_1 \ \cdots \ v_{N-1}] = \begin{bmatrix} a_{0,0} & a_{0,1} & \cdots & a_{0,N-1} \\ a_{1,0} & a_{1,1}e^{j\frac{\varphi_1}{N}} & \cdots & a_{1,N-1}e^{j\frac{(N-1)\varphi_1}{N}} \\ \vdots & \vdots & a_{m,n}e^{j\frac{mn\varphi_1}{N}} & \vdots \\ a_{M-1,0} & a_{M-1,1}e^{j(M-1)\frac{\varphi_1}{N}} & \cdots & a_{M-1,N-1}e^{j(M-1)\frac{(N-1)\varphi_1}{N}} \end{bmatrix};$$

where

B is the precoding matrix set, $v_n$ is the $n^{th}$ vector in the precoding matrix set, the amplitude $a_{m,n}$ is a real number, and 0≤m<M, 0≤n<N.

Further, the parameter includes at least one of a second phase value $\varphi_2$ a third phase value $\varphi_3$, an amplitude $a_{m,n}$ of an element (m, n) in the precoding matrix set, the quantity N of vectors in the precoding matrix set, and a quantity M of elements in each vector in the precoding matrix set. Others, except the parameter, in the second phase value $\varphi_2$, the third phase value $\varphi_3$, the amplitude $a_{m,n}$ of the element (m, n) in the precoding matrix set, the quantity N of vectors in the precoding matrix set, and the quantity M of elements in each vector in the precoding matrix set are preset.

The set determining unit 504 is specifically configured to determine, by using a phase range $[\varphi_2, \varphi_3]$, the amplitude $a_{m,n}$, the quantity N, and the quantity M, a vector that forms the precoding matrix set; where the second phase value $\varphi_2$ is a minimum value of a phase difference between two adjacent antennas in a vector in the precoding matrix set; and the third phase value $\varphi_3$ is a maximum value of the phase difference between two adjacent antennas in the vector in the precoding matrix set.

Further, a form of the vector that forms the precoding matrix set is as follows:

$$B = [v_0 \ v_1 \ \cdots \ v_{N-1}] = \begin{bmatrix} a_{0,0} & a_{0,1} & \cdots & a_{0,N-1} \\ a_{1,0}e^{j\varphi_2} & a_{1,1}e^{j(\varphi_2+\Delta)} & \cdots & a_{1,N-1}e^{j\varphi_3} \\ \vdots & \vdots & a_{m,n}e^{jm(\varphi_2+n\Delta)} & \vdots \\ a_{M-1,0}e^{j(M-1)\varphi_2} & a_{M-1,1}e^{j(M-1)(\varphi_2+\Delta)} & \cdots & a_{M-1,N-1}e^{j(M-1)\varphi_3} \end{bmatrix};$$

where $$\Delta = \frac{\varphi_3 - \varphi_2}{N-1};$$

and

B is the precoding matrix set, $v_n$ is the $n^{th}$ vector in the precoding matrix set, the amplitude $a_{m,n}$ is a real number, 0≤m<M, 0≤n<N, a phase difference between two adjacent antennas in the $n^{th}$ vector in the precoding matrix set is $\varphi_2+n\Delta$, and a phase difference between two $m^{th}$ antennas in two adjacent vectors in the precoding matrix set is $m\Delta$.

Further, the parameter includes at least one of a second phase value $\varphi_2$, a third phase value $\varphi_3$, an amplitude $a_{m,n}$ of an element (m, n) in the precoding matrix set, the quantity N of vectors in the precoding matrix set, a quantity M of elements in each vector in the precoding matrix set, and an integer L, and others, except the parameter, in the second phase value $\varphi_2$, the third phase value $\varphi_3$, the amplitude $a_{m,n}$ of the element (m, n) in the precoding matrix set, the quantity N of vectors in the precoding matrix set, the quantity M of elements in each vector in the precoding matrix set, and the integer L are preset.

The set determining unit 504 is specifically configured to determine, by using a phase range $$\left[\frac{\varphi_2}{L}, \frac{\varphi_3}{L}\right],$$

the amplitude $a_{m,n}$, the quantity N, and the quantity M, a vector that forms the precoding matrix set; where $$\frac{\varphi_2}{L}$$

is a minimum value of a phase difference between two adjacent antennas in a vector in the precoding matrix set; and $$\frac{\varphi_3}{L}$$

is a maximum value of the phase difference between two adjacent antennas in the vector in the precoding matrix set.

Further, a form of the vector that forms the precoding matrix set is as follows:

$$B = [v_0 \ v_1 \ \cdots \ v_{N-1}] = \begin{bmatrix} a_{0,0} & a_{0,1} & \cdots & a_{0,N-1} \\ a_{1,0}e^{j\frac{\varphi_2}{L}} & a_{1,1}e^{j\left(\frac{\varphi_2}{L}+\Delta\right)} & \cdots & a_{1,N-1}e^{j\frac{\varphi_3}{L}} \\ \vdots & \vdots & a_{m,n}e^{jm\left(\frac{\varphi_2}{L}+n\Delta\right)} & \vdots \\ a_{M-1,0}e^{j(M-1)\frac{\varphi_2}{L}} & a_{M-1,1}e^{j(M-1)\left(\frac{\varphi_2}{L}+\Delta\right)} & \cdots & a_{M-1,N-1}e^{j(M-1)\frac{\varphi_3}{L}} \end{bmatrix};$$

where $$\Delta = \frac{\varphi_3 - \varphi_2}{L(N-1)};$$

and

B is the precoding matrix set, $v_n$ is the $n^{th}$ vector in the precoding matrix set, the amplitude $a_{m,n}$ is a real number, 0≤m<M, 0≤n<N, a phase difference between two adjacent antennas in the $n^{th}$ vector in the precoding matrix set is $$\frac{\varphi_2}{L} + n\Delta,$$

and a phase difference between two $m^{th}$ antennas in two adjacent vectors in the precoding matrix set is mΔ.

Further, the parameter includes at least one of a second phase value $\varphi_2$, a third phase value $\varphi_3$, a phase interval Δ, an amplitude $a_{m,n}$ of an element (m, n) in the precoding matrix set, and a quantity M of elements in each vector in the precoding matrix set. Others, except the parameter, in the second phase value $\varphi_2$, the third phase value $\varphi_3$, the phase interval Δ, the amplitude $a_{m,n}$ of the element (m, n) in the precoding matrix set, and the quantity M of elements in each vector in the precoding matrix set are preset.

The set determining unit 504 is specifically configured to determine, by using a phase range [$\varphi_2,\varphi_3$], the phase interval Δ, the amplitude $a_{m,n}$, and the quantity M, a vector that forms the precoding matrix set; where the second phase value $\varphi_2$ is a minimum value of a phase difference between two adjacent antennas in a vector in the precoding matrix set;

the third phase value $\varphi_3$ is a maximum value of the phase difference between two adjacent antennas in the vector in the precoding matrix set; and a phase difference between two adjacent antennas in the $n^{th}$ vector in the precoding matrix set is $\varphi_2+n\Delta$, a phase difference between two $m^{th}$ antennas in two adjacent vectors in the precoding matrix set is mΔ, 0≤m<M, 0≤n<N, N is the quantity of vectors in the precoding matrix set, and $$\Delta = \frac{\varphi_3 - \varphi_2}{N-1}.$$

Further, a form of the vector that forms the precoding matrix set is as follows:

$$B = [v_0 \ v_1 \ \cdots \ v_{N-1}] = \begin{bmatrix} a_{0,0} & a_{0,1} & \cdots & a_{0,N-1} \\ a_{1,0}e^{j\varphi_2} & a_{1,1}e^{j(\varphi_2+\Delta)} & \cdots & a_{1,N-1}e^{j\varphi_3} \\ \vdots & \vdots & a_{m,n}e^{jm(\varphi_2+n\Delta)} & \vdots \\ a_{M-1,0}e^{j(M-1)\varphi_2} & a_{M-1,1}e^{j(M-1)(\varphi_2+\Delta)} & \cdots & a_{M-1,N-1}e^{j(M-1)\varphi_3} \end{bmatrix};$$

where

B is the precoding matrix set, $v_n$ is the $n^{th}$ vector in the precoding matrix set, and the amplitude $a_{m,n}$ is a real number.

Further, the parameter includes at least one of a second phase value $\varphi_2$, a third phase value $\varphi_3$, a phase interval Δ, an amplitude $a_{m,n}$ of an element (m, n) in the precoding matrix set, a quantity M of elements in each vector in the precoding matrix set, and an integer L, and others, except the parameter, in the second phase value $\varphi_2$, the third phase value $\varphi_3$, the phase interval Δ, the amplitude $a_{m,n}$ of the element (m, n) in the precoding matrix set, the quantity M of elements in each vector in the precoding matrix set, and the integer L are preset.

The set determining unit 504 is specifically configured to determine, by using a phase range $$\left[\frac{\varphi_2}{L}, \frac{\varphi_3}{L}\right],$$

the phase interval Δ, the amplitude $a_{m,n}$ and the quantity M, a vector that forms the precoding matrix set; where $$\frac{\varphi_2}{L}$$

is a minimum value of a phase difference between two adjacent antennas in a vector in the precoding matrix set;

$$\frac{\varphi_3}{L}$$

is a maximum value of the phase difference between two adjacent antennas in the vector in the precoding matrix set; and a phase difference between two adjacent antennas in the $n^{th}$ vector in the precoding matrix set is $$\frac{\varphi_2}{L} + n\Delta,$$

a phase difference between two $m^{th}$ antennas in two adjacent vectors in the precoding matrix set is $m\Delta$, $0 \leq m < M$, $0 \leq n < N$, N is the quantity of vectors in the precoding matrix set, and $$\Delta = \frac{\varphi_3 - \varphi_2}{L(N-1)}.$$

Further, a form of the vector that forms the precoding matrix set is as follows:

$$B = [v_0 \ v_1 \ \cdots \ v_{N-1}] = \begin{bmatrix} a_{0,0} & a_{0,1} & \cdots & a_{0,N-1} \\ a_{1,0}e^{j\frac{\varphi_2}{L}} & a_{1,1}e^{j(\frac{\varphi_2}{L}+\Delta)} & \cdots & a_{1,N-1}e^{j\frac{\varphi_3}{L}} \\ \vdots & \vdots & a_{m,n}e^{jm(\frac{\varphi_2}{L}+n\Delta)} & \vdots \\ a_{M-1,0}e^{j(M-1)\frac{\varphi_2}{L}} & a_{M-1,1}e^{j(M-1)(\frac{\varphi_2}{L}+\Delta)} & \cdots & a_{M-1,N-1}e^{j(M-1)\frac{\varphi_3}{L}} \end{bmatrix};$$

where

B is the precoding matrix set, $v_n$ is the $n^{th}$ vector in the precoding matrix set, and the amplitude $a_{m,n}$ is a real number.

Further, the parameter includes at least one of the following: K second phase values, K third phase values, an amplitude $a_{m,n}$ of an element (m, n) in a precoding matrix subset, a quantity of vectors in K precoding matrix subsets, and a quantity M of elements in each vector in a precoding matrix subset, $\varphi_{2,k}$ represents the $k^{th}$ second phase value, $\varphi_{3,k}$ represents the $k^{th}$ third phase value, $N_k$ represents a quantity of vectors in the $k^{th}$ precoding matrix subset, $1 \leq k \leq K$, and others, except the parameter, in the K second phase values, the K third phase values, the amplitude $a_{m,n}$ of the element (m, n) in the precoding matrix subset, the quantity of vectors in the K precoding matrix subsets, and the quantity M of elements in each vector in the precoding matrix subset are preset.

The set determining unit 504 is specifically configured to: determine a precoding matrix subset for each group of the second phase value and the third phase value, where determining the corresponding $k^{th}$ precoding matrix subset for $\varphi_{2,k}$ and $\varphi_{3,k}$ includes:

determining, by using the phase value $\varphi_{2,k}$, the phase value $\varphi_{3,k}$, the amplitude $a_{m,n}$, the quantity $N_k$, and the quantity M, a vector that forms the precoding matrix subset, where the phase value $\varphi_{2,k}$ is a minimum value of a phase difference between two adjacent antennas in a vector in the precoding matrix subset, and the phase value $\varphi_{3,k}$ is a maximum value of a phase difference between two adjacent antennas in a vector in the precoding matrix set; and form the precoding matrix set by using the precoding matrix subsets separately determined for all the groups of the second phase value and the third phase value.

Further, a form of a vector that forms the precoding matrix set and a form of the vector that forms the $k^{th}$ precoding matrix subset are as follows:

$$B = [B_1 \ B_2 \ \cdots \ B_K]; \text{ and } B_k[v_0^k \ v_1^k \ \cdots \ v_{N_k-1}^k] =$$

$$\begin{bmatrix} a_{0,0} & a_{0,1} & \cdots & a_{0,N-1} \\ a_{1,0}e^{j\varphi_{2,k}} & a_{1,1}e^{j(\varphi_{2,k}+\Delta_k)} & \cdots & a_{1,N-1}e^{j\varphi_{3,k}} \\ \vdots & \vdots & a_{m,n}e^{jm(\varphi_{2,k}+n\Delta_k)} & \vdots \\ a_{M-1,0}e^{j(M-1)\varphi_{2,k}} & a_{M-1,1}e^{j(M-1)(\varphi_{2,k}+\Delta_k)} & \cdots & a_{M-1,N-1}e^{j(M-1)\varphi_{3,k}} \end{bmatrix};$$

where $$\Delta_k = \frac{\varphi_{3,k} - \varphi_{2,k}}{N_k - 1};$$

and

B is the precoding matrix set, $B_k$ is the $k^{th}$ precoding matrix subset, $v_n^k$ is the $n^{th}$ vector in the $k^{th}$ precoding matrix subset, $a_{m,n}$ is the amplitude of the element (m, n) and is a real number, a phase difference between two adjacent antennas in the $n^{th}$ vector in the $k^{th}$ precoding matrix subset is $\varphi_{2,k}+n\Delta_k$, a phase difference between two $m^{th}$ antennas in two adjacent vectors in the $k^{th}$ precoding matrix subset is $m\Delta_k$, and $0 \leq m < M$, $0 \leq n < N_k$.

Further, at least two groups in the K second phase values $\varphi_{2,k}$ and $\varphi_{3,k}$ are different.

Further, at least two of quantities $N_k$ of vectors in the K precoding matrix subsets are different.

Further, the parameter includes at least one of the following: K second phase values, K third phase values, K phase intervals, an amplitude $a_{m,n}$ of an element (m, n) in a precoding matrix subset, and a quantity M of elements in each vector in a precoding matrix subset, $\varphi_{2,k}$ represents the $k^{th}$ second phase value, $\varphi_{3,k}$ represents the $k^{th}$ third phase value, $\Delta_k$ represents the $k^{th}$ phase interval, $1 \leq k \leq K$, and others, except the parameter, in the K second phase values, the K third phase values, the K phase intervals, the amplitude $a_{m,n}$ of the element (m, n) in the precoding matrix subset, and the quantity M of elements in each vector in the precoding matrix subset are preset.

The set determining unit 504 is specifically configured to: determine a precoding matrix subset for each group of the second phase value and the third phase value, where determining a corresponding $k^{th}$ precoding matrix subset for $\varphi_{2,k}$ and $\varphi_{3,k}$ includes:

determining, by using the phase value $\varphi_{2,k}$, the phase value $\varphi_{3,k}$, the phase interval $\Delta_k$, the amplitude $a_{m,n}$, and the quantity M, a vector that forms the precoding matrix subset, where the phase value $\varphi_{2,k}$ is a minimum value of a phase difference between two adjacent antennas in a vector in the precoding matrix subset, the phase value $\varphi_{3,k}$ is a maximum value of a phase difference between two adjacent antennas in a vector in the precoding matrix set, a phase difference between two adjacent antennas in the $n^{th}$ vector in the $k^{th}$ precoding matrix subset is $\varphi_{2,k}+n\Delta_k$, a phase difference between two $m^{th}$ antennas in two adjacent vectors in the $k^{th}$ precoding matrix subset is $m\Delta_k$, $0 \leq m < M$, $0 \leq n < N_k$, $N_k$ is a quantity of vectors in the $k^{th}$ precoding matrix subset, and $$\Delta_k = \frac{\varphi_{3,k} - \varphi_{2,k}}{N_k - 1};$$

and form the precoding matrix set by using the precoding matrix subsets separately determined for all the groups of the second phase value and the third phase value.

Further, a form of a vector that forms the precoding matrix set and a form of the vector that forms the $k^{th}$ precoding matrix subset are as follows:

$$B = [B_1 \ B_2 \ \cdots \ B_K]; \text{ and } B_k = [v_0^k \ v_1^k \ \cdots \ v_{N_k-1}^k] =$$

$$\begin{bmatrix} a_{0,0} & a_{0,1} & \cdots & a_{0,N-1} \\ a_{1,0}e^{j\varphi_{2,k}} & a_{1,1}e^{j(\varphi_{2,k}+\Delta_k)} & \cdots & a_{1,N-1}e^{j\varphi_{3,k}} \\ \vdots & \vdots & a_{m,n}e^{jm(\varphi_{2,k}+n\Delta_k)} & \vdots \\ a_{M-1,0}e^{j(M-1)\varphi_{2,k}} & a_{M-1,1}e^{j(M-1)(\varphi_{2,k}+\Delta_k)} & \cdots & a_{M-1,N-1}e^{j(M-1)\varphi_{3,k}} \end{bmatrix};$$

where

B is the precoding matrix set, $B_k$ is the $k^{th}$ precoding matrix subset, $v_n^k$ is the $n^{th}$ vector in the $k^{th}$ precoding matrix subset, and $a_{m,n}$ is the amplitude of the element (m, n) and is a real number.

Further, at least two groups in the K second phase values $\varphi_{2,k}$ and $\varphi_{3,k}$ are different.

Further, at least two of the K phase intervals $\Delta_k$ are different.

Further, the parameter includes at least one of a fourth phase value $\varphi_4$, a phase interval $\Delta$, an amplitude $a_{m,n}$ of an element (m, n) in the precoding matrix set, the quantity N of vectors in the precoding matrix set, and a quantity M of elements in each vector in the precoding matrix set. Others, except the parameter, in the fourth phase value $\varphi_4$, the phase interval $\Delta$, the amplitude $a_{m,n}$ of the element (m, n) in the precoding matrix set, the quantity N of vectors in the precoding matrix set, and the quantity M of elements in each vector in the precoding matrix set are preset.

The set determining unit 504 is specifically configured to determine, by using the fourth phase value $\varphi_4$, the phase interval $\Delta$, the amplitude $a_{m,n}$, the quantity N, and the quantity M, a vector that forms the precoding matrix set; where the fourth phase value $\varphi_4$ is a minimum value of a phase difference between two adjacent antennas in a vector in the precoding matrix set; and a phase difference between two adjacent antennas in the $n^{th}$ vector in the precoding matrix set is $\varphi_4+n\Delta$, a phase difference between two $m^{th}$ antennas in two adjacent vectors in the precoding matrix set is $m\Delta$, and $0 \leq m < M$, $0 \leq n < N$.

Further, a form of the vector that forms the precoding matrix set is as follows:

$$B = [v_0 \ v_1 \ \cdots \ v_{N-1}] =$$

$$\begin{bmatrix} a_{0,0} & a_{0,1} & \cdots & a_{0,N-1} \\ a_{1,0}e^{j\varphi_4} & a_{1,1}e^{j(\varphi_4+\Delta)} & \cdots & a_{1,N-1}e^{j(N-1)\Delta} \\ \vdots & \vdots & a_{m,n}e^{jm(\varphi_4+n\Delta)} & \vdots \\ a_{M-1,0}e^{j(M-1)\varphi_4} & a_{M-1,1}e^{j(M-1)(\varphi_4+\Delta)} & \cdots & a_{M-1,N-1}e^{j(M-1)(N-1)\Delta} \end{bmatrix};$$

where

B is the precoding matrix set, $v_n$ is the $n^{th}$ vector in the precoding matrix set, and the amplitude $a_{m,n}$ is a real number.

Further, the parameter includes at least one of the following: K fourth phase values, K phase intervals, an amplitude $a_{m,n}$ of an element (m, n) in a precoding matrix subset, a quantity of vectors in K precoding matrix subsets, and a quantity M of elements in each vector in a precoding matrix subset, $\varphi_{4,k}$ represents the $k^{th}$ fourth phase value, $\Delta_k$ represents the $k^{th}$ phase interval, $N_k$ represents a quantity of vectors in the $k^{th}$ precoding matrix subset, $1 \leq k \leq K$, and others, except the parameter, in the K fourth phase values, the K phase intervals, the amplitude $a_{m,n}$ of the element (m, n) in the precoding matrix subset, the quantity of vectors in the K precoding matrix subsets, and the quantity M of elements in each vector in the precoding matrix subset are preset.

The set determining unit 504 is specifically configured to:

determine a precoding matrix subset for each phase interval, where determining the corresponding $k^{th}$ precoding matrix subset for $\varphi_{4,k}$ and $\Delta_k$ includes:

determining, by using the phase value $\varphi_{4,k}$, the phase interval $\Delta_k$, the amplitude $a_{m,n}$, the quantity $N_k$, and the quantity M, a vector that forms the precoding matrix subset, where the phase value $\varphi_{4,k}$ is a minimum value of a phase difference between two adjacent antennas in a vector in the precoding matrix subset, a phase difference between two adjacent antennas in the $n^{th}$ vector in the $k^{th}$ precoding matrix subset is $\varphi_{4,k}+n\Delta_k$, a phase difference between two $m^{th}$ antennas in two adjacent vectors in the $k^{th}$ precoding matrix subset is $m\Delta_k$, and $0 \leq m < M$, $0 \leq n < N_k$; and form the precoding matrix set by using the precoding matrix subsets separately determined for all the phase intervals.

Further, a form of a vector that forms the precoding matrix set and a form of the vector that forms the $k^{th}$ precoding matrix subset are as follows:

$$B = [B_1 \ B_2 \ \cdots \ B_K]; \text{ and } B_k = [v_0^k \ v_1^k \ \cdots \ v_{N_k-1}^k] =$$

$$\begin{bmatrix} a_{0,0} & a_{0,1} & \cdots & a_{0,N_k-1} \\ a_{1,0}e^{j\varphi_{4,k}} & a_{1,1}e^{j(\varphi_{4,k}+\Delta_k)} & \cdots & a_{1,N-1}e^{j(\varphi_{4,k}+(N_k-1)\Delta_k)} \\ \vdots & \vdots & a_{m,n}e^{jm(\varphi_{4,k}+n\Delta_k)} & \vdots \\ a_{M_k-1,0}e^{j(M_k-1)\varphi_{4,k}} & a_{M_k-1,1}e^{j(M_k-1)(\varphi_{4,k}+\Delta_k)} & \cdots & a_{M_k-1,N_k-1}e^{j(M_k-1)(\varphi_{4,k}+(N_k-1)\Delta_k)} \end{bmatrix};$$

where

B is the precoding matrix set, $B_k$ is the $k^{th}$ precoding matrix subset, $v_n^k$ is the $n^{th}$ vector in the $k^{th}$ precoding matrix subset, and $a_{m,n}$ is the amplitude of the element (m, n) and is a real number.

Further, at least two of the K fourth phase values $\varphi_{4,k}$ are different.

Further, at least two of quantities $N_k$ of vectors in the K precoding matrix subsets are different.

Further, at least two of the K phase intervals $\Delta_k$ are different.

Further, the parameter includes at least one of a fourth phase value $\varphi_4$, K phase intervals, an amplitude $a_{m,n}$ of an element (m, n) in a precoding matrix subset, a quantity of vectors in K precoding matrix subsets, and a quantity M of elements in each vector in a precoding matrix subset, $\Delta_k$ represents the $k^{th}$ phase interval in the K different phase intervals, $N_k$ represents a quantity of vectors in the $k^{th}$ precoding matrix subset, $1 \leq k \leq K$, and others, except the parameter, in the fourth phase value $\varphi_4$, the K phase intervals, the amplitude $a_{m,n}$ of the element (m, n) in the precoding matrix subset, the quantity of vectors in the K precoding matrix subsets, and the quantity M of elements in each vector in the precoding matrix subset are preset.

The set determining unit 504 is specifically configured to: determine a precoding matrix subset for each phase interval, where determining the corresponding $k^{th}$ precoding matrix subset for $\Delta_k$ includes:

determining, by using a phase value $\varphi$, the phase interval $\Delta_k$, the amplitude $a_{m,n}$, the quantity $N_k$, and the quantity M, a vector that forms the precoding matrix subset, where the phase value $\varphi$ is a minimum value of a phase difference between two adjacent antennas in a vector in the precoding matrix subset; when k is 1, $\varphi$ is $\varphi_4$, and otherwise, $$\varphi = \varphi_4 + \sum_{i=1}^{k-1} N_i \Delta_i;$$

a phase difference between two adjacent antennas in the $n^{th}$ vector in the $k^{th}$ precoding matrix subset is $\varphi + n\Delta_k$; a phase difference between two $m^{th}$ antennas in two adjacent vectors in the $k^{th}$ precoding matrix subset is $m\Delta_k$; and $0 \leq m < M$, $0 \leq n < N_k$; and form the precoding matrix set by using the precoding matrix subsets separately determined for all the phase intervals.

Further, a form of a vector that forms the precoding matrix set and a form of the vector that forms the $k^{th}$ precoding matrix subset are as follows:

$$B = [B_1 \ B_2 \ \cdots \ B_K]; \text{ and } B_k = [v_0^k \ v_1^k \ \cdots \ v_{N_k-1}^k] =$$

$$\begin{bmatrix} a_{0,0} & a_{0,1} & \cdots & a_{0,N_k-1} \\ a_{1,0}e^{j\varphi} & a_{1,1}e^{j(\varphi+\Delta_k)} & \cdots & a_{1,N_k-1}e^{j(\varphi+(N_k-1)\Delta_k)} \\ \vdots & \vdots & a_{m,n}e^{jm(\varphi+n\Delta_k)} & \vdots \\ a_{M_k-1,0}e^{j(M_k-1)\varphi} & a_{M_k-1,1}e^{j(M_k-1)(\varphi+\Delta_k)} & \cdots & a_{M_k-1,N_k-1}e^{j(M_k-1)(\varphi+(N_k-1)\Delta_k)} \end{bmatrix};$$

where

B is the precoding matrix set, $B_k$ is the $k^{th}$ precoding matrix subset, $v_n^k$ is the $n^{th}$ vector in the $k^{th}$ precoding matrix subset, and $a_{m,n}$ is the amplitude of the element (m, n) and is a real number.

Further, at least two of quantities $N_k$ of vectors in the K precoding matrix subsets are different.

Further, at least two of the K phase intervals $\Delta_k$ are different.

Embodiment 15

Figure 6:
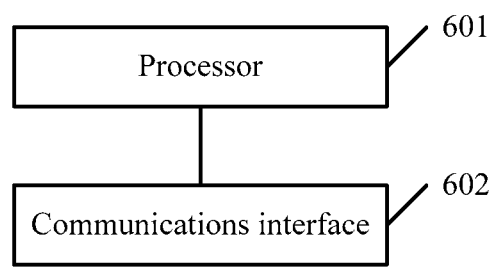
FIG. 6 is a schematic structural diagram of a network device according to Embodiment 15 of the present invention.

Based on a same invention concept, according to the precoding matrix set determining method provided in the foregoing embodiment of the present invention, correspondingly, Embodiment 15 of the present invention further provides a network device. For ease of description, the network device is referred to as a first network device. A schematic structural diagram of the first network device is shown in FIG. 6, and the first network device specifically includes:

a processor 601, configured to: determine a parameter used for determining a precoding matrix set, where the parameter includes at least one of a phase parameter, an amplitude parameter, a quantity of vectors in the precoding matrix set, a quantity of vectors in a first codebook set in dual-codebook feedback, and a quantity of vectors in a second codebook set in the dual-codebook feedback, and the parameter is not fixed; and determine the precoding matrix set by using the parameter, where the precoding matrix set includes at least one precoding matrix; and a communications interface 602, configured to communicate with another network device.

Further, the parameter is cell-specific.

Further, the parameter is terminal-specific.

Further, the parameter is CSI process-specific.

Further, the parameter is carrier-specific.

Further, the parameter is rank-specific.

Further, the parameter is specific to a precoding matrix subset in a dual-codebook feedback manner; and the precoding matrix set determined by using the parameter is a precoding matrix subset of a first codebook W1 or a second codebook W2 in the dual-codebook feedback manner.

Further, the parameter includes multiple groups of parameters used for determining different precoding matrix subsets.

The processor 601 is specifically configured to: separately determine respective precoding matrix subsets by using the groups of parameters; and form the precoding matrix set by using the precoding matrix subsets separately determined for the groups of parameters.

Further, for a dual-codebook structure, W=W1*W2, $$W1 = \begin{bmatrix} U & 0 \\ 0 & U \end{bmatrix},$$

W1 is a diagonal matrix, each U in W1 is a precoding matrix subset, each U is corresponding to a group of parameters, and U corresponding to the group of parameters is determined according to the group of parameters.

Further, the communications interface 602 is specifically configured to receive first parameter indication information sent by a second network device, where the first parameter indication information is used to indicate the parameter used for determining the precoding matrix set.

The processor 601 is specifically configured to determine, according to the first parameter indication information, the parameter used for determining the precoding matrix set.

Further, the first parameter indication information is sent by using broadcast signaling, radio resource control RRC signaling, or dynamic signaling.

Further, the communications interface 602 is further configured to feed back second parameter indication information to a second network device, where the second parameter indication information is used to indicate a reference parameter used for determining the precoding matrix set, and the reference parameter includes at least one of a reference phase parameter, a reference amplitude parameter, a reference quantity of vectors in the precoding matrix set, a reference quantity of vectors in the first codebook set in the dual-codebook feedback, and a reference quantity of vectors in the second codebook set in the dual-codebook feedback.

Further, the processor 601 is specifically configured to: determine, according to indication information carried in a user ID, a cell ID, a CSI process ID, a carrier ID, a DMRS configuration parameter, a CSI-RS configuration parameter, system bandwidth allocated to the first network device, a PRG, or a subband size, a preset parameter corresponding to the indication information, and use the preset parameter as the parameter used for determining the precoding matrix set.

Further, the processor 601 is further configured to select, from the determined precoding matrix set, a precoding matrix that needs to be reported to a second network device.

The communications interface 602 is specifically configured to feed back matrix indication information of the selected precoding matrix to the second network device.

Further, the first network device is a terminal, and the second network device is a base station; or both the first network device and the second network device are base stations; or both the first network device and the second network device are terminals.

Further, the parameter includes at least one of a first phase value $\varphi_1$, an amplitude $a_{m,n}$ of an element (m, n) in the precoding matrix set, the quantity N of vectors in the precoding matrix set, and a quantity M of elements in each vector in the precoding matrix set. Others, except the parameter, in the first phase value $\varphi_1$, the amplitude $a_{m,n}$ of the element (m, n) in the precoding matrix set, the quantity N of vectors in the precoding matrix set, and the quantity M of elements in each vector in the precoding matrix set are preset.

The processor 601 is specifically configured to determine, by using a phase range $[0,\varphi_1]$, the amplitude $a_{m,n}$, the quantity N, and the quantity M, a vector that forms the precoding matrix set; where 0 is a minimum value of a phase difference between two adjacent antennas in a vector in the precoding matrix set; and the first phase value $\varphi_1$ is a maximum value of the phase difference between two adjacent antennas in the vector in the precoding matrix set.

Further, a form of the vector that forms the precoding matrix set is as follows:

$$B = [v_0 \ v_1 \ \cdots \ v_{N-1}] = \begin{bmatrix} a_{0,0} & a_{0,1} & \cdots & a_{0,N-1} \\ a_{1,0} & a_{1,1}e^{j\frac{\varphi_1}{N-1}} & \cdots & a_{1,N-1}e^{j\varphi_1} \\ \vdots & \vdots & a_{m,n}e^{j\frac{mn\varphi_1}{N-1}} & \vdots \\ a_{M-1,0} & a_{M-1,1}e^{j(M-1)\frac{\varphi_1}{N-1}} & \cdots & a_{M-1,N-1}e^{j(M-1)\varphi_1} \end{bmatrix};$$

where

B is the precoding matrix set, $v_n$ is the $n^{th}$ vector in the precoding matrix set, the amplitude $a_{m,n}$ is a real number, and $0 \le m < M$, $0 \le n < N$.

Further, the parameter includes at least one of a first phase value $\varphi_1$, an amplitude $a_{m,n}$ of an element (m, n) in the precoding matrix set, the quantity N of vectors in the precoding matrix set, and a quantity M of elements in each vector in the precoding matrix set. Others, except the parameter, in the first phase value $\varphi_1$, the amplitude $a_{m,n}$ of the element (m, n) in the precoding matrix set, the quantity N of vectors in the precoding matrix set, and the quantity M of elements in each vector in the precoding matrix set are preset.

The processor 601 is specifically configured to determine, by using a phase range $$\left[0, \frac{(N-1)\varphi_1}{N}\right],$$

the amplitude $a_{m,n}$, the quantity N, and the quantity M, a vector that forms the precoding matrix set; where 0 is a minimum value of a phase difference between two adjacent antennas in a vector in the precoding matrix set; and $$\frac{(N-1)\varphi_1}{N}$$

is a maximum value of the phase difference between two adjacent antennas in the vector in the precoding matrix set.

Further, a form of the vector that forms the precoding matrix set is as follows:

$$B = [v_0 \ v_1 \ \cdots \ v_{N-1}] = \begin{bmatrix} a_{0,0} & a_{0,1} & \cdots & a_{0,N-1} \\ a_{1,0} & a_{1,1}e^{j\frac{\varphi_1}{N}} & \cdots & a_{1,N-1}e^{j\frac{(N-1)\varphi_1}{N}} \\ \vdots & \vdots & a_{m,n}e^{j\frac{mn\varphi_1}{N}} & \vdots \\ a_{M-1,0} & a_{M-1,1}e^{j(M-1)\frac{\varphi_1}{N}} & \cdots & a_{M-1,N-1}e^{j(M-1)\frac{(N-1)\varphi_1}{N}} \end{bmatrix};$$

where

B is the precoding matrix set, $v_n$ is the $n^{th}$ vector in the precoding matrix set, the amplitude $a_{m,n}$ is a real number, and $0 \le m < M$, $0 \le n < N$.

Further, the parameter includes at least one of a second phase value $\varphi_2$, a third phase value $\varphi_3$, an amplitude $a_{m,n}$ of an element (m, n) in the precoding matrix set, the quantity N of vectors in the precoding matrix set, and a quantity M of elements in each vector in the precoding matrix set. Others, except the parameter, in the second phase value $\varphi_2$, the third phase value $\varphi_3$, the amplitude $a_{m,n}$ of the element (m, n) in the precoding matrix set, the quantity N of vectors in the precoding matrix set, and the quantity M of elements in each vector in the precoding matrix set are preset.

The processor 601 is specifically configured to determine, by using a phase range $[\varphi_2,\varphi_3]$, the amplitude $a_{m,n}$, the quantity N, and the quantity M, a vector that forms the precoding matrix set; where the second phase value $\varphi_2$ is a minimum value of a phase difference between two adjacent antennas in a vector in the precoding matrix set; and the third phase value $\varphi_3$ is a maximum value of the phase difference between two adjacent antennas in the vector in the precoding matrix set.

Further, a form of the vector that forms the precoding matrix set is as follows:

$$B = [v_0 \ v_1 \ \cdots \ v_{N-1}] = \begin{bmatrix} a_{0,0} & a_{0,1} & \cdots & a_{0,N-1} \\ a_{1,0}e^{j\varphi_2} & a_{1,1}e^{j(\varphi_2+\Delta)} & \cdots & a_{1,N-1}e^{j\varphi_3} \\ \vdots & \vdots & a_{m,n}e^{jm(\varphi_2+n\Delta)} & \vdots \\ a_{M-1,0}e^{j(M-1)\varphi_2} & a_{M-1,1}e^{j(M-1)(\varphi_2+\Delta)} & \cdots & a_{M-1,N-1}e^{j(M-1)\varphi_3} \end{bmatrix};$$

where $$\Delta = \frac{\varphi_3 - \varphi_2}{N-1};$$

and

B is the precoding matrix set, $v_n$ is the $n^{th}$ vector in the precoding matrix set, the amplitude $a_{m,n}$ is a real number, $0 \leq m < M$, $0 \leq n < N$, a phase difference between two adjacent antennas in the $n^{th}$ vector in the precoding matrix set is $\varphi_2 + n\Delta$, and a phase difference between two $m^{th}$ antennas in two adjacent vectors in the precoding matrix set is $m\Delta$.

Further, the parameter includes at least one of a second phase value $\varphi_2$, a third phase value $\varphi_3$, an amplitude $a_{m,n}$ of an element (m, n) in the precoding matrix set, the quantity N of vectors in the precoding matrix set, a quantity M of elements in each vector in the precoding matrix set, and an integer L, and others, except the parameter, in the second phase value $\varphi_2$, the third phase value $\varphi_3$, the amplitude $a_{m,n}$ of the element (m, n) in the precoding matrix set, the quantity N of vectors in the precoding matrix set, the quantity M of elements in each vector in the precoding matrix set, and the integer L are preset.

The processor 601 is specifically configured to determine, by using a phase range $$\left[\frac{\varphi_2}{L}, \frac{\varphi_3}{L}\right],$$

the amplitude $a_{m,n}$, the quantity N, and the quantity M, a vector that forms the precoding matrix set; where $$\frac{\varphi_2}{L}$$

is a minimum value of a phase difference between two adjacent antennas in a vector in the precoding matrix set; and $$\frac{\varphi_3}{L}$$

is a maximum value of the phase difference between two adjacent antennas in the vector in the precoding matrix set.

Further, a form of the vector that forms the precoding matrix set is as follows:

$$B = [v_0 \ v_1 \ \cdots \ v_{N-1}] = \begin{bmatrix} a_{0,0} & a_{0,1} & \cdots & a_{0,N-1} \\ a_{1,0}e^{j\frac{\varphi_2}{L}} & a_{1,1}e^{j\left(\frac{\varphi_2}{L}+\Delta\right)} & \cdots & a_{1,N-1}e^{j\frac{\varphi_3}{L}} \\ \vdots & \vdots & a_{m,n}e^{jm\left(\frac{\varphi_2}{L}+n\Delta\right)} & \vdots \\ a_{M-1,0}e^{j(M-1)\frac{\varphi_2}{L}} & a_{M-1,1}e^{j(M-1)\left(\frac{\varphi_2}{L}+\Delta\right)} & \cdots & a_{M-1,N-1}e^{j(M-1)\frac{\varphi_3}{L}} \end{bmatrix};$$

where $$\Delta = \frac{\varphi_3 - \varphi_2}{L(N-1)};$$

and

B is the precoding matrix set, $v_n$ is the $n^{th}$ vector in the precoding matrix set, the amplitude $a_{m,n}$ is a real number, $0 \leq m < M$, $0 \leq n < N$, a phase difference between two adjacent antennas in the $n^{th}$ vector in the precoding matrix set is $$\frac{\varphi_2}{L} + n\Delta,$$

and a phase difference between two $m^{th}$ antennas in two adjacent vectors in the precoding matrix set is $m\Delta$.

Further, the parameter includes at least one of a second phase value $\varphi_2$, a third phase value $\varphi_3$, a phase interval $\Delta$, an amplitude $a_{m,n}$ of an element (m, n) in the precoding matrix set, and a quantity M of elements in each vector in the precoding matrix set. Others, except the parameter, in the second phase value $\varphi_2$, the third phase value $\varphi_3$, the phase interval $\Delta$, the amplitude $a_{m,n}$ of the element (m, n) in the precoding matrix set, and the quantity M of elements in each vector in the precoding matrix set are preset.

The processor 601 is specifically configured to determine, by using a phase range $[\varphi_2, \varphi_3]$, the phase interval $\Delta$, the amplitude $a_{m,n}$ and the quantity M, a vector that forms the precoding matrix set; where the second phase value $\varphi_2$ is a minimum value of a phase difference between two adjacent antennas in a vector in the precoding matrix set;

the third phase value $\varphi_3$ is a maximum value of the phase difference between two adjacent antennas in the vector in the precoding matrix set; and a phase difference between two adjacent antennas in the $n^{th}$ vector in the precoding matrix set is $\varphi_2 + n\Delta$, a phase difference between two $m^{th}$ antennas in two adjacent vectors in the precoding matrix set is $m\Delta$, $0 \leq m < M$, $0 \leq n < N$, N is the quantity of vectors in the precoding matrix set, and $$\Delta = \frac{\varphi_3 - \varphi_2}{N-1}.$$

Further, a form of the vector that forms the precoding matrix set is as follows:

$$B = [v_0 \ v_1 \ \cdots \ v_{N-1}] = \begin{bmatrix} a_{0,0} & a_{0,1} & \cdots & a_{0,N-1} \\ a_{1,0}e^{j\varphi_2} & a_{1,1}e^{j(\varphi_2+\Delta)} & \cdots & a_{1,N-1}e^{j\varphi_3} \\ \vdots & \vdots & a_{m,n}e^{jm(\varphi_2+n\Delta)} & \vdots \\ a_{M-1,0}e^{j(M-1)\varphi_2} & a_{M-1,1}e^{(\varphi_2+\Delta)} & \cdots & a_{M-1,N-1}e^{j(M-1)\varphi_3} \end{bmatrix};$$

where

B is the precoding matrix set, $v_n$ is the $n^{th}$ vector in the precoding matrix set, and the amplitude $a_{m,n}$ is a real number.

Further, the parameter includes at least one of a second phase value $\varphi_2$, a third phase value $\varphi_3$, a phase interval $\Delta$, an amplitude $a_{m,n}$ of an element (m, n) in the precoding matrix set, a quantity M of elements in each vector in the precoding matrix set, and an integer L, and others, except the parameter, in the second phase value $\varphi_2$, the third phase value $\varphi_3$, the phase interval $\Delta$, the amplitude $a_{m,n}$ of the element (m, n) in the precoding matrix set, the quantity M of elements in each vector in the precoding matrix set, and the integer L are preset.

The processor 601 is specifically configured to determine, by using a phase range $$\left[\frac{\varphi_2}{L}, \frac{\varphi_3}{L}\right],$$

the phase interval $\Delta$, the amplitude $a_{m,n}$, and the quantity M, a vector that forms the precoding matrix set; where $$\frac{\varphi_2}{L}$$

is a minimum value of a phase difference between two adjacent antennas in a vector in the precoding matrix set;

$$\frac{\varphi_3}{L}$$

is a maximum value of the phase difference between two adjacent antennas in the vector in the precoding matrix set; and a phase difference between two adjacent antennas in the $n^{th}$ vector in the precoding matrix set is $$\frac{\varphi_2}{L} + n\Delta,$$

a phase difference between two $m^{th}$ antennas in two adjacent vectors in the precoding matrix set is $m\Delta$, $0 \le m < M$, $0 \le n < N$, N is the quantity of vectors in the precoding matrix set, and $$\Delta = \frac{\varphi_3 - \varphi_2}{L(N-1)}.$$

Further, a form of the vector that forms the precoding matrix set is as follows:

where

B is the precoding matrix set, $v_n$ is the $n^{th}$ vector in the precoding matrix set, and the amplitude $a_{m,n}$ is a real number.

Further, the parameter includes at least one of the following: K second phase values, K third phase values, an amplitude $a_{m,n}$ of an element (m, n) in a precoding matrix subset, a quantity of vectors in K precoding matrix subsets, and a quantity M of elements in each vector in a precoding matrix subset, $\varphi_{2,k}$ represents the $k^{th}$ second phase value, $\varphi_{3,k}$ represents the $k^{th}$ third phase value, $N_k$ represents a quantity of vectors in the $k^{th}$ precoding matrix subset, $1 \le k \le K$, and others, except the parameter, in the K second phase values, the K third phase values, the amplitude $a_{m,n}$ of the element (m, n) in the precoding matrix subset, the quantity of vectors in the K precoding matrix subsets, and the quantity M of elements in each vector in the precoding matrix subset are preset.

The processor 601 is specifically configured to: determine a precoding matrix subset for each group of the second phase value and the third phase value, where determining the corresponding $k^{th}$ precoding matrix subset for $\varphi_{2,k}$ and $\varphi_{3,k}$ includes:

determining, by using the phase value $\varphi_{2,k}$, the phase value $\varphi_{3,k}$, the amplitude $a_{m,n}$, the quantity $N_k$, and the quantity M, a vector that forms the precoding matrix subset, where the phase value $\varphi_{2,k}$ is a minimum value of a phase difference between two adjacent antennas in a vector in the precoding matrix subset, and the phase value $\varphi_{3,k}$ is a maximum value of a phase difference between two adjacent antennas in a vector in the precoding matrix set; and form the precoding matrix set by using the precoding matrix subsets separately determined for all the groups of the second phase value and the third phase value.

Further, a form of a vector that forms the precoding matrix set and a form of the vector that forms the $k^{th}$ precoding matrix subset are as follows:

$$B = [v_0 \ v_1 \ \cdots \ v_{N-1}] =$$

$$\begin{bmatrix} a_{0,0} & a_{0,1} & \cdots & a_{0,N-1} \\ a_{1,0}e^{j\frac{\varphi_2}{L}} & a_{1,1}e^{j\left(\frac{\varphi_2}{L}+\Delta\right)} & \cdots & a_{1,N-1}e^{j\frac{\varphi_3}{L}} \\ \vdots & \vdots & a_{m,n}e^{jm\left(\frac{\varphi_2}{L}+n\Delta\right)} & \vdots \\ a_{M-1,0}e^{j(M-1)\frac{\varphi_2}{L}} & a_{M-1,1}e^{j(M-1)\left(\frac{\varphi_2}{L}+\Delta\right)} & \cdots & a_{M-1,N-1}e^{j(M-1)\frac{\varphi_3}{L}} \end{bmatrix};$$

$B = [B_1 \ B_2 \ \cdots \ B_K]$; and $$B_k = \begin{bmatrix} v_0^k & v_1^k & \cdots & v_{N_k-1}^k \end{bmatrix}$$

$$= \begin{bmatrix} a_{0,0} & a_{0,1} & \cdots & a_{0,N-1} \\ a_{1,0}e^{j\varphi_{2,k}} & a_{1,1}e^{j(\varphi_{2,k}+\Delta_k)} & \cdots & a_{1,N-1}e^{j\varphi_{3,k}} \\ \vdots & \vdots & a_{m,n}e^{jm(\varphi_{2,k}+n\Delta)} & \vdots \\ a_{M-1,0}e^{j(M-1)\varphi_{2,k}} & a_{M-1,1}e^{j(M-1)(\varphi_{2,k}+\Delta_k)} & \cdots & a_{M-1,N-1}e^{j(M-1)\varphi_{3,k}} \end{bmatrix};$$

where $$\Delta_k = \frac{\varphi_{3,k} - \varphi_{2,k}}{N_k - 1};$$

and

B is the precoding matrix set, $B_k$ is the $k^{th}$ precoding matrix subset, $v_n^k$ is the $n^{th}$ vector in the $k^{th}$ precoding matrix subset, $a_{m,n}$ is the amplitude of the element (m, n) and is a real number, a phase difference between two adjacent antennas in the $n^{th}$ vector in the $k^{th}$ precoding matrix subset is $\varphi_{2,k}+n\Delta_k$, a phase difference between two $m^{th}$ antennas in two adjacent vectors in the $k^{th}$ precoding matrix subset is $m\Delta_k$, and $0 \leq m < M$, $0 \leq n < N_k$.

Further, at least two groups in the K second phase values $\varphi_{2,k}$ and $\varphi_{3,k}$ are different.

Further, at least two of quantities $N_k$ of vectors in the K precoding matrix subsets are different.

Further, the parameter includes at least one of the following: K second phase values, K third phase values, K phase intervals, an amplitude $a_{m,n}$ of an element (m, n) in a precoding matrix subset, and a quantity M of elements in each vector in a precoding matrix subset, $\varphi_{2,k}$ represents the $k^{th}$ second phase value, $\varphi_{3,k}$ represents the $k^{th}$ third phase value, $\Delta_k$ represents the $k^{th}$ phase interval, $1 \leq k \leq K$, and others, except the parameter, in the K second phase values, the K third phase values, the K phase intervals, the amplitude $a_{m,n}$ of the element (m, n) in the precoding matrix subset, and the quantity M of elements in each vector in the precoding matrix subset are preset.

The processor 601 is specifically configured to: determine a precoding matrix subset for each group of the second phase value and the third phase value, where determining a corresponding $k^{th}$ precoding matrix subset for $\varphi_{2,k}$ and $\varphi_{3,k}$ includes:

determining, by using the phase value $\varphi_{2,k}$, the phase value $\varphi_{3,k}$, the phase interval $\Delta_k$, the amplitude $a_{m,n}$, and the quantity M, a vector that forms the precoding matrix subset, where the phase value $\varphi_{2,k}$ is a minimum value of a phase difference between two adjacent antennas in a vector in the precoding matrix subset, the phase value $\varphi_{3,k}$ is a maximum value of a phase difference between two adjacent antennas in a vector in the precoding matrix subset, a phase difference between two adjacent antennas in the $n^{th}$ vector in the $k^{th}$ precoding matrix subset is $\varphi_{2,k}+n\Delta_k$, a phase difference between two $m^{th}$ antennas in two adjacent vectors in the $k^{th}$ precoding matrix subset is $m\Delta_k$, $0 \leq m < M$, $0 \leq n < N_k$, $N_k$ is a quantity of vectors in the $k^{th}$ precoding matrix subset, and $$\Delta_k = \frac{\varphi_{3,k} - \varphi_{2,k}}{N_k - 1};$$

and form the precoding matrix set by using the precoding matrix subsets separately determined for all the groups of the second phase value and the third phase value.

Further, a form of a vector that forms the precoding matrix set and a form of the vector that forms the $k^{th}$ precoding matrix subset are as follows:

$B = [B_1 \ B_2 \ \cdots \ B_K]$; and $$B_k = \begin{bmatrix} v_0^k & v_1^k & \cdots & v_{N_k-1}^k \end{bmatrix}$$

$$= \begin{bmatrix} a_{0,0} & a_{0,1} & \cdots & a_{0,N-1} \\ a_{1,0}e^{j\varphi_{2,k}} & a_{1,1}e^{j(\varphi_{2,k}+\Delta_k)} & \cdots & a_{1,N-1}e^{j\varphi_{3,k}} \\ \vdots & \vdots & a_{m,n}e^{jm(\varphi_{2,k}+n\Delta_k)} & \vdots \\ a_{M-1,0}e^{j(M-1)\varphi_{2,k}} & a_{M-1,1}e^{j(M-1)(\varphi_{2,k}+\Delta_k)} & \cdots & a_{M-1,N-1}e^{j(M-1)\varphi_{3,k}} \end{bmatrix};$$

where

B is the precoding matrix set, $B_k$ is the $k^{th}$ precoding matrix subset, $v_n^k$ is the $n^{th}$ vector in the $k^{th}$ precoding matrix subset, and $a_{m,n}$ is the amplitude of the element (m, n) and is a real number.

Further, at least two groups in the K second phase values $\varphi_{2,k}$ and $\varphi_{3,k}$ are different.

Further, at least two of the K phase intervals $\Delta_k$ are different.

Further, the parameter includes at least one of a fourth phase value $\varphi_4$, a phase interval $\Delta$, an amplitude $a_{m,n}$ of an element (m, n) in the precoding matrix set, the quantity N of vectors in the precoding matrix set, and a quantity M of elements in each vector in the precoding matrix set. Others, except the parameter, in the fourth phase value $\varphi_4$, the phase interval $\Delta$, the amplitude $a_{m,n}$ of the element (m, n) in the precoding matrix set, the quantity N of vectors in the precoding matrix set, and the quantity M of elements in each vector in the precoding matrix set are preset.

The processor 601 is specifically configured to determine, by using the fourth phase value $\varphi_4$, the phase interval $\Delta$, the amplitude $a_{m,n}$, the quantity N, and the quantity M, a vector that forms the precoding matrix set; where the fourth phase value $\varphi_4$ is a minimum value of a phase difference between two adjacent antennas in a vector in the precoding matrix set; and a phase difference between two adjacent antennas in the $n^{th}$ vector in the precoding matrix set is $\varphi_4+n\Delta$, a phase difference between two $m^{th}$ antennas in two adjacent vectors in the precoding matrix set is $m\Delta$, and $0 \leq m < M$, $0 \leq n < N$.

Further, a form of the vector that forms the precoding matrix set is as follows:

$$B = [v_0 \ v_1 \ \cdots \ v_{N-1}]$$

$$= \begin{bmatrix} a_{0,0} & a_{0,1} & \cdots & a_{0,N-1} \\ a_{1,0}e^{j\varphi_4} & a_{1,1}e^{j(\varphi_4+\Delta)} & \cdots & a_{1,N-1}e^{j(\varphi_4+(N-1)\Delta)} \\ \vdots & \vdots & a_{m,n}e^{jm(\varphi_4+n\Delta)} & \vdots \\ a_{M-1,0}e^{j(M-1)\varphi_4} & a_{M-1,1}e^{j(M-1)(\varphi_4+\Delta)} & \cdots & a_{M-1,N-1}e^{j(M-1)(\varphi_4+(N-1)\Delta)} \end{bmatrix};$$

where

B is the precoding matrix set, $v_n$ is the $n^{th}$ vector in the precoding matrix set, and the amplitude $a_{m,n}$ is a real number.

Further, the parameter includes at least one of the following: K fourth phase values, K phase intervals, an amplitude $a_{m,n}$ of an element (m, n) in a precoding matrix subset, a quantity of vectors in K precoding matrix subsets, and a quantity M of elements in each vector in a precoding matrix subset, $\varphi_{4,k}$ represents the $k^{th}$ fourth phase value, $\Delta_k$ represents the $k^{th}$ phase interval $\Delta$, $N_k$ represents a quantity of vectors in the $k^{th}$ precoding matrix subset, $1 \leq k \leq K$, and others, except the parameter, in the K fourth phase values, the K phase intervals, the amplitude $a_{m,n}$ of the element (m, n) in the precoding matrix subset, the quantity of vectors in the K precoding matrix subsets, and the quantity M of elements in each vector in the precoding matrix subset are preset.

The processor 601 is specifically configured to: determine a precoding matrix subset for each phase interval, where determining a corresponding $k^{th}$ precoding matrix subset for $\varphi_{4,k}$ and $\Delta_k$ includes:

determining, by using the phase value $\varphi_{4,k}$, the phase interval $\Delta_k$, the amplitude $a_{m,n}$, the quantity $N_k$, and the quantity M, a vector that forms the precoding matrix subset, where the phase value $\varphi_{4,k}$ is a minimum value of a phase difference between two adjacent antennas in a vector in the precoding matrix subset, a phase difference between two adjacent antennas in the $n^{th}$ vector in the $k^{th}$ precoding matrix subset is $\varphi_{4,k}+n\Delta_k$, a phase difference between two $m^{th}$ antennas in two adjacent vectors in the $k^{th}$ precoding matrix subset is $m\Delta_k$, and $0 \leq m < M$, $0 \leq n < N_k$; and form the precoding matrix set by using the precoding matrix subsets separately determined for all the phase intervals.

Further, a form of a vector that forms the precoding matrix set and a form of the vector that forms the $k^{th}$ precoding matrix subset are as follows:

$$B = [B_1 \ B_2 \ \cdots \ B_K]; \text{ and}$$

$$B_k = [v_0^k \ v_1^k \ \cdots \ v_{N_k-1}^k]$$

$$= \begin{bmatrix} a_{0,0} & a_{0,1} & \cdots & a_{0,N_k-1} \\ a_{1,0}e^{j\varphi_{4,k}} & a_{1,1}e^{j(\varphi_{4,k}+\Delta_k)} & \cdots & a_{1,N_k-1}e^{j(\varphi_{4,k}+(N_k-1)\Delta_k)} \\ \vdots & \vdots & a_{m,n}e^{jm(\varphi_{4,k}+n\Delta_k)} & \vdots \\ a_{M_k-1,0}e^{j(M_k-1)\varphi_{4,k}} & a_{M_k-1,1}e^{j(M_k-1)(\varphi_{4,k}+\Delta_k)} & \cdots & a_{M_k-1,N_k-1}e^{j(M_k-1)(\varphi_{4,k}+(N_k-1)\Delta_k)} \end{bmatrix};$$

where

B is the precoding matrix set, $B_k$ is the $k^{th}$ precoding matrix subset, $v_n^k$ is the $n^{th}$ vector in the $k^{th}$ precoding matrix subset, and $a_{m,n}$ is the amplitude of the element (m, n) and is a real number.

Further, at least two of the K fourth phase values $\varphi_{4,k}$ are different.

Further, at least two of quantities $N_k$ of vectors in the K precoding matrix subsets are different.

Further, at least two of the K phase intervals $\Delta_k$ are different.

Further, the parameter includes at least one of a fourth phase value $\varphi_4$, K phase intervals, an amplitude $a_{m,n}$ of an element (m, n) in a precoding matrix subset, a quantity of vectors in K precoding matrix subsets, and a quantity M of elements in each vector in a precoding matrix subset, $\Delta_k$ represents the $k^{th}$ phase interval in the K different phase intervals, $N_k$ represents a quantity of vectors in the $k^{th}$ precoding matrix subset, $1 \leq k \leq K$, and others, except the parameter, in the fourth phase value $\varphi_4$, the K phase intervals, the amplitude $a_{m,n}$ of the element (m, n) in the precoding matrix subset, the quantity of vectors in the K precoding matrix subsets, and the quantity M of elements in each vector in the precoding matrix subset are preset.

The processor 601 is specifically configured to: determine a precoding matrix subset for each phase interval $\Delta$, where determining the corresponding $k^{th}$ precoding matrix subset for $\Delta_k$ includes:

determining, by using a phase value $\varphi$, the phase interval $\Delta_k$, the amplitude $a_{m,n}$, the quantity $N_k$, and the quantity M, a vector that forms the precoding matrix subset, where the phase value $\varphi$ is a minimum value of a phase difference between two adjacent antennas in a vector in the precoding matrix subset; when k is 1, $\varphi$ is $\varphi_4$, and otherwise, $$\varphi = \varphi_4 + \sum_{i=1}^{k-1} N_i \Delta_i;$$

a phase difference between two adjacent antennas in the $n^{th}$ vector in the $k^{th}$ precoding matrix subset is $\varphi + n\Delta_k$; a phase difference between two $m^{th}$ antennas in two adjacent vectors in the $k^{th}$ precoding matrix subset is $m\Delta_k$; and $0 \leq m < M$, $0 \leq n < N_k$; and form the precoding matrix set by using the precoding matrix subsets separately determined for all the phase intervals.

Further, a form of a vector that forms the precoding matrix set and a form of the vector that forms the $k^{th}$ precoding matrix subset are as follows:

$B = [B_1 \; B_2 \; \cdots \; B_K]$; and $$B_k = [v_0^k \; v_1^k \; \cdots \; v_{N_k-1}^k]$$

$$= \begin{bmatrix} a_{0,0} & a_{0,1} & \cdots & a_{0,N_k-1} \\ a_{1,0}e^{j\varphi} & a_{1,1}e^{j(\varphi+\Delta_k)} & \cdots & a_{1,N_k-1}e^{j(\varphi+(N_k-1)\Delta_k)} \\ \vdots & \vdots & a_{m,n}e^{jm(\varphi+n\Delta_k)} & \vdots \\ a_{M_k-1,0}e^{j(M_k-1)\varphi} & a_{M_k-1,1}e^{j(M_k-1)(\varphi+\Delta_k)} & \cdots & a_{M_k-1,N_k-1}e^{j(M_k-1)(\varphi+(N_k-1)\Delta_k)} \end{bmatrix};$$

where

B is the precoding matrix set, $B_k$ is the $k^{th}$ precoding matrix subset, $v_n^k$ is the $n^{th}$ vector in the $k^{th}$ precoding matrix subset, and $a_{m,n}$ is the amplitude of the element (m, n) and is a real number.

Further, at least two of quantities $N_k$ of vectors in the K precoding matrix subsets are different.

Further, at least two of the K phase intervals $\Delta_k$ are different.

Embodiment 16

Figure 7:
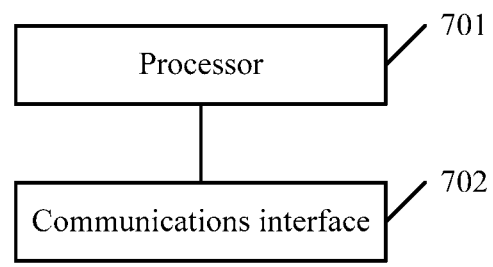
FIG. 7 is a schematic structural diagram of a network device according to Embodiment 16 of the present invention.

Based on a same invention concept, according to the parameter indication information sending method provided in the foregoing embodiment of the present invention, accordingly, Embodiment 16 of the present invention further provides a network device. For ease of description, the network device is referred to as a second network device. A structural diagram of the second network device is shown in FIG. 7, and the second network device specifically includes:

a processor 701, configured to determine a parameter used for determining a precoding matrix set, where the parameter includes at least one of a phase parameter, an amplitude parameter, a quantity of vectors in the precoding matrix set, a quantity of vectors in a first codebook set in dual-codebook feedback, and a quantity of vectors in a second codebook set in the dual-codebook feedback, and the parameter is not fixed; and a communications interface 702, configured to send first parameter indication information to a first network device, where the first parameter indication information is used to indicate the parameter.

Further, the parameter is cell-specific.
Further, the parameter is terminal-specific.
Further, the parameter is CSI process-specific.
Further, the parameter is carrier-specific.
Further, the parameter is rank-specific.

Further, the parameter is specific to a precoding matrix subset in a dual-codebook feedback manner; and the precoding matrix set determined by using the parameter is a precoding matrix subset of a first codebook W1 or a second codebook W2 in the dual-codebook feedback manner.

Further, the parameter includes multiple groups of parameters used for determining different precoding matrix subsets; and the precoding matrix subsets separately determined for the groups of parameters form the precoding matrix set.

Further, for a dual-codebook structure, W=W1*W2, $$W1 = \begin{bmatrix} U & 0 \\ 0 & U \end{bmatrix},$$

W1 is a diagonal matrix, each U in W1 is a precoding matrix subset, each U is corresponding to a group of parameters, and U corresponding to the group of parameters is determined according to the group of parameters.

Further, the communications interface 702 is specifically configured to send the first parameter indication information to the first network device by using broadcast signaling, radio resource control RRC signaling, or dynamic signaling.

Further, the communications interface 702 is further configured to receive second parameter indication information sent by the first network device, where the second parameter indication information is used to indicate a reference parameter used for determining the precoding matrix set, and the reference parameter includes at least one of a reference phase parameter, a reference amplitude parameter, a reference quantity of vectors in the precoding matrix set, a reference quantity of vectors in the first codebook set in the dual-codebook feedback, and a reference quantity of vectors in the second codebook set in the dual-codebook feedback.

Further, the processor 701 is specifically configured to: determine, according to indication information carried in a user ID, a cell ID, a CSI process ID, a carrier ID, a DMRS configuration parameter, a CSI-RS configuration parameter, system bandwidth allocated to the first network device, a PRG, or a subband size, a preset parameter corresponding to the indication information, and use the preset parameter as the parameter used for determining the precoding matrix set.

Further, the communications interface 702 is further configured to receive matrix indication information, fed back by the first network device, of a precoding matrix selected from the determined precoding matrix set.

Further, the first network device is a terminal, and the second network device is a base station; or both the first network device and the second network device are base stations; or both the first network device and the second network device are terminals.

Further, the processor 701 is further configured to determine the precoding matrix set by using the parameter, where the precoding matrix set includes at least one precoding matrix.

Further, the parameter includes at least one of a first phase value $\varphi_1$, an amplitude $a_{m,n}$ of an element (m, n) in the precoding matrix set, the quantity N of vectors in the precoding matrix set, and a quantity M of elements in each vector in the precoding matrix set, and others, except the parameter, in the first phase value $\varphi_1$, the amplitude $a_{m,n}$ of the element (m, n) in the precoding matrix set, the quantity N of vectors in the precoding matrix set, and the quantity M of elements in each vector in the precoding matrix set are preset.

The processor 701 is further configured to determine, by using a phase range $[0,\varphi_1]$, the amplitude $a_{m,n}$, the quantity N, and the quantity M, a vector that forms the precoding matrix set; where 0 is a minimum value of a phase difference between two adjacent antennas in a vector in the precoding matrix set; and the first phase value $\varphi_1$ is a maximum value of the phase difference between two adjacent antennas in the vector in the precoding matrix set.

Further, a form of the vector that forms the precoding matrix set is as follows:

$$B = [v_0 \ v_1 \ \cdots \ v_{N-1}] = \begin{bmatrix} a_{0,0} & a_{0,1} & \cdots & a_{0,N-1} \\ a_{1,0} & a_{1,1}e^{j\frac{\varphi_1}{N-1}} & \cdots & a_{1,N-1}e^{j\varphi_1} \\ \vdots & \vdots & a_{m,n}e^{j\frac{mn\varphi_1}{N-1}} & \vdots \\ a_{M-1,0} & a_{M-1,1}e^{j(M-1)\frac{\varphi_1}{N-1}} & \cdots & a_{M-1,N-1}e^{j(M-1)\varphi_1} \end{bmatrix};$$

where

B is the precoding matrix set, $v_n$ is the $n^{th}$ vector in the precoding matrix set, the amplitude $a_{m,n}$ is a real number, and $0 \le m < M$, $0 \le n < N$.

Further, the parameter includes at least one of a first phase value $\varphi_1$, an amplitude $a_{m,n}$ of an element (m, n) in the precoding matrix set, the quantity N of vectors in the precoding matrix set, and a quantity M of elements in each vector in the precoding matrix set. Others, except the parameter, in the first phase value $\varphi_1$, the amplitude $a_{m,n}$ of the element (m, n) in the precoding matrix set, the quantity N of vectors in the precoding matrix set, and the quantity M of elements in each vector in the precoding matrix set are preset.

The processor 701 is further configured to determine, by using a phase range $$\left[0, \frac{(N-1)\varphi_1}{N}\right],$$

the amplitude $a_{m,n}$, the quantity N, and the quantity M, a vector that forms the precoding matrix set; where 0 is a minimum value of a phase difference between two adjacent antennas in a vector in the precoding matrix set; and $$\frac{(N-1)\varphi_1}{N}$$

is a maximum value of the phase difference between two adjacent antennas in the vector in the precoding matrix set.

Further, a form of the vector that forms the precoding matrix set is as follows:

$$B = [v_0 \ v_1 \ \cdots \ v_{N-1}] = \begin{bmatrix} a_{0,0} & a_{0,1} & \cdots & a_{0,N-1} \\ a_{1,0} & a_{1,1}e^{j\frac{\varphi_1}{N}} & \cdots & a_{1,N-1}e^{j\frac{(N-1)\varphi_1}{N}} \\ \vdots & \vdots & a_{m,n}e^{j\frac{mn\varphi_1}{N}} & \vdots \\ a_{M-1,0} & a_{M-1,1}e^{j(M-1)\frac{\varphi_1}{N}} & \cdots & a_{M-1,N-1}e^{j(M-1)\frac{(N-1)\varphi_1}{N}} \end{bmatrix};$$

where

B is the precoding matrix set, $v_n$ is the $n^{th}$ vector in the precoding matrix set, the amplitude $a_{m,n}$ is a real number, and $0 \le m < M$, $0 \le n < N$.

Further, the parameter includes at least one of a second phase value $\varphi_2$, a third phase value $\varphi_3$, an amplitude $a_{m,n}$ of an element (m, n) in the precoding matrix set, the quantity N of vectors in the precoding matrix set, and a quantity M of elements in each vector in the precoding matrix set. Others, except the parameter, in the second phase value $\varphi_2$, the third phase value $\varphi_3$, the amplitude $a_{m,n}$ of the element (m, n) in the precoding matrix set, the quantity N of vectors in the precoding matrix set, and the quantity M of elements in each vector in the precoding matrix set are preset.

The processor 701 is further configured to determine, by using a phase range $[\varphi_2,\varphi_3]$, the amplitude $a_{m,n}$, the quantity N, and the quantity M, a vector that forms the precoding matrix set; where the second phase value $\varphi_2$ is a minimum value of a phase difference between two adjacent antennas in a vector in the precoding matrix set; and the third phase value $\varphi_3$ is a maximum value of the phase difference between two adjacent antennas in the vector in the precoding matrix set.

Further, a form of the vector that forms the precoding matrix set is as follows:

$$B = [v_0 \ v_1 \ \cdots \ v_{N-1}]$$
$$= \begin{bmatrix} a_{0,0} & a_{0,1} & \cdots & a_{0,N-1} \\ a_{1,0}e^{j\varphi_2} & a_{1,1}e^{j(\varphi_2+\Delta)} & \cdots & a_{1,N-1}e^{j\varphi_3} \\ \vdots & \vdots & a_{m,n}e^{jm(\varphi_2+n\Delta)} & \vdots \\ a_{M-1,0}e^{j(M-1)\varphi_2} & a_{M-1,1}e^{j(M-1)(\varphi_2+\Delta)} & \cdots & a_{M-1,N-1}e^{(M-1)\varphi_3} \end{bmatrix};$$

where $$\Delta = \frac{\varphi_3 - \varphi_2}{N-1};$$

and

B is the precoding matrix set, $v_n$ is the $n^{th}$ vector in the precoding matrix set, the amplitude $a_{m,n}$ is a real number, $0 \le m < M$, $0 \le n < N$, a phase difference between two adjacent antennas in the $n^{th}$ vector in the precoding matrix set is $\varphi_2 + n\Delta$, and a phase difference between two $m^{th}$ antennas in two adjacent vectors in the precoding matrix set is $m\Delta$.

Further, the parameter includes at least one of a second phase value $\varphi_2$, a third phase value $\varphi_3$, an amplitude $a_{m,n}$ of an element (m, n) in the precoding matrix set, the quantity N of vectors in the precoding matrix set, a quantity M of elements in each vector in the precoding matrix set, and an integer L, and others, except the parameter, in the second phase value $\varphi_2$, the third phase value $\varphi_3$, the amplitude $a_{m,n}$ of the element (m, n) in the precoding matrix set, the quantity N of vectors in the precoding matrix set, the quantity M of elements in each vector in the precoding matrix set, and the integer L are preset.

The processor 701 is further configured to determine, by using a phase range $$\left[\frac{\varphi_2}{L}, \frac{\varphi_3}{L}\right],$$

the amplitude $a_{m,n}$, the quantity N, and the quantity M, a vector that forms the precoding matrix set; where $$\frac{\varphi_2}{L}$$

is a minimum value of a phase difference between two adjacent antennas in a vector in the precoding matrix set; and $$\frac{\varphi_3}{L}$$

is a maximum value of the phase difference between two adjacent antennas in the vector in the precoding matrix set.

Further, a form of the vector that forms the precoding matrix set is as follows:

$$B = [\, v_0 \quad v_1 \quad \cdots \quad v_{N-1} \,]$$

$$= \begin{bmatrix} a_{0,0} & a_{0,1} & \cdots & a_{0,N-1} \\ a_{1,0} e^{j\frac{\varphi_2}{L}} & a_{1,1} e^{j(\frac{\varphi_2}{L}+\Delta)} & \cdots & a_{1,N-1} e^{j\frac{\varphi_3}{L}} \\ \vdots & \vdots & a_{m,n} e^{jm(\frac{\varphi_2}{L}+n\Delta)} & \vdots \\ a_{M-1,0} e^{j(M-1)\frac{\varphi_2}{L}} & a_{M-1,1} e^{j(M-1)(\frac{\varphi_2}{L}+\Delta)} & \cdots & a_{M-1,N-1} e^{j(M-1)\frac{\varphi_3}{L}} \end{bmatrix};$$

where $$\Delta = \frac{\varphi_3 - \varphi_2}{L(N-1)};$$

and

B is the precoding matrix set, $v_n$ is the $n^{th}$ vector in the precoding matrix set, the amplitude $a_{m,n}$ is a real number, $0 \le m < M$, $0 \le n < N$, a phase difference between two adjacent antennas in the $n^{th}$ vector in the precoding matrix set is $$\frac{\varphi_2}{L} + n\Delta,$$

and a phase difference between two $m^{th}$ antennas in two adjacent vectors in the precoding matrix set is $m\Delta$.

Further, the parameter includes at least one of a second phase value $\varphi_2$, a third phase value $\varphi_3$, a phase interval $\Delta$, an amplitude $a_{m,n}$ of an element (m, n) in the precoding matrix set, and a quantity M of elements in each vector in the precoding matrix set. Others, except the parameter, in the second phase value $\varphi_2$, the third phase value $\varphi_3$, the phase interval $\Delta$, the amplitude $a_{m,n}$ of the element (m, n) in the precoding matrix set, and the quantity M of elements in each vector in the precoding matrix set are preset.

The processor 701 is further configured to determine, by using a phase range $[\varphi_2, \varphi_3]$, the phase interval $\Delta$, the amplitude $a_{m,n}$ and the quantity M, a vector that forms the precoding matrix set; where the second phase value $\varphi_2$ is a minimum value of a phase difference between two adjacent antennas in a vector in the precoding matrix set;

the third phase value $\varphi_3$ is a maximum value of the phase difference between two adjacent antennas in the vector in the precoding matrix set; and a phase difference between two adjacent antennas in the $n^{th}$ vector in the precoding matrix set is $\varphi_2 + n\Delta$, a phase difference between two $m^{th}$ antennas in two adjacent vectors in the precoding matrix set is $m\Delta$, $0 \le m < M$, $0 \le n < N$, N is the quantity of vectors in the precoding matrix set, and $$\Delta = \frac{\varphi_3 - \varphi_2}{N-1}.$$

Further, a form of the vector that forms the precoding matrix set is as follows:

$$B = \begin{bmatrix} v_0 & v_1 & \ldots & v_{N-1} \end{bmatrix}$$

$$= \begin{bmatrix} a_{0,0} & a_{0,1} & \ldots & a_{0,N-1} \\ a_{1,0}e^{j\varphi_2} & a_{1,1}e^{j(\varphi_2+\Delta)} & \ldots & a_{1,N-1}e^{j\varphi_3} \\ \vdots & \vdots & a_{m,n}e^{jm(\varphi_2+n\Delta)} & \vdots \\ a_{M-1,0}e^{j(M-1)\varphi_2} & a_{M-1,1}e^{j(M-1)(\varphi_2+\Delta)} & \ldots & a_{M-1,N-1}e^{(M-1)\varphi_3} \end{bmatrix};$$

where

B is the precoding matrix set, $v_n$ is the $n^{th}$ vector in the precoding matrix set, and the amplitude $a_{m,n}$ is a real number.

Further, the parameter includes at least one of a second phase value $\varphi_2$, a third phase value $\varphi_3$, a phase interval $\Delta$, an amplitude $a_{m,n}$ of an element (m, n) in the precoding matrix set, a quantity M of elements in each vector in the precoding matrix set, and an integer L, and others, except the parameter, in the second phase value $\varphi_2$, the third phase value $\varphi_3$, the phase interval $\Delta$, the amplitude $a_{m,n}$ of the element (m, n) in the precoding matrix set, the quantity M of elements in each vector in the precoding matrix set, and the integer L are preset.

The processor 701 is further configured to determine, by using a phase range $$\left[\frac{\varphi_2}{L}, \frac{\varphi_3}{L}\right],$$

the phase interval $\Delta$, the amplitude $a_{m,n}$, and the quantity M, a vector that forms the precoding matrix set; where $$\frac{\varphi_2}{L}$$

is a minimum value of a phase difference between two adjacent antennas in a vector in the precoding matrix set;

$$\frac{\varphi_3}{L}$$

is a maximum value of the phase difference between two adjacent antennas in the vector in the precoding matrix set; and a phase difference between two adjacent antennas in the $n^{th}$ vector in the precoding matrix set is $$\frac{\varphi_2}{L} + n\Delta,$$

a phase difference between two $m^{th}$ antennas in two adjacent vectors in the precoding matrix set is $m\Delta$, $0 \leq m < M$, $0 \leq n < N$, N is the quantity of vectors in the precoding matrix set, and $$\Delta = \frac{\varphi_3 - \varphi_2}{L(N-1)}.$$

Further, a form of the vector that forms the precoding matrix set is as follows:

$$B = \begin{bmatrix} v_0 & v_1 & \ldots & v_{N-1} \end{bmatrix}$$

$$= \begin{bmatrix} a_{0,0} & a_{0,1} & \ldots & a_{0,N-1} \\ a_{1,0}e^{j\frac{\varphi_2}{L}} & a_{1,1}e^{j(\frac{\varphi_2}{L}+\Delta)} & \ldots & a_{1,N-1}e^{j\frac{\varphi_3}{L}} \\ \vdots & \vdots & a_{m,n}e^{jm(\frac{\varphi_2}{L}+n\Delta)} & \vdots \\ a_{M-1,0}e^{j(M-1)\frac{\varphi_2}{L}} & a_{M-1,1}e^{j(M-1)(\frac{\varphi_2}{L}+\Delta)} & \ldots & a_{M-1,N-1}e^{j(M-1)\frac{\varphi_3}{L}} \end{bmatrix};$$

where

B is the precoding matrix set, $v_n$ is the $n^{th}$ vector in the precoding matrix set, and the amplitude $a_{m,n}$ is a real number.

Further, the parameter includes at least one of the following: K second phase values, K third phase values, an amplitude $a_{m,n}$ of an element (m, n) in a precoding matrix subset, a quantity of vectors in K precoding matrix subsets, and a quantity M of elements in each vector in a precoding matrix subset, $\varphi_{2,k}$ represents the $k^{th}$ second phase value, $\varphi_{3,k}$ represents the $k^{th}$ third phase value, $N_k$ represents a quantity of vectors in the $k^{th}$ precoding matrix subset, $1 \leq k \leq K$, and others, except the parameter, in the K second phase values, the K third phase values, the amplitude $a_{m,n}$ of the element (m, n) in the precoding matrix subset, the quantity of vectors in the K precoding matrix subsets, and the quantity M of elements in each vector in the precoding matrix subset are preset.

The processor 701 is further configured to: determine a precoding matrix subset for each group of the second phase value and the third phase value, where determining the corresponding $k^{th}$ precoding matrix subset for $\varphi_{2,k}$ and $\varphi_{3,k}$ includes:

determining, by using the phase value $\varphi_{2,k}$, the phase value $\varphi_{3,k}$, the amplitude $a_{m,n}$, the quantity $N_k$, and the quantity M, a vector that forms the precoding matrix subset, where the phase value $\varphi_{2,k}$ is a minimum value of a phase difference between two adjacent antennas in a vector in the precoding matrix subset, and the phase value $\varphi_{3,k}$ is a maximum value of a phase difference between two adjacent antennas in a vector in the precoding matrix set; and form the precoding matrix set by using the precoding matrix subsets separately determined for all the groups of the second phase value and the third phase value.

Further, a form of a vector that forms the precoding matrix set and a form of the vector that forms the $k^{th}$ precoding matrix subset are as follows:

$$B = [\, B_1 \quad B_2 \quad \ldots \quad B_K \,]; \text{ and}$$

$$B_k = \begin{bmatrix} v_0^k & v_1^k & \ldots & v_{N_k-1}^k \end{bmatrix}$$
$$= \begin{bmatrix} a_{0,0} & a_{0,1} & \ldots & a_{0,N-1} \\ a_{1,0}e^{j\varphi_{2,k}} & a_{1,1}e^{j(\varphi_{2,k}+\Delta_k)} & \ldots & a_{1,N-1}e^{j\varphi_{3,k}} \\ \vdots & \vdots & a_{m,n}e^{jm(\varphi_{2,k}+n\Delta_k)} & \vdots \\ a_{M-1,0}e^{j(M-1)\varphi_{2,k}} & a_{M-1,1}e^{j(M-1)(\varphi_{2,k}+\Delta_k)} & \ldots & a_{M-1,N-1}e^{j(M-1)\varphi_{3,k}} \end{bmatrix}$$

where $$\Delta_k = \frac{\varphi_{3,k} - \varphi_{2,k}}{N_k - 1};$$

and

B is the precoding matrix set, $B_k$ is the $k^{th}$ precoding matrix subset, $v_n^k$ is the $n^{th}$ vector in the $k^{th}$ precoding matrix subset, $a_{m,n}$ is the amplitude of the element (m, n) and is a real number, a phase difference between two adjacent antennas in the $n^{th}$ vector in the $k^{th}$ precoding matrix subset is $\varphi_{2,k}+n\Delta_k$, a phase difference between two $m^{th}$ antennas in two adjacent vectors in the $k^{th}$ precoding matrix subset is $m\Delta_k$, and $0 \le m < M$, $0 \le n < N_k$.

Further, at least two groups in the K second phase values $\varphi_{2,k}$ and $\varphi_{3,k}$ are different.

Further, at least two of quantities $N_k$ of vectors in the K precoding matrix subsets are different.

Further, the parameter includes at least one of the following: K second phase values, K third phase values, K phase intervals, an amplitude $a_{m,n}$ of an element (m, n) in a precoding matrix subset, and a quantity M of elements in each vector in a precoding matrix subset, $\varphi_{2,k}$ represents the $k^{th}$ second phase value, $\varphi_{3,k}$ represents the $k^{th}$ third phase value, $\Delta_k$ represents the $k^{th}$ phase interval, $1 \le k \le K$, and others, except the parameter, in the K second phase values, the K third phase values, the K phase intervals, the amplitude $a_{m,n}$ of the element (m, n) in the precoding matrix subset, and the quantity M of elements in each vector in the precoding matrix subset are preset.

The processor 701 is further configured to: determine a precoding matrix subset for each group of the second phase value and the third phase value, where determining a corresponding $k^{th}$ precoding matrix subset for $\varphi_{2,k}$ and $\varphi_{3,k}$ includes:

determining, by using the phase value $\varphi_{2,k}$, the phase value $\varphi_{3,k}$, the phase interval $\Delta_k$, the amplitude $a_{m,n}$, and the quantity M, a vector that forms the precoding matrix subset, where the phase value $\varphi_{2,k}$ is a minimum value of a phase difference between two adjacent antennas in a vector in the precoding matrix subset, the phase value $\varphi_{3,k}$ is a maximum value of a phase difference between two adjacent antennas in a vector in the precoding matrix set, a phase difference between two adjacent antennas in the $n^{th}$ vector in the $k^{th}$ precoding matrix subset is $\varphi_{2,k}+n\Delta_k$, a phase difference between two $m^{th}$ antennas in two adjacent vectors in the $k^{th}$ precoding matrix subset is $m\Delta_k$, $0 \le m < M$, $0 \le n < N_k$, $N_k$ is a quantity of vectors in the $k^{th}$ precoding matrix subset, and $$\Delta_k = \frac{\varphi_{3,k} - \varphi_{2,k}}{N_k - 1};$$

and form the precoding matrix set by using the precoding matrix subsets separately determined for all the groups of the second phase value and the third phase value.

Further, a form of a vector that forms the precoding matrix set and a form of the vector that forms the $k^{th}$ precoding matrix subset are as follows:

$$B = [\, B_1 \quad B_2 \quad \ldots \quad B_K \,]; \text{ and}$$

$$B_k = \begin{bmatrix} v_0^k & v_1^k & \ldots & v_{N_k-1}^k \end{bmatrix}$$
$$= \begin{bmatrix} a_{0,0} & a_{0,1} & \ldots & a_{0,N-1} \\ a_{1,0}e^{j\varphi_{2,k}} & a_{1,1}e^{j(\varphi_{2,k}+\Delta_k)} & \ldots & a_{1,N-1}e^{j\varphi_{3,k}} \\ \vdots & \vdots & a_{m,n}e^{jm(\varphi_{2,k}+n\Delta_k)} & \vdots \\ a_{M-1,0}e^{j(M-1)\varphi_{2,k}} & a_{M-1,1}e^{j(M-1)(\varphi_{2,k}+\Delta_k)} & \ldots & a_{M-1,N-1}e^{j(M-1)\varphi_{3,k}} \end{bmatrix};$$

where

B is the precoding matrix set, $B_k$ is the $k^{th}$ precoding matrix subset, $v_n^k$ is the $n^{th}$ vector in the $k^{th}$ precoding matrix subset, and $a_{m,n}$ is the amplitude of the element (m, n) and is a real number.

Further, at least two groups in the K second phase values $\varphi_{2,k}$ and $\varphi_{3,k}$ are different.

Further, at least two of the K phase intervals $\Delta_k$ are different.

Further, the parameter includes at least one of a fourth phase value $\varphi_4$, a phase interval $\Delta$, an amplitude $a_{m,n}$ of an element (m, n) in the precoding matrix set, the quantity N of vectors in the precoding matrix set, and a quantity M of elements in each vector in the precoding matrix set. Others, except the parameter, in the fourth phase value $\varphi_4$, the phase interval $\Delta$, the amplitude $a_{m,n}$ of the element (m, n) in the precoding matrix set, the quantity N of vectors in the precoding matrix set, and the quantity M of elements in each vector in the precoding matrix set are preset.

The processor 701 is further configured to determine, by using the fourth phase value $\varphi_4$, the phase interval $\Delta$, the amplitude $a_{m,n}$, the quantity N, and the quantity M, a vector that forms the precoding matrix set; where the fourth phase value $\varphi_4$ is a minimum value of a phase difference between two adjacent antennas in a vector in the precoding matrix set; and a phase difference between two adjacent antennas in the $n^{th}$ vector in the precoding matrix set is $\varphi_4+n\Delta$, a phase difference between two $m^{th}$ antennas in two adjacent vectors in the precoding matrix set is $m\Delta$, and $0\leq m<M$, $0\leq n<N$.

Further, a form of the vector that forms the precoding matrix set is as follows:

$$B = [\, v_0 \quad v_1 \quad \ldots \quad v_{N-1}\,]$$

$$= \begin{bmatrix} a_{0,0} & a_{0,1} & \ldots & a_{0,N-1} \\ a_{1,0}e^{j\varphi_4} & a_{1,1}e^{j(\varphi_4+\Delta)} & \ldots & a_{1,N-1}e^{j(\varphi_4+(N-1)\Delta)} \\ \vdots & \vdots & a_{m,n}e^{jm(\varphi_4+n\Delta)} & \vdots \\ a_{M-1,0}e^{j(M-1)\varphi_4} & a_{M-1,1}e^{j(M-1)(\varphi_4+\Delta)} & \ldots & a_{M-1,N-1}e^{j(M-1)(\varphi_4+(N-1)\Delta)} \end{bmatrix};$$

where

B is the precoding matrix set, $v_n$ is the $n^{th}$ vector in the precoding matrix set, and the amplitude $a_{m,n}$ is a real number.

Further, the parameter includes at least one of the following: K fourth phase values, K phase intervals, an amplitude $a_{m,n}$ of an element (m, n) in a precoding matrix subset, a quantity of vectors in K precoding matrix subsets, and a quantity M of elements in each vector in a precoding matrix subset, $\varphi_{4,k}$ represents the $k^{th}$ fourth phase value, $\Delta_k$ represents the $k^{th}$ phase interval $\Delta$, $N_k$ represents a quantity of vectors in the $k^{th}$ precoding matrix subset, $1\leq k\leq K$, and others, except the parameter, in the K fourth phase values, the K phase intervals, the amplitude $a_{m,n}$ of the element (m, n) in the precoding matrix subset, the quantity of vectors in the K precoding matrix subsets, and the quantity M of elements in each vector in the precoding matrix subset are preset.

The processor 701 is further configured to: determine a precoding matrix subset for each phase interval $\Delta$, where determining the corresponding $k^{th}$ precoding matrix subset for $\varphi_{4,k}$ and $\Delta_k$ includes:

determining, by using the phase value $\varphi_{4,k}$, the phase interval $\Delta_k$, the amplitude $a_{m,n}$, the quantity $N_k$, and the quantity M, a vector that forms the precoding matrix subset, where the phase value $\varphi_{4,k}$ is a minimum value of a phase difference between two adjacent antennas in a vector in the precoding matrix subset, a phase difference between two adjacent antennas in the $n^{th}$ vector in the $k^{th}$ precoding matrix subset is $\varphi_{4,k}+n\Delta_k$, a phase difference between two $m^{th}$ antennas in two adjacent vectors in the $k^{th}$ precoding matrix subset is $m\Delta_k$ and $0\leq m<M$, $0\leq n<N_k$; and form the precoding matrix set by using the precoding matrix subsets separately determined for all the phase intervals.

Further, a form of a vector that forms the precoding matrix set and a form of the vector that forms the $k^{th}$ precoding matrix subset are as follows:

$$B = [\, B_1 \quad B_2 \quad \ldots \quad B_K\,]; \text{ and}$$

$$B_k = [\, v_0^k \quad v_1^k \quad \ldots \quad v_{N_k-1}^k\,]$$

$$= \begin{bmatrix} a_{0,0} & a_{0,1} & \ldots & a_{0,N_k-1} \\ a_{1,0}e^{j\varphi_{4,k}} & a_{1,1}e^{j(\varphi_{4,k}+\Delta_k)} & \ldots & a_{1,N_k-1}e^{j(\varphi_{4,k}+(N_k-1)\Delta_k)} \\ \vdots & \vdots & a_{m,n}e^{jm(\varphi_{4,k}+n\Delta_k)} & \vdots \\ a_{M_k-1,0}e^{j(M_k-1)\varphi_{4,k}} & a_{M_k-1,1}e^{j(M_k-1)(\varphi_{4,k}+\Delta_k)} & \ldots & a_{M_k-1,N_k-1}e^{j(M_k-1)(\varphi_{4,k}+(N_k-1)\Delta_k)} \end{bmatrix};$$

where

B is the precoding matrix set, $B_k$ is the $k^{th}$ precoding matrix subset, $v_n^k$ is the $n^{th}$ vector in the $k^{th}$ precoding matrix subset, and $a_{m,n}$ is the amplitude of the element (m, n) and is a real number.

Further, at least two of the K fourth phase values $\varphi_{4,k}$ are different.

Further, at least two of quantities $N_k$ of vectors in the K precoding matrix subsets are different.

Further, at least two of the K phase intervals $\Delta_k$ are different.

Further, the parameter includes at least one of a fourth phase value $\varphi_4$, K phase intervals, an amplitude $a_{m,n}$ of an element (m, n) in a precoding matrix subset, a quantity of vectors in K precoding matrix subsets, and a quantity M of elements in each vector in a precoding matrix subset, $\Delta_k$ represents the $k^{th}$ phase interval in the K different phase intervals, $N_k$ represents a quantity of vectors in the $k^{th}$ precoding matrix subset, $1 \leq k \leq K$, and others, except the parameter, in the fourth phase value $\varphi_4$, the K phase intervals, the amplitude $a_{m,n}$ of the element (m, n) in the precoding matrix subset, the quantity of vectors in the K precoding matrix subsets, and the quantity M of elements in each vector in the precoding matrix subset are preset.

The processor 701 is further configured to: determine a precoding matrix subset for each phase interval, where determining the corresponding $k^{th}$ precoding matrix subset for $\Delta_k$ includes:

determining, by using a phase value $\varphi$, the phase interval $\Delta_k$, the amplitude $a_{m,n}$, the quantity $N_k$, and the quantity M, a vector that forms the precoding matrix subset, where the phase value $\varphi$ is a minimum value of a phase difference between two adjacent antennas in a vector in the precoding matrix subset; when k is 1, $\varphi$ is $\varphi_4$, and otherwise, $$\varphi = \varphi_4 + \sum_{i=1}^{k-1} N_i \Delta_i;$$

a phase difference between two adjacent antennas in the $n^{th}$ vector in the $k^{th}$ precoding matrix subset is $\varphi + n\Delta_k$; a phase difference between two $m^{th}$ antennas in two adjacent vectors in the $k^{th}$ precoding matrix subset is $m\Delta_k$; and $0 \leq m < M$, $0 \leq n < N_k$; and form the precoding matrix set by using the precoding matrix subsets separately determined for all the phase intervals.

Further, a form of a vector that forms the precoding matrix set and a form of the vector that forms the $k^{th}$ precoding matrix subset are as follows:

$$B = [\begin{array}{cccc} B_1 & B_2 & \ldots & B_K \end{array}]; \text{ and}$$

$$B_k = [\begin{array}{cccc} v_0^k & v_1^k & \ldots & v_{N_k-1}^k \end{array}]$$

$$= \begin{bmatrix} a_{0,0} & a_{0,1} & \ldots & a_{0,N_k-1} \\ a_{1,0}e^{j\varphi} & a_{1,1}e^{j(\varphi+\Delta_k)} & \ldots & a_{1,N_k-1}e^{j(\varphi+(N_k-1)\Delta_k)} \\ \vdots & \vdots & a_{m,n}e^{jm(\varphi+n\Delta_k)} & \vdots \\ a_{M_k-1,0}e^{j(M_k-1)\varphi} & a_{M_k-1,1}e^{j(M_k-1)(\varphi+\Delta_k)} & \ldots & a_{M_k-1,N_k-1}e^{j(M_k-1)(\varphi+(N_k-1)\Delta_k)} \end{bmatrix};$$

where

B is the precoding matrix set, $B_k$ is the $k^{th}$ precoding matrix subset, $v_n^k$ is the $n^{th}$ vector in the $k^{th}$ precoding matrix subset, and $a_{m,n}$ is the amplitude of the element (m, n) and is a real number.

Further, at least two of quantities $N_k$ of vectors in the K precoding matrix subsets are different.

Further, at least two of the K phase intervals $\Delta_k$ are different.

In conclusion, the solution provided in the embodiments of the present invention includes: determining, by a first network device, a parameter used for determining a precoding matrix set, where the parameter includes at least one of a phase parameter, an amplitude parameter, a quantity of vectors in the precoding matrix set, a quantity of vectors in a first codebook set in dual-codebook feedback, and a quantity of vectors in a second codebook set in the dual-codebook feedback, and the parameter is not fixed; and using the parameter to determine the precoding matrix set, where the precoding matrix set includes at least one precoding matrix. By using the solution provided in the embodiments of the present invention, flexibility of feeding back a precoding matrix indicator is improved.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A precoding matrix set determining method in a first device in a network, the method comprising:
determining, by the first network device, a parameter used for determining a precoding matrix set for use by a transmitter of the first network device, wherein the parameter comprises a quantity of vectors in the precoding matrix set, a quantity of vectors in a first codebook set in dual-codebook feedback, and a quantity of vectors in a second codebook set in the dual-codebook feedback, wherein the parameter is first network device-specific; and
determining, by the first network device, the precoding matrix set by using the parameter, wherein the precoding matrix set comprises at least one precoding matrix for use by the transmitter.

2. The method according to claim 1, wherein the parameter comprises groups of parameters used for determining different precoding matrix subsets, and the determining the precoding matrix set by using the parameter comprises:
separately determining, by the first network device, respective precoding matrix subsets by using the groups of parameters; and
forming, by the first network device, the precoding matrix set by using the precoding matrix subsets separately determined for the groups of parameters.

3. The method according to claim 2, wherein:
for a dual-codebook structure, W=W1*W2, $$W1 = \begin{bmatrix} U & 0 \\ 0 & U \end{bmatrix},$$

W1 is a diagonal matrix, each U in W1 is a precoding matrix subset comprising a group of parameters.

4. The method according to claim 1, wherein determining a parameter used for determining the precoding matrix set comprises:
receiving, by the first network device, first parameter indication information sent by a second network device, wherein the first parameter indication information is used to indicate the parameter used for determining the precoding matrix set; and
determining, by the first network device, according to the first parameter indication information, the parameter used for determining the precoding matrix set.

5. The method according to claim 4, wherein the first parameter indication information is carried by radio resource control (RRC) signaling.

6. A parameter indication information sending method comprising:
determining, by a second network device, a parameter used for determining a precoding matrix set for use by a transmitter of a first network device wherein the parameter comprises a quantity of vectors in the precoding matrix set, a quantity of vectors in a first codebook set in dual-codebook feedback, and a quantity of vectors in a second codebook set in the dual-codebook feedback wherein the parameter is first network device-specific; and
sending, by the second network device, first parameter indication information to the first network device, wherein the first parameter indication information is used to indicate the parameter.

7. The method according to claim 6, wherein the parameter comprises groups of parameters used for determining different precoding matrix subsets, and the precoding matrix subsets separately determined for the groups of parameters form the precoding matrix set.

8. The method according to claim 7, wherein:
for a dual-codebook structure, W=W1*W2, $$W1 = \begin{bmatrix} U & 0 \\ 0 & U \end{bmatrix},$$

W1 is a diagonal matrix, each U in W1 is a precoding matrix subset comprising a group of parameters.

9. The method according to claim 6, wherein sending first parameter indication information to the first network device comprises:
sending, by the second network device, the first parameter indication information to the first network device by radio resource control (RRC) signaling.

10. A precoding matrix set determining apparatus comprising:
a processor; and
a non-transitory memory, wherein the memory stores an execution instruction and, when the processor executes the execution instruction, the processor is configured to perform the following operations:
determining a parameter used for determining a precoding matrix set, wherein the parameter comprises a quantity of vectors in the precoding matrix set, a quantity of vectors in a first codebook set in dual-codebook feedback, and a quantity of vectors in a second codebook set in the dual-codebook feedback, wherein the parameter is terminal-specific; and
determining the precoding matrix set by using the parameter, wherein the precoding matrix set comprises at least one precoding matrix.

11. The apparatus according to claim 10, wherein the parameter comprises groups of parameters used for determining different precoding matrix subsets, and determining the precoding matrix set by using the parameter comprises:
separately determining respective precoding matrix subsets by using the groups of parameters; and forming the precoding matrix set by using the precoding matrix subsets separately determined for the groups of parameters.

12. The apparatus according to claim 10, wherein:
for a dual-codebook structure, W=W1*W2, $$W1 = \begin{bmatrix} U & 0 \\ 0 & U \end{bmatrix},$$

W1 is a diagonal matrix, each U in W1 is a precoding matrix subset comprising a group of parameters.

13. The apparatus according to claim 10, wherein determining the parameter used for determining a precoding matrix set comprises:
receiving first parameter indication information sent by a second network device, wherein the first parameter indication information is used to indicate the parameter used for determining the precoding matrix set; and
determining, according to the first parameter indication information, the parameter used for determining the precoding matrix set.

14. The apparatus according to claim 13, wherein the first parameter indication information is carried by radio resource control (RRC) signaling.

15. A parameter indication information sending apparatus comprising:
a processor; and
a non-transitory memory, wherein the memory stores an execution instruction and, when the processor executes the execution instruction, the processor is configured to perform the following operations:
determining a parameter used for determining a precoding matrix set, wherein the parameter comprises a quantity of vectors in the precoding matrix set, a quantity of vectors in a first codebook set in dual-codebook feedback, and a quantity of vectors in a second codebook set in the dual-codebook feedback, wherein the parameter is terminal-specific; and
sending first parameter indication information to a first network device, wherein the first parameter indication information is used to indicate the parameter.

16. The apparatus according to claim 15, wherein the parameter comprises groups of parameters used for determining different precoding matrix subsets, and the precoding matrix subsets separately determined for the groups of parameters form the precoding matrix set.

17. The apparatus according to claim 15, wherein:
for a dual-codebook structure, W=W1*W2, $$W1 = \begin{bmatrix} U & 0 \\ 0 & U \end{bmatrix},$$

W1 is a diagonal matrix, each U in W1 is a precoding matrix subset comprising a group of parameters.

18. The apparatus according to claim 15, wherein sending first parameter indication information to the first network device comprising:
sending the first parameter indication information to the first network device by radio resource control (RRC) signaling.

19. A non-transitory computer-readable medium storing processor-executable instructions that, when executed by a processor, facilitates performance of a data transmission method comprising:
determining a parameter used for determining a precoding matrix set, wherein the parameter comprises a quantity of vectors in the precoding matrix set, a quantity of vectors in a first codebook set in dual-codebook feedback, and a quantity of vectors in a second codebook set in the dual-codebook feedback, wherein the parameter is terminal-specific; and
determining the precoding matrix set by using the parameter, wherein the precoding matrix set comprises at least one precoding matrix.

20. The non-transitory computer-readable medium according to claim 19, wherein:
for a dual-codebook structure, W=W1*W2, $$W1 = \begin{bmatrix} U & 0 \\ 0 & U \end{bmatrix},$$

W1 is a diagonal matrix, each U in W1 is a precoding matrix subset, and each U corresponds to a group of parameters.

21. The non-transitory computer-readable medium according to claim 19, wherein determining the parameter used for determining a precoding matrix set comprises:
receiving first parameter indication information sent by a second network device, wherein the first parameter indication information is used to indicate the parameter used for determining the precoding matrix set; and
determining, according to the first parameter indication information, the parameter used for determining the precoding matrix set.

22. A non-transitory computer-readable medium storing processor-executable instructions that, when executed by a processor, facilitate performance of a data transmission method comprising:
determining a parameter used for determining a precoding matrix set, wherein the parameter comprises a quantity of vectors in the precoding matrix set, a quantity of vectors in a first codebook set in dual-codebook feedback, and a quantity of vectors in a second codebook set in the dual-codebook feedback, wherein the parameter is terminal-specific; and
sending first parameter indication information to a first network device, wherein the first parameter indication information is used to indicate the parameter.

23. The apparatus according to claim 22, wherein:
for a dual-codebook structure, W=W1*W2, $$W1 = \begin{bmatrix} U & 0 \\ 0 & U \end{bmatrix},$$

W1 is a diagonal matrix, each U in W1 is a precoding matrix subset comprising a group of parameters.

24. The non-transitory computer-readable medium according to claim 22, wherein sending first parameter indication information to the first network device comprises:
sending the first parameter indication information to the first network device by radio resource control (RRC) signaling.

* * * * *